US012466205B2

(12) United States Patent
Tanaka et al.

(10) Patent No.: US 12,466,205 B2
(45) Date of Patent: Nov. 11, 2025

(54) RECORDING DEVICE

(71) Applicant: SEIKO EPSON CORPORATION, Tokyo (JP)

(72) Inventors: Takuto Tanaka, Shiojiri (JP); Masaki Shimomura, Matsumoto (JP); Yuichi Segawa, Shiojiri (JP); Tsuyoshi Furumido, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 187 days.

(21) Appl. No.: 18/352,904

(22) Filed: Jul. 14, 2023

(65) Prior Publication Data

US 2024/0017559 A1 Jan. 18, 2024

(30) Foreign Application Priority Data

Jul. 15, 2022 (JP) .................................. 2022-113762
Dec. 9, 2022 (JP) .................................. 2022-196867

(51) Int. Cl.
| | |
|---|---|
| *B41J 29/393* | (2006.01) |
| *B41J 2/165* | (2006.01) |
| *B41J 29/02* | (2006.01) |
| *H04N 1/00* | (2006.01) |

(52) U.S. Cl.
CPC ......... *B41J 29/393* (2013.01); *B41J 2/16511* (2013.01); *B41J 29/02* (2013.01); *H04N 1/00546* (2013.01); *H04N 1/00559* (2013.01)

(58) Field of Classification Search
CPC .... B41J 2/16511; B41J 29/02; B41J 2/16508; B41J 2/16585; B41J 25/304; H04N 1/00546

See application file for complete search history.

(56) References Cited

U.S. PATENT DOCUMENTS

| | | | | |
|---|---|---|---|---|
| 4,808,020 | A | | 2/1989 | Kudo |
| 6,015,205 | A | * | 1/2000 | Chambers ............... B41J 19/20 |
| | | | | 347/8 |
| 2010/0020124 | A1 | * | 1/2010 | Okazaki ............... B41J 2/16511 |
| | | | | 347/29 |
| 2015/0022609 | A1 | | 1/2015 | Hanabusa et al. |
| 2016/0052279 | A1 | * | 2/2016 | Saito .................... B41J 2/16552 |
| | | | | 347/33 |
| 2019/0300304 | A1 | | 10/2019 | Sato et al. |
| 2020/0047493 | A1 | | 2/2020 | Kohnotoh et al. |
| 2021/0237449 | A1 | | 8/2021 | Aoki et al. |

FOREIGN PATENT DOCUMENTS

| | | |
|---|---|---|
| JP | H05-025899 Y | 6/1993 |
| JP | 2015-020356 A | 2/2015 |
| JP | 2015-058622 A | 3/2015 |
| JP | 2020-26080 A | 2/2020 |
| JP | 2020-070140 A | 5/2020 |
| JP | 2021-121488 A | 8/2021 |

* cited by examiner

*Primary Examiner* — Douglas X Rodriguez
*Assistant Examiner* — Tracey M Mcmillion
(74) *Attorney, Agent, or Firm* — WORKMAN NYDEGGER

(57) ABSTRACT

A recording device includes a moving portion that is movable in a moving direction intersecting a horizontal direction, and a regulating member that includes a regulating portion and is attachable to and detachable from a contact position where the regulating portion comes into contact with a part of the moving portion, in which the regulating member regulates movement of the moving portion in the moving direction by the regulating portion coming into contact with a part of the moving portion.

13 Claims, 32 Drawing Sheets

RECORDING DEVICE

The present application is based on, and claims priority from JP Application Serial Number 2022-113762, filed Jul. 15, 2022, and 2022-196867, filed Dec. 9, 2022, the disclosures of which are hereby incorporated by reference herein in its entirety.

BACKGROUND

1. Technical Field

The present disclosure relates to a recording device.

2. Related Art

JP-A-2021-121488 discloses a recording device that records information on a medium by ejecting ink from nozzles of a line head, which is an example of a recording unit. It is disclosed that the recording device includes a cap unit which is an example of a cap portion that covers the nozzles of the line head. It is also disclosed that the recording device includes a head moving unit that moves the line head, and a moving unit that moves the cap unit to a position where the cap unit covers the nozzles of the line head. The line head and the cap unit are examples of a moving unit that is movably provided in the recording device.

However, in the recording device disclosed in JP-A-2021-121488, there is a concern that the line head or the cap unit will be displaced from a predetermined position due to vibration or impact received when the recording device is moved by transportation or the like, thereby causing a defect.

SUMMARY

A recording device includes a moving portion that is movable in a moving direction intersecting a horizontal direction, and a regulating member that includes a regulating portion and is attachable to and detachable from a contact position where the regulating portion comes into contact with a part of the moving portion, in which the regulating member regulates movement of the moving portion in the moving direction by the regulating portion coming into contact with a part of the moving portion.

DESCRIPTION OF EXEMPLARY EMBODIMENTS

Figure 1:
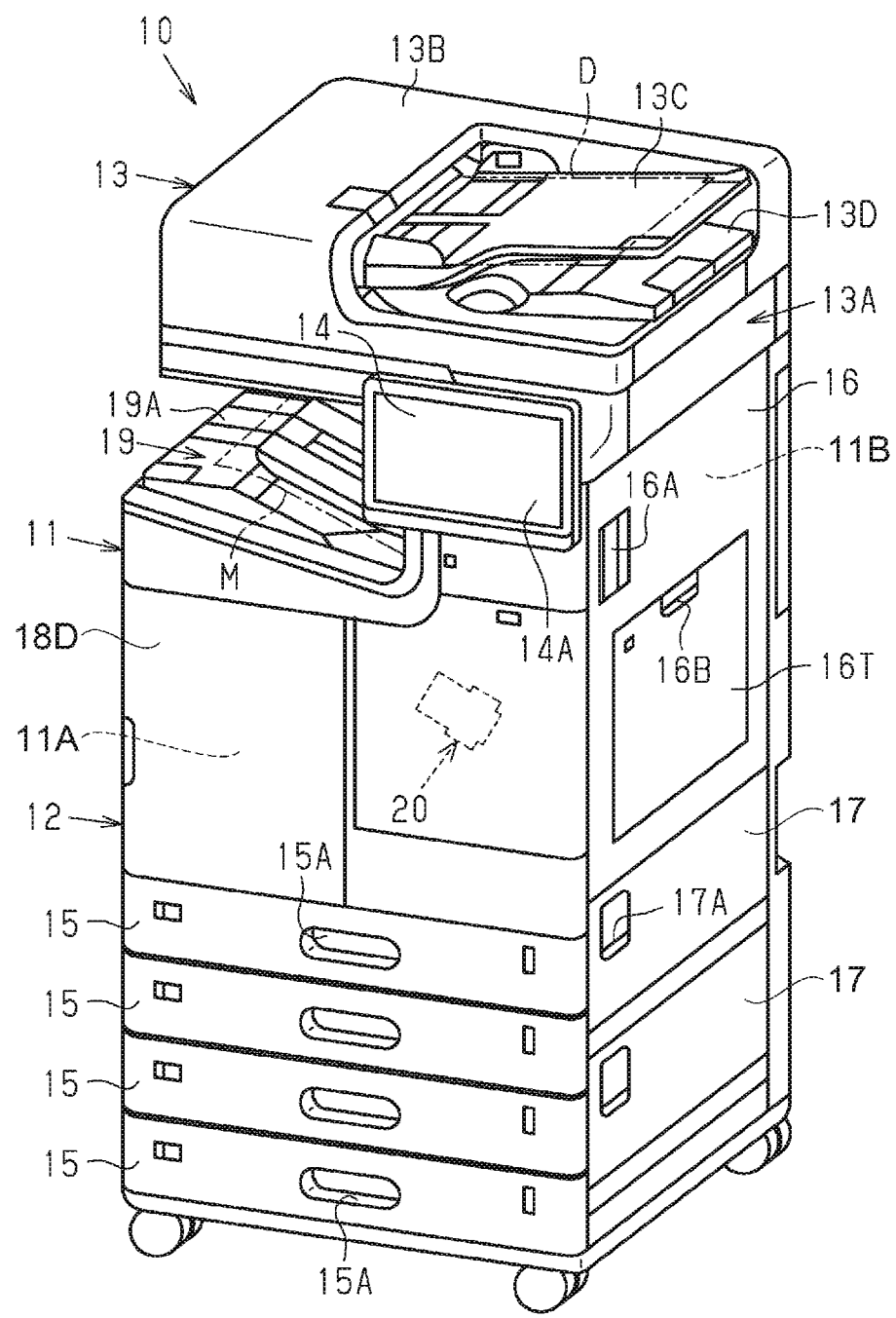
FIG. 1 is a perspective view illustrating an appearance configuration of a recording device according to an embodiment of the present disclosure.

Hereinafter, the present disclosure will be described based on embodiments. A recording device 10 is, for example, a multifunction machine. The recording device 10 has a plurality of functions including a scan function, a copy function, and a print function. Note that the recording device 10 may have a facsimile function.

In the drawings, the same members are denoted by the same reference numerals, and repeated descriptions will be omitted. Note that, in the present specification, "the same", "identical", and "simultaneously" refer to being exactly the same, and also include a case of being the same in consideration of measurement errors, a case of being the same in consideration of manufacturing variations of members, and a case of being the same within a range that does not impair functions. Thus, for example, "both dimensions are the same" means that a dimensional difference between the two dimensions is within ±10%, more preferably within ±5%, and particularly preferably within ±3% of one dimension in consideration of measurement errors and manufacturing variations of members.

In each drawing, it is assumed that the recording device 10 is placed on a horizontal installation surface. In a Z-axis orthogonal to the installation surface of the recording device 10, the recording device 10 side with respect to the installation surface is a +Z direction side, the opposite side is a −Z direction side, and two axes orthogonal to the Z-axis are an X-axis and a Y-axis, respectively. In addition, directions parallel to the X-axis, the Y-axis, and the Z-axis are referred to as an X-axis direction, a Y-axis direction, and a Z-axis direction, respectively. The X-axis direction includes both the +X direction and the −X direction. The Y-axis direction includes both the +Y direction and the −Y direction. The Z-axis direction includes both of the +Z direction and the −Z direction.

The X-axis direction is a depth direction when the recording device 10 is viewed from the front surface thereof. Additionally, a X-axis direction is a width direction of a medium M. In addition, the X-axis is a width direction of a recording unit 20 to be described below. Further, the front surface of the recording device 10 is a surface on a side where an operation unit 14 operated by a user to give an instruction to the recording device 10 is located.

1. First Embodiment

As illustrated in FIG. 1, the recording device 10 is, for example, a multifunction machine. The recording device 10 includes a device main body 11 having a rectangular parallelepiped shape. The recording device 10 includes a printing unit 12 constituted by the device main body 11 and an image reading unit 13 disposed above the printing unit 12. The device main body 11 includes a transport path T (see FIG. 2) for transporting the medium M such as paper.

The image reading unit 13 is configured to be able to read an image of a document D. The image reading unit 13 includes a reading unit 13A that reads the document D and an automatic document feeding unit 13B disposed above the reading unit 13A. The automatic document feeding unit 13B feeds the document D placed on a document tray 13C to the reading unit 13A. The reading unit 13A reads the document D and discharges the read document D to the discharge tray 13D. In addition, the reading unit 13A also has a flat-bed reading function of reading the document D that is set on a document table which is exposed when the automatic document feeding unit 13B also serving as a document table cover is opened.

The recording device 10 includes an operation unit 14 in a device main body 11. The operation unit 14 includes a display unit 14A constituted by a touch panel. The user can give an instruction to the recording device 10 by performing a touch operation on the display unit 14A. Note that the operation unit 14 may be configured to include an operation button.

The recording device 10 includes a cassette 15 capable of accommodating a plurality of media M. The cassette 15 is provided in one stage or a plurality of stages, for example, four stages. The cassette 15 is detachably inserted into a lower portion of the device main body 11 by sliding in the X-axis direction. For example, the media M having different sizes or different types are accommodated in the plurality of cassettes 15. The cassette 15 includes a handle 15A on which the user can hook his or her finger when pulling out the cassette 15.

The recording device 10 includes, as a base frame, a front frame 11A at an end portion of the base frame in the +X direction and a rear frame 11B at an end portion of the base frame in the −X direction. The front frame 11A and the rear frame 11B are formed of a metal material. A motion unit 30 to be described below is fixed to the front frame 11A and the rear frame 11B to configure a base body of the recording device 10. The housing of the recording device 10 is formed by attaching an exterior member to the base body of the recording device 10.

The recording device 10 includes a first door 16 and a plurality of cover doors 17 on a side surface on the −Y direction side of the device main body 11. The first door 16 and the cover door 17 constitute a part of the exterior member. The first door 16 and the cover door 17 can be opened and closed between an open state where the transport path T (see FIG. 2) is exposed and a closed state where the transport path T is covered. The first door 16 and the cover door 17 respectively include handles 16A and 17A for a user to perform opening and closing operations. The first door 16 includes a feed tray 16T on which the media M can be placed. The feed tray 16T is attached to the first door 16 so as to be openable and closable. The feed tray 16T includes a handle 16B for a user to perform opening and closing operations.

Figure 2:
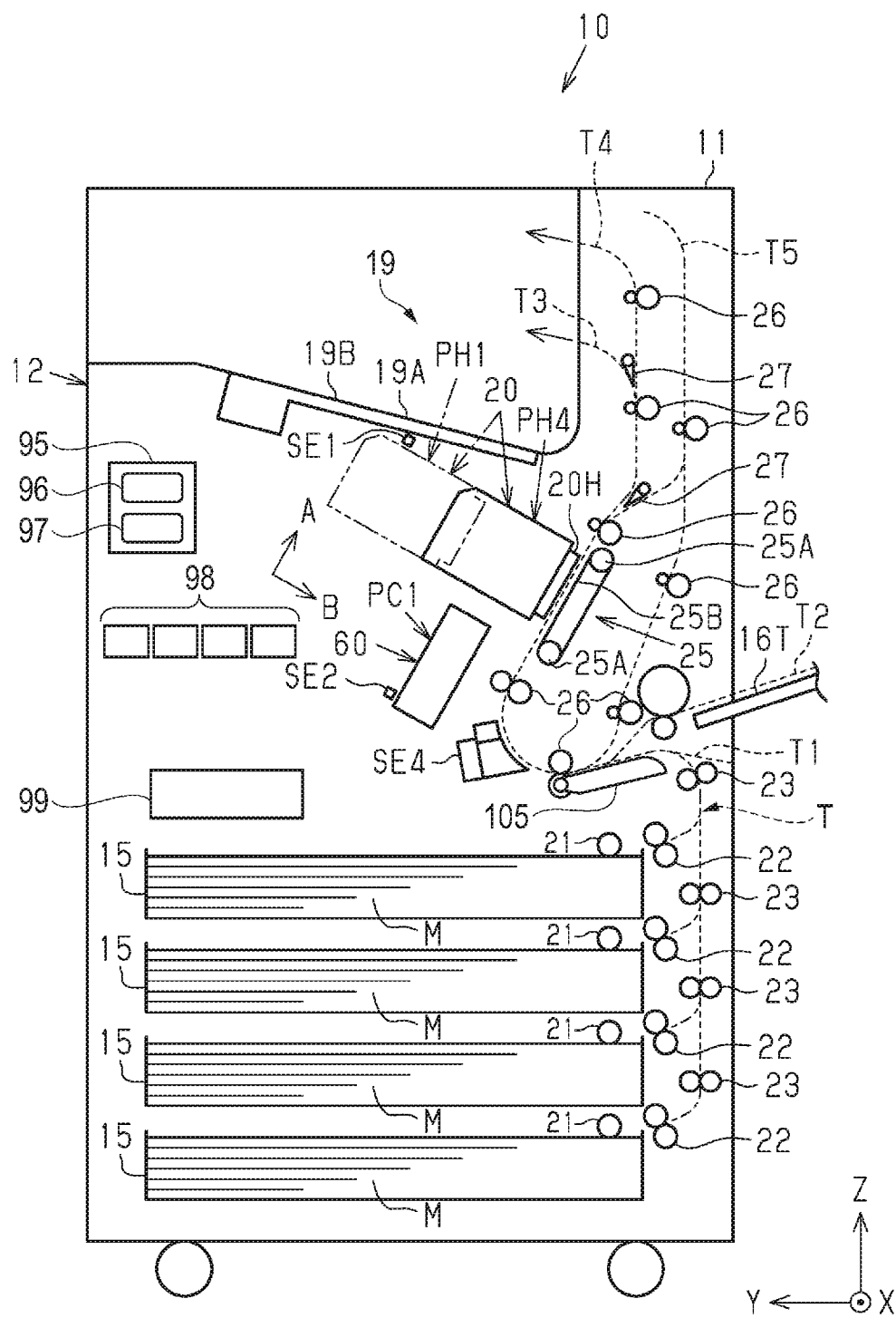
FIG. 2 is a schematic front view illustrating an internal configuration of the recording device.

As illustrated in FIGS. 1 and 2, the recording device 10 includes a recording unit 20 that performs recording on the medium M (see FIG. 2) in the device main body 11. For example, the recording unit 20 performs recording on the medium M fed from the cassette 15 and the medium M fed from the feed tray 16T. A liquid accommodation portion 98 (see FIG. 2) that accommodates ink, which is an example of a liquid, is accommodated in the device main body 11. The recording unit 20 performs recording on the medium M using a liquid such as ink supplied from the liquid accommodation portion 98.

The recording device 10 includes a second door 18D on a side surface on the +X direction side of the device main body 11. The second door 18D constitutes a part of the exterior member. The second door 18D can take an open state (see FIG. 14) where the liquid accommodation portion 98, a waste liquid accommodation portion 99 to be described later, an accommodation portion 600 to be described later, or a regulating member 500 accommodated in the accommodation portion 600 can be accessed, and a closed state (see FIG. 1) where the liquid accommodation portion 98, the waste liquid accommodation portion 99, the accommodation portion 600, or the regulating member 500 accommodated in the accommodation portion 600 is covered. The closed state of the second door 18D can also be referred to as a state where the liquid accommodation portion 98, the waste liquid accommodation portion 99, the accommodation portion 600, or the regulating member 500 accommodated in the accommodation portion 600 cannot be accessed. The second door 18D is an example of an opening/closing cover.

The recording device 10 includes a discharge portion 19 between the device main body 11 and the image reading unit 13. The discharge portion 19 includes a discharge tray 19A constituting a bottom portion thereof. The discharge tray 19A is a member formed in a plate shape and includes a placement surface 19B on which the discharged medium M is placed. The discharge tray 19A is inclined at a predetermined angle in a direction in which a downstream in the discharge direction in which the medium M having been subjected to recording is discharged is higher than an upstream. In addition, the discharge tray 19A is disposed at a position in the +Z direction of the recording unit 20 in the Z direction.

As illustrated in FIG. 2, the recording device 10 includes the transport path T through which the medium M having been subjected to recording by the recording unit 20 is transported. Note that, in FIG. 2, each component of the recording device 10 is illustrated in a simplified manner. The medium M is transported through the transport path T indicated by a dashed line in FIG. 2. The AB coordinate system shown on a YZ plane is an orthogonal coordinate system. An A direction is a direction intersecting the X-axis direction. The A direction is a transport direction of the medium M in a region facing a head 20H of the recording unit 20 in the transport path T. In the following description, an upstream direction of the A direction will be referred to as a −A direction, and a downstream direction will be referred to as a +A direction.

In the present embodiment, the A direction is a direction inclined such that the +A direction is located in the +Z direction with respect to the −A direction. Specifically, the A direction is inclined in a range of 50 degrees to 70 degrees with respect to the horizontal direction, and more specifically, the A direction is inclined at approximately 60 degrees. In this manner, at a recording position PH4 where recording is performed by the recording unit 20, the transport direction of the medium M is an inclined direction that intersects both the horizontal direction and the Z-axis direction.

Figure 12:
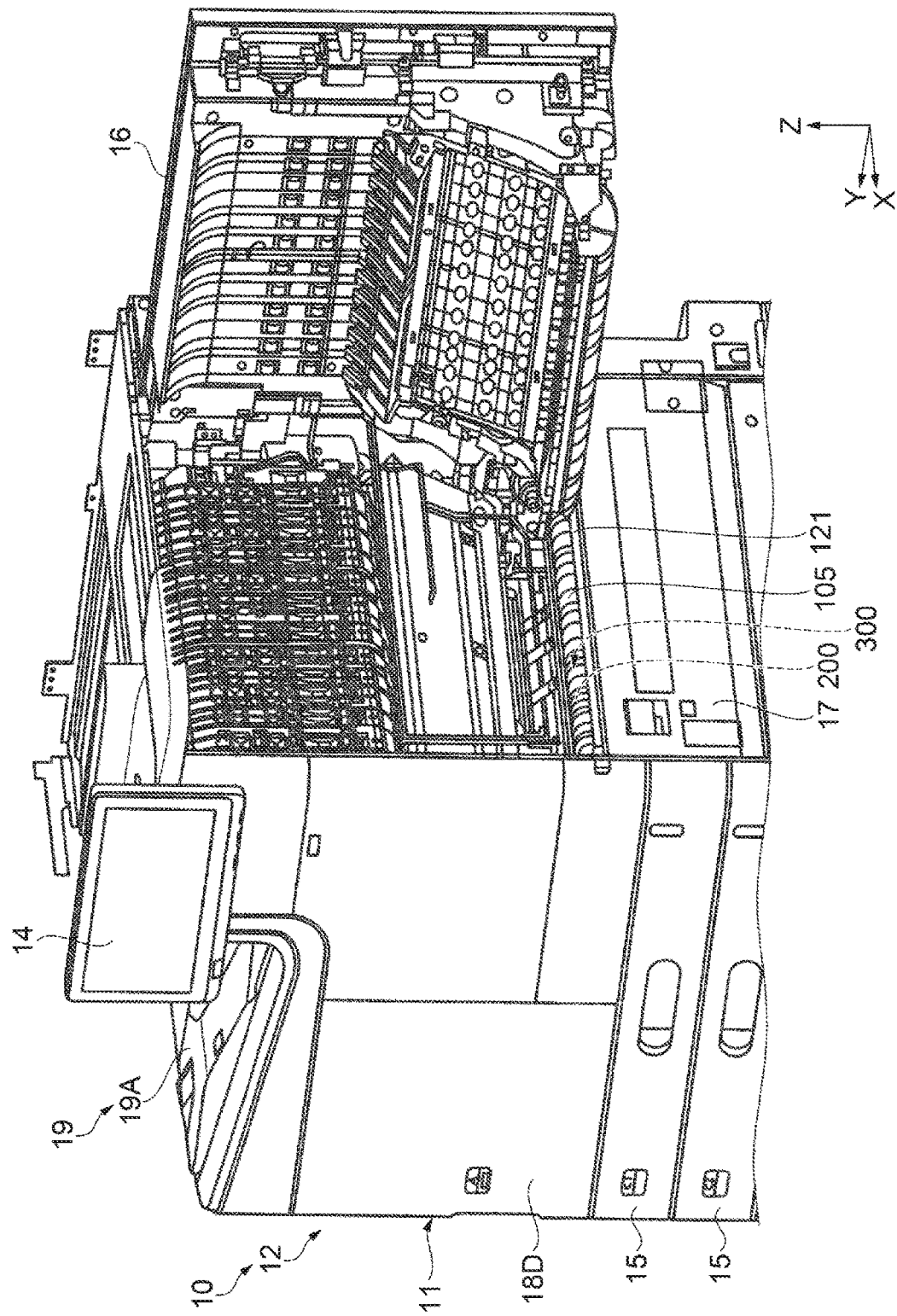
FIG. 12 is a partial perspective view of the recording device when a first door is in an open state.
Figure 13:
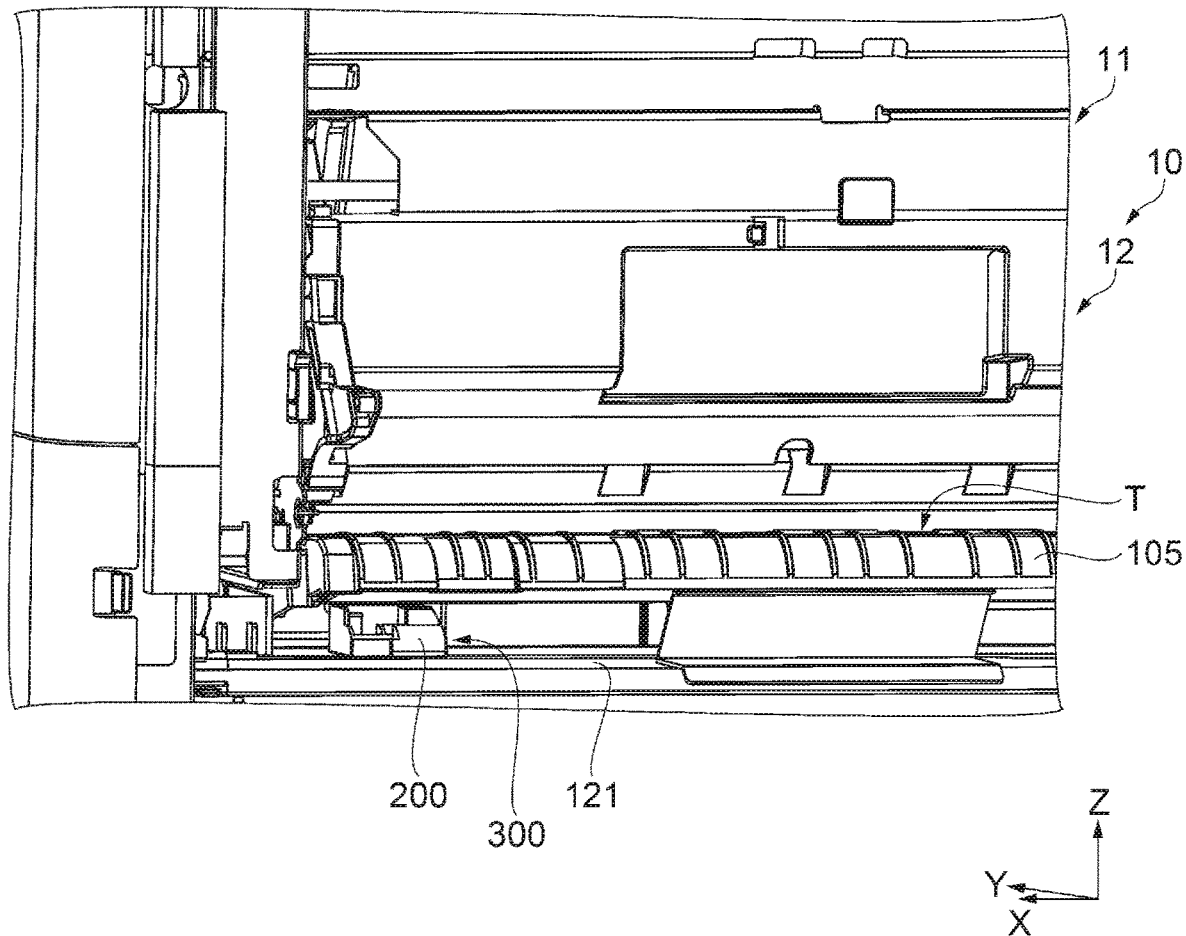
FIG. 13 is a partial perspective view of the recording device in which a transport path forming member is located at a transport position.

In the transport path T, a transport path T1 extending from an external device and a transport path T2 extending from the feed tray 16T provided in the device main body 11 join together. As illustrated in FIGS. 2, 12, and 13, the recording device 10 includes a transport path forming member 105 at a position where the transport path T1 and the transport path T2 join together. As illustrated in FIGS. 12 and 13, the transport path forming member 105 is disposed on the +Z direction side of a frame 121 extending in the X-axis direction. The frame 121 is a plate-shaped metal member that is disposed in the device main body 11 and couples the front frame 11A and the rear frame 11B.

Note that the frame 121 is provided with an accommodation portion 300 for accommodating a regulating member 200 to be described later. From this, it can be said that the first door 16 can take an open state where the accommodation portion 300 can be accessed and a closed state where the accommodation portion 300 cannot be accessed.

The transport path forming member 105 is disposed in the device main body 11 so as to be rotatable about a rotation axis, which is not illustrated in the drawing, in the X-axis direction. The transport path forming member 105 is displaceable between a transport position TP when the first door 16 is in a closed state and a separation position SP when the first door 16 is in an open state.

As illustrated in FIG. 2, the transport position TP is a position where the transport path forming member 105 is located along the transport path T and the medium M can be transported. The transport path forming member 105 at the transport position TP does not cover the accommodation portion 300 or the regulating member 200 accommodated in the accommodation portion 300.

The separation position SP is a position separated from the transport position TP in the −Z direction. As illustrated in FIG. 12, the transport path forming member 105 at the separation position SP covers the accommodation portion 300 or the regulating member 200 accommodated in the accommodation portion 300. Thus, when the first door 16 is in an open state, the transport path forming member 105 is located at the separation position SP. For this reason, the regulating member 200 accommodated in the accommodation portion 300 cannot be visually recognized when the first door 16 is in an open state. For example, when a service man accesses the accommodation portion 300 or the regulating member 200 accommodated in the accommodation portion 300, the first door 16 is opened, and as illustrated in FIG. 13, the transport path forming member 105 is displaced from the separation position SP to a position where the accommodation portion 300 and the regulating member 200 are not covered, for example, the transport position TP.

As illustrated in FIG. 2, at positions along the transport path T, a plurality of pickup rollers 21 that transport media M accommodated in the plurality of cassettes 15, a plurality of transport roller pairs 22, 23, and 26, a transport unit 25, a plurality of flaps 27, and a sensor SE4 that detects the widths of the media M in the X direction are disposed. The transport unit 25 supports a portion of the medium M at a recording position facing the recording unit 20 and transports the medium M. The flap 27 has a function of switching a path through which the medium M is transported. The pickup roller 21 is driven by a feeding motor (not illustrated). In addition the transport roller pairs 22, 23, and 26 and the transport unit 25 are driven by one or a plurality of transport motors (not illustrated).

The transport path T forms a curved portion in a region facing the sensor SE4, and extends in the A direction in a region downstream of the curved portion. On the downstream of the transport unit 25 in the transport path T, a transport path T3 and a transport path T4 toward the discharge portion 19, and an inversion path T5 that inverts the front and back of the medium M are provided. The discharge portion 19 is provided with a discharge tray, which is not illustrated in the drawing, in accordance with the transport path T4. Note that the inversion path T5 is a path through which the medium M on which recording on a first surface has been completed is carried in before recording on a second surface is performed when double-sided recording is performed. The medium M is inverted in the inversion path T5, and is transmitted to a recording position through the transport path T again in the same manner as when recording is performed on the first surface, whereby recording is performed on the second surface.

The transport unit 25 supports the medium M being transported. The transport unit 25 includes two pulleys 25A and an endless transport belt 25B wound around the two pulleys 25A. The medium M is transported to a position facing the recording unit 20 while being adsorbed to a belt surface of the transport belt 25B. As a method of adsorbing the medium M to the transport belt 25B, an air suction method, an electrostatic adsorption method, or the like can be adopted. In this manner, the transport belt 25B supports the medium M while adsorbing the medium M. The transport unit 25 is disposed to face the recording unit 20 in the B direction.

The recording unit 20 moves in the B direction which is a direction facing the transport unit 25. The recording unit 20 of the present embodiment reciprocates in the B direction inclined by a predetermined angle with respect to the horizontal plane. The recording unit 20 is an example of a moving portion MP that is movable in the B direction. The B direction is an example of a moving direction MD in which the recording unit 20 moves. The B direction is a moving direction when the recording unit 20 moves forward and backward with respect to the transport unit 25. A direction in which the head 20H approaches the transport path T in the B direction is referred to as a +B direction, and a direction in which the head 20H moves away from the transport path T is referred to as a −B direction. The −B direction is a direction obliquely upward along a direction in which the head 20H moves away from the transport unit 25. The moving direction MD includes a −B direction and a +B direction opposite to the −B direction. The −B direction is an example of a first direction, and the +B direction is an example of a second direction.

The B direction is a direction in which the recording unit 20 is displaced, and is a direction including a component in the Z direction which is the height direction. In the present embodiment, the B direction is a direction inclined such that the −B direction is located in the +Z direction with respect to the +B direction, and is orthogonal to the A direction. In addition, the B direction is a direction intersecting the X-axis direction.

The recording unit 20 is configured to be movable between a retraction position PH1 indicated by an alternating two dots-dashed line in FIG. 2 and a recording position PH4 indicated by a solid line in FIG. 2. The recording unit 20 can move to a plurality of positions including at least the retraction position PH1 and the recording position PH4 by moving in the B direction. Since the moving direction of the recording unit 20 is a moving direction accompanied by the displacement of the recording unit 20 in the Z-axis direction and accompanied by the ascending and descending due to the movement of the recording unit 20, the moving direction of the recording unit 20 is also referred to as an ascending-descending direction. Note that the moving direction of the recording unit 20 is not limited to a direction forming a predetermined angle with respect to the horizontal direction and may be the horizontal direction or the Z-axis direction.

The recording unit 20 of the present embodiment ascends in the −B direction and descends in the +B direction. The B direction is orthogonal to a nozzle surface 20N. That is, a direction orthogonal to the nozzle surface 20N which is a surface on which nozzles N (see FIG. 9) in the head 20H open is an ascending-descending direction of the head 20H.

In a state where the recording unit 20 is located at the recording position PH4, the head 20H ejects a liquid such as ink to the medium M in a portion supported by the transport unit 25. Thereby, the recording unit 20 records information such as an image on the medium M. The recording device 10 includes a sensor SE1 capable of detecting the recording unit 20 at a standby position PH2 (see FIG. 6). The sensor SE1 is configured to be able to detect the recording unit 20 when the recording unit 20 is located at the standby position PH2. The sensor SE1 is, for example, a transmission-type photointerrupter. The sensor SE1 includes a light emitting unit such as an infrared LED and a light receiving unit such as a photo-IC. The sensor SE1 is provided in the recording device 10 so that a detection target portion (not illustrated) provided in the recording unit 20 is positioned between the light emitting unit and the light receiving unit. The sensor SE1 is an example of a detection portion DP.

The recording unit 20 includes a head 20H that ejects ink, which is an example of a liquid. The head 20H is disposed to face the transport unit 25 in the B direction at the recording position PH4, and records information on the medium M by ejecting ink from the head 20H. The recording unit 20 is a line head configured such that the head 20H that ejects ink covers the entire region in the X-axis direction which is the width direction of the medium M.

In addition, the recording unit 20 performs recording by a line recording method in which recording can be performed on the entire region in the width direction of the medium M without being accompanied by movement in the X-axis direction which is the width direction of the medium M. The X-axis direction is an example of the width direction of the medium M and is an example of the width direction of the recording unit 20. However, the recording unit 20 is not limited thereto, and may be a serial recording method in which the recording unit 20 is mounted on a carriage and ejects ink while moving in the X-axis direction. That is, any recording method of the recording unit 20 may be used as long as the recording device 10 is configured to include a first maintenance unit 60.

The recording device 10 includes the first maintenance unit 60 that performs maintenance on the nozzle surface 20N of the recording unit 20 in the device main body 11. As illustrated in FIGS. 5 to 8, the first maintenance unit 60 is movable to a capping position PC2 (see FIG. 8) and a non-capping position PC1 (see FIG. 5) retracted from the capping position PC2 in the −A direction. The recording unit 20 is movable to a maintenance position PH3 (see FIG. 8) separated from the recording position PH4 by a predetermined distance in the −B direction. The first maintenance unit 60 performs maintenance on the head 20H located at the maintenance position PH3.

The first maintenance unit 60 is configured to be movable to the non-capping position PC1 and the capping position PC2 by moving in the A direction. The first maintenance unit 60 of the present embodiment reciprocates in the A direction inclined by a predetermined angle with respect to the horizontal plane. The first maintenance unit 60 is an example of the moving portion MP that is movable in the A direction. The A direction is an example of the moving direction MD in which the first maintenance unit 60 moves. The moving direction MD includes the −A direction and the +A direction opposite to the −A direction. The −A direction is an example of a first direction, and the +A direction is an example of a second direction.

The first maintenance unit 60 moves from the non-capping position PC1 in the +A direction and performs maintenance on the head 20H at the capping position PC2. When the recording device 10 is performing a recording operation, the first maintenance unit 60 stands by at the non-capping position PC1.

The recording device 10 includes a sensor SE2 capable of detecting the first maintenance unit 60 located at the non-capping position PC1. The sensor SE2 is configured to be able to detect the first maintenance unit 60 at the non-capping position PC1. The sensor SE2 is, for example, a transmission-type photo interrupter. The sensor SE2 includes a light emitting unit such as an infrared LED and a light receiving unit such as a photo-IC. The sensor SE2 is provided in the recording device 10 such that a detection target portion (not illustrated) provided in a cap portion 62 is positioned between the light emitting unit and the light receiving unit. The sensor SE2 is an example of the detection portion DP.

The first maintenance unit 60 is detected by the sensor SE2 by being retracted from the capping position PC2 in the −A direction. The non-capping position PC1 detected by the sensor SE2 is also a reference position when the position of the first maintenance unit 60 on a movement path is measured. Note that details of the maintenance performed by the first maintenance unit 60 will be described later.

In addition, as illustrated in FIG. 2, the recording device 10 includes, in the device main body 11, a control unit 95 that controls the operation of each unit of the recording device 10, a liquid accommodation portion 98 that accommodates a liquid such as ink, and a waste liquid accommodation portion 99 that accommodates ink or the like as waste liquid. The liquid accommodation portion 98 supplies ink to the head 20H via a tube which is not illustrated in the drawing.

Figure 3:
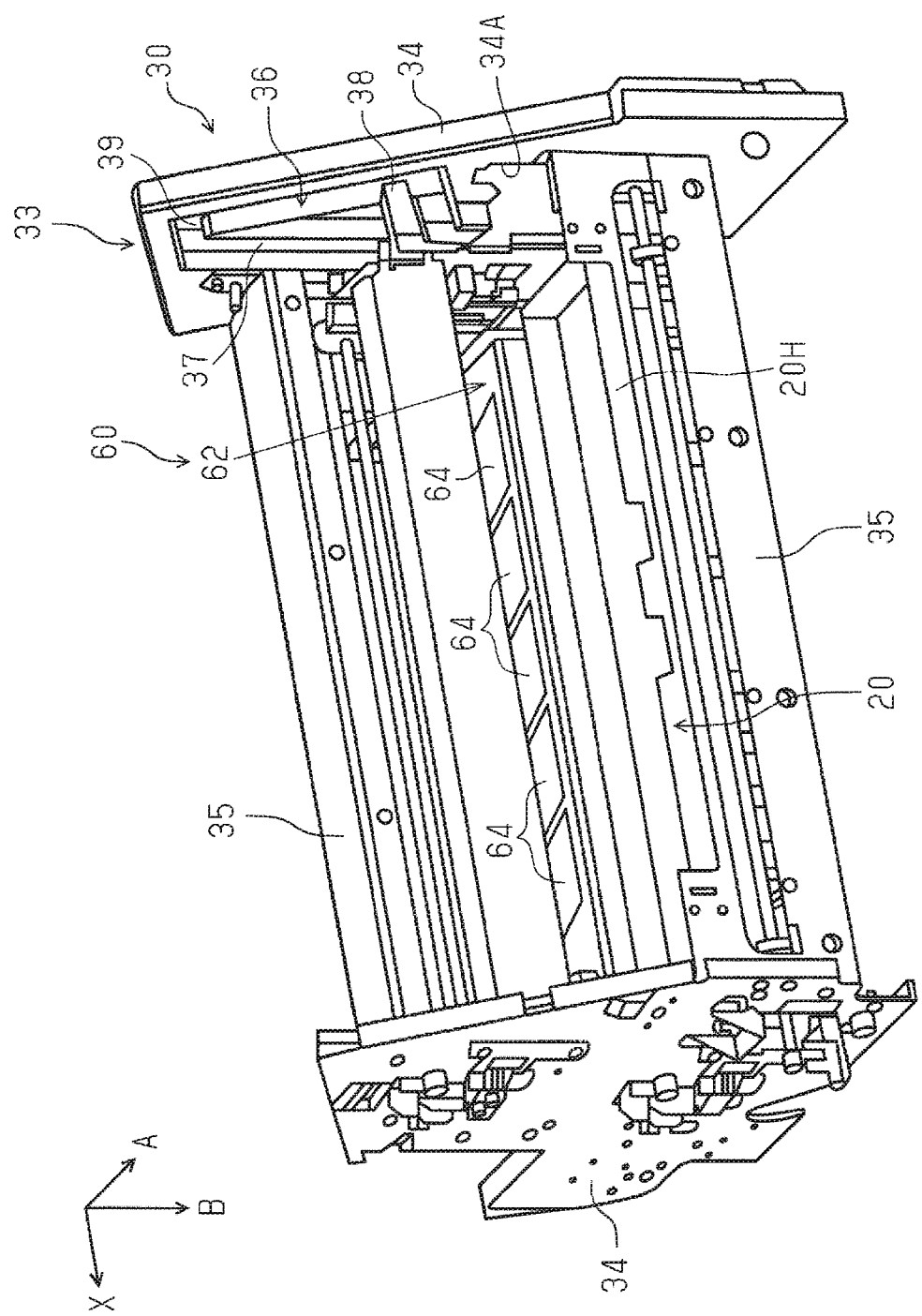
FIG. 3 is a perspective view illustrating a motion unit.

Next, a configuration of a motion unit 30 will be described. As illustrated in FIG. 3, the recording device 10 includes the motion unit 30 in the device main body 11. The motion unit 30 is a unit in which a first movement mechanism 31 (see FIGS. 5 to 8) that moves the recording unit 20, a second movement mechanism 70 (see FIGS. 4 to 8) that moves the first maintenance unit 60, and a third movement mechanism 83 (see FIGS. 10 and 11) that moves the second maintenance unit 80 are integrally assembled.

Figure 4:
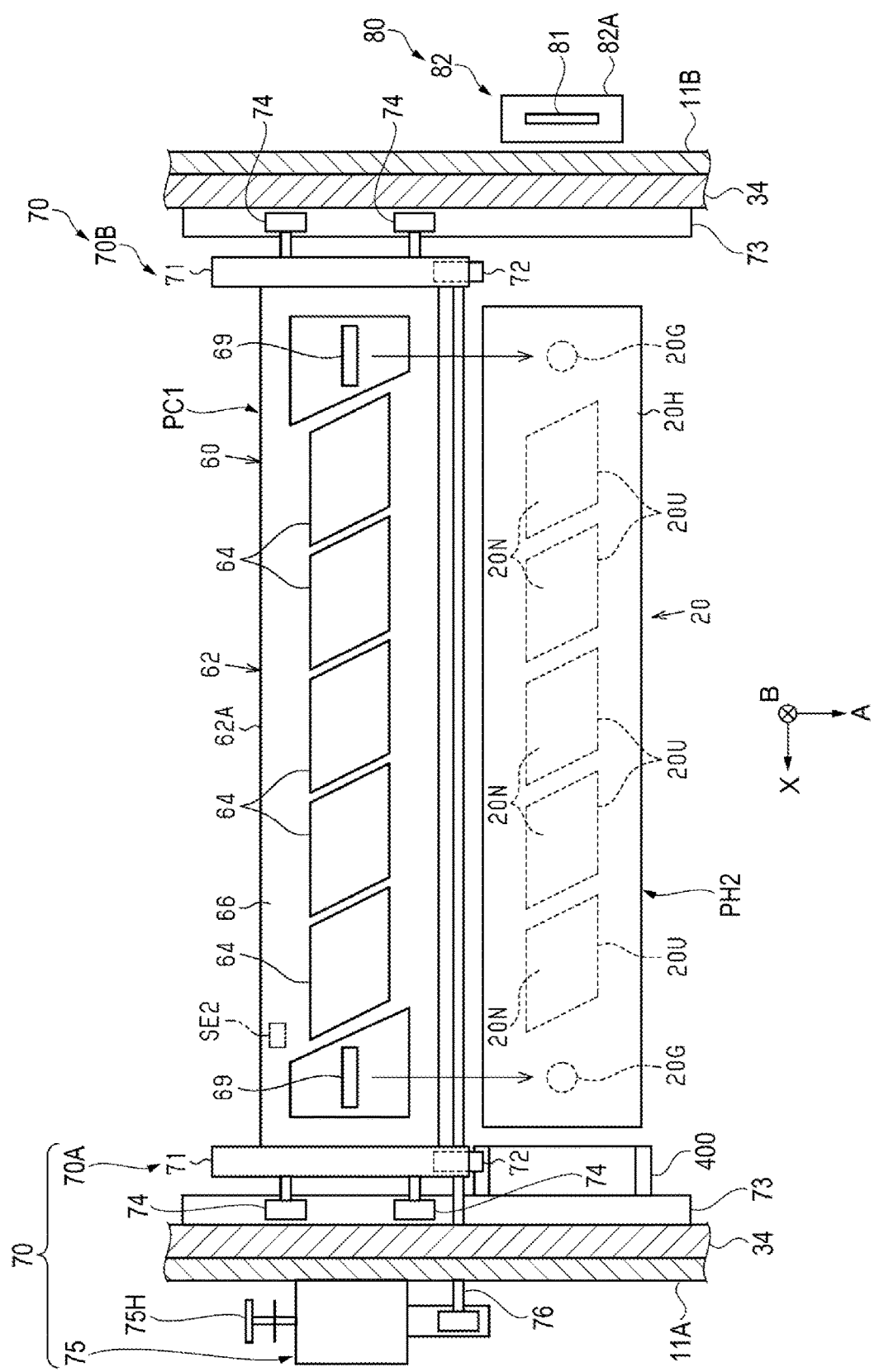
FIG. 4 is a schematic plan view of a recording unit and a cap portion when viewed from a −B direction.

The first movement mechanism 31 moves the recording unit 20 in the B direction intersecting the nozzle surface 20N (see FIG. 4). The nozzle surface 20N is a surface facing the transport path T in the head 20H. The second movement mechanism 70 moves the first maintenance unit 60 in the A direction along the nozzle surface 20N. The control unit 95 controls operations of the first movement mechanism 31 and the second movement mechanism 70. The motion unit 30 supports the recording unit 20 so as to be movable in the B direction, supports the first maintenance unit 60 so as to be movable in the A direction, and supports the second maintenance unit 80 so as to be movable in the X-axis direction.

That is, the first maintenance unit 60 is movable in the A direction and performs first maintenance on the head 20H. The second maintenance unit 80 is movable in the X-axis direction and performs second maintenance different from the first maintenance on the head 20H. Note that the moving direction of the second maintenance unit 80 of the present embodiment is the X-axis direction, but may be a direction other than the X-axis direction as long as the second maintenance can be performed without interfering with the first maintenance unit 60.

The motion unit 30 includes a main body frame 33 constituting a main body portion. The main body frame 33 includes a pair of side frames 34 facing each other at a predetermined distance in the X-axis direction, and a plurality of horizontal frames 35 coupling the pair of side frames 34.

As illustrated in FIG. 3, each of the pair of side frames 34 is configured as a side plate along an A-B plane. One side frame 34 is disposed on the +X direction side, and the other side frame 34 is disposed on the −X direction side. For example, a through-hole 34A through which the second maintenance unit 80 moves is formed in the other side frame 34.

Each of guide members 36 that guide the recording unit 20 so as to be movable in the B direction is assembled to each of two inner surfaces that the pair of side frames 34 face. The two guide members 36 are disposed substantially symmetrically with respect to the center of the main body frame 33 in the X direction.

Figure 5:
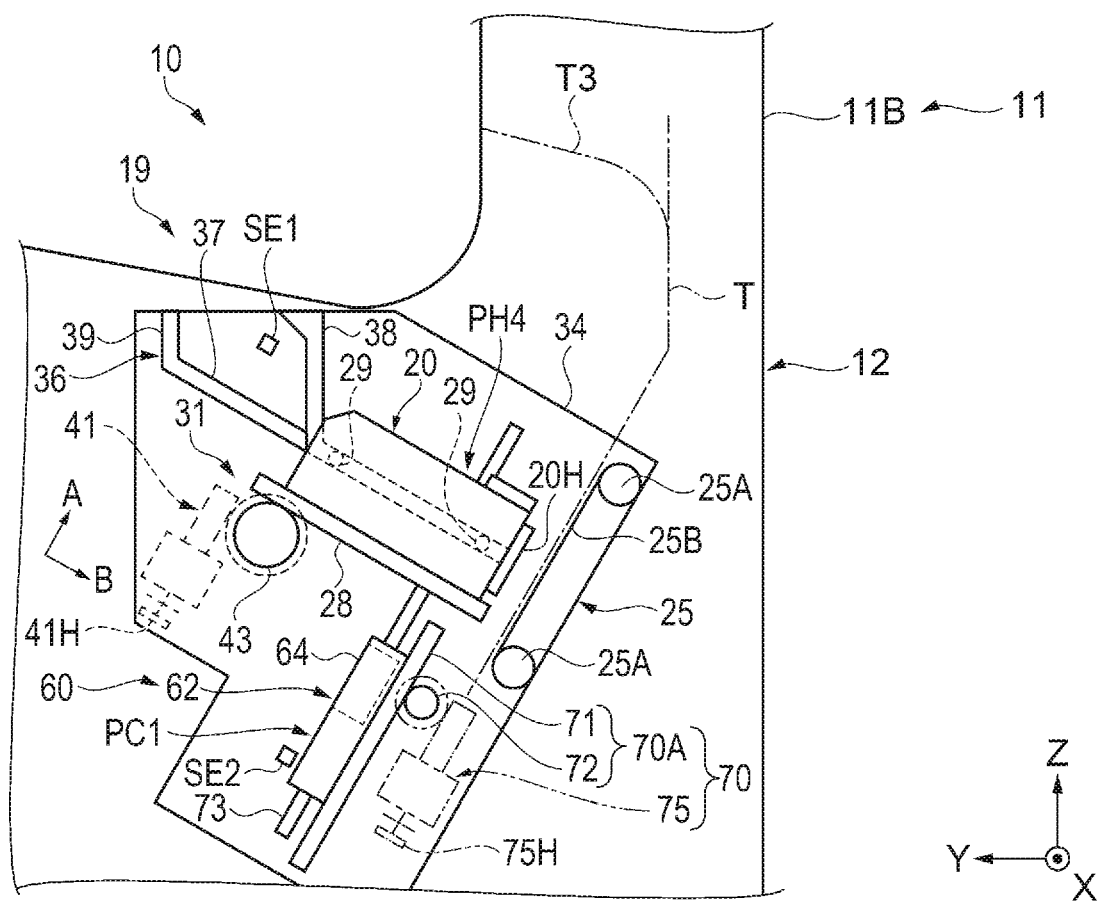
FIG. 5 is a schematic front view illustrating the recording unit located at a recording position and a cap portion located at a non-capping position.

As illustrated in FIGS. 3 and 5, the guide member 36 includes a guide rail 37 extending in the B direction and guide rails 38 and 39 branching off from a portion in the middle of the guide rail 37 and extending in the Z direction. Each of the guide rails 37, 38, and 39 is a groove-shaped rail that opens toward the center of the main body frame 33 in the X direction, and a guide roller 29 (see FIGS. 5 to 8 and FIG. 19) of the recording unit 20 is inserted into the groove. The guide rail 37 is an example of a guide portion that guides the recording unit 20 in the B direction.

The recording unit 20 is guided to the guide rail 37 to move to one or more positions separated from the transport unit 25 with respect to the recording position PH4. Specifically, the recording unit 20 can move to a plurality of stopping positions such as the retraction position PH1, the recording position PH4, the standby position PH2, and the maintenance position PH3 by moving along the guide rail 37.

When the recording unit 20 is located at the retraction position PH1, the recording unit 20 can be guided to the guide rails 38 and 39 for replacement. In the recording device 10, an operator such as a user or a service man can remove the recording unit 20 from the device main body 11 for maintenance or replace the recording unit 20 with a new one. When the user operates the operation unit 14 (see FIG. 1) to perform an operation of notifying the recording device 10 of replacement of the recording unit 20, the control unit 95 moves the recording unit 20 to the retraction position PH1 which is also a replacement position. Thereby, the operator can replace the recording unit 20 through an inlet that is exposed when the discharge tray 19A is removed.

Figure 8:
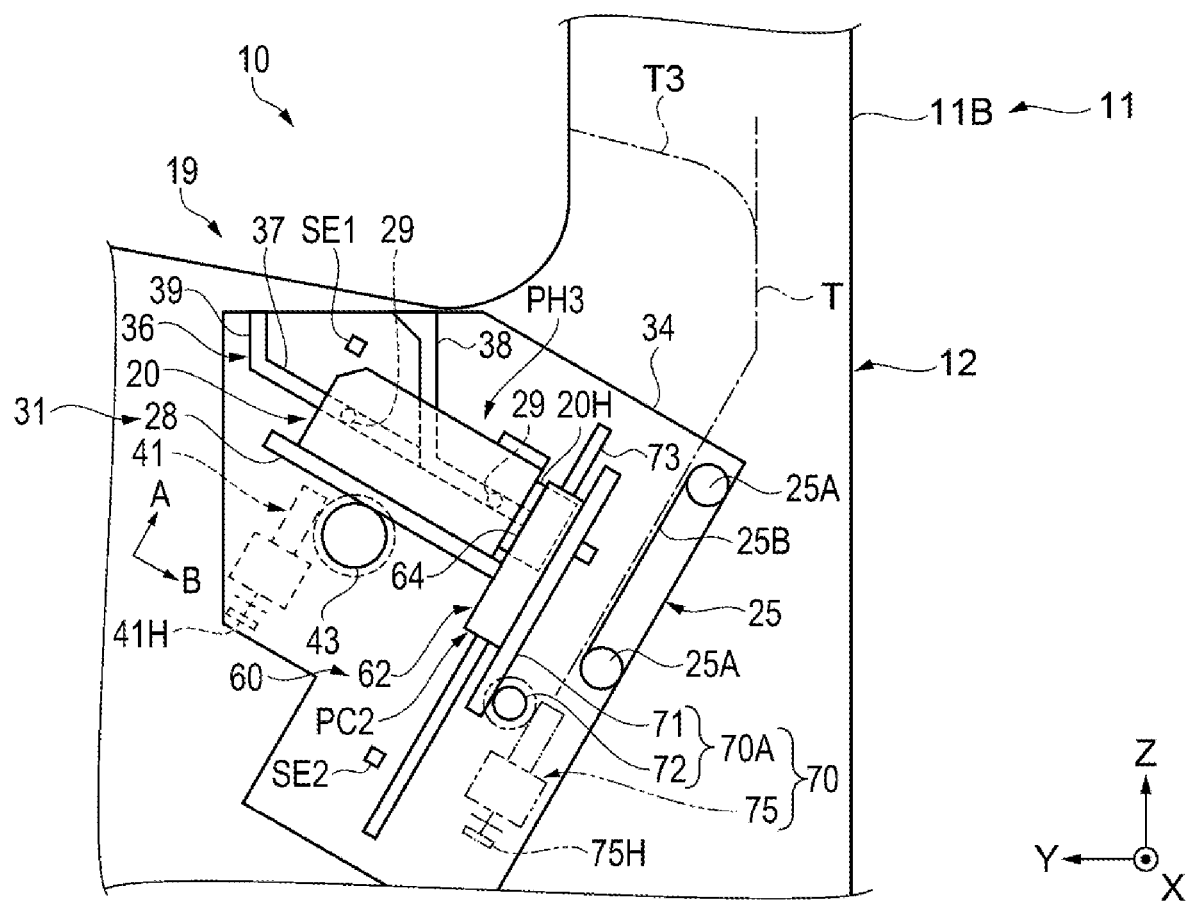
FIG. 8 is a schematic front view illustrating the recording unit located at a maintenance position and the cap portion located at a capping position.
Figure 9:
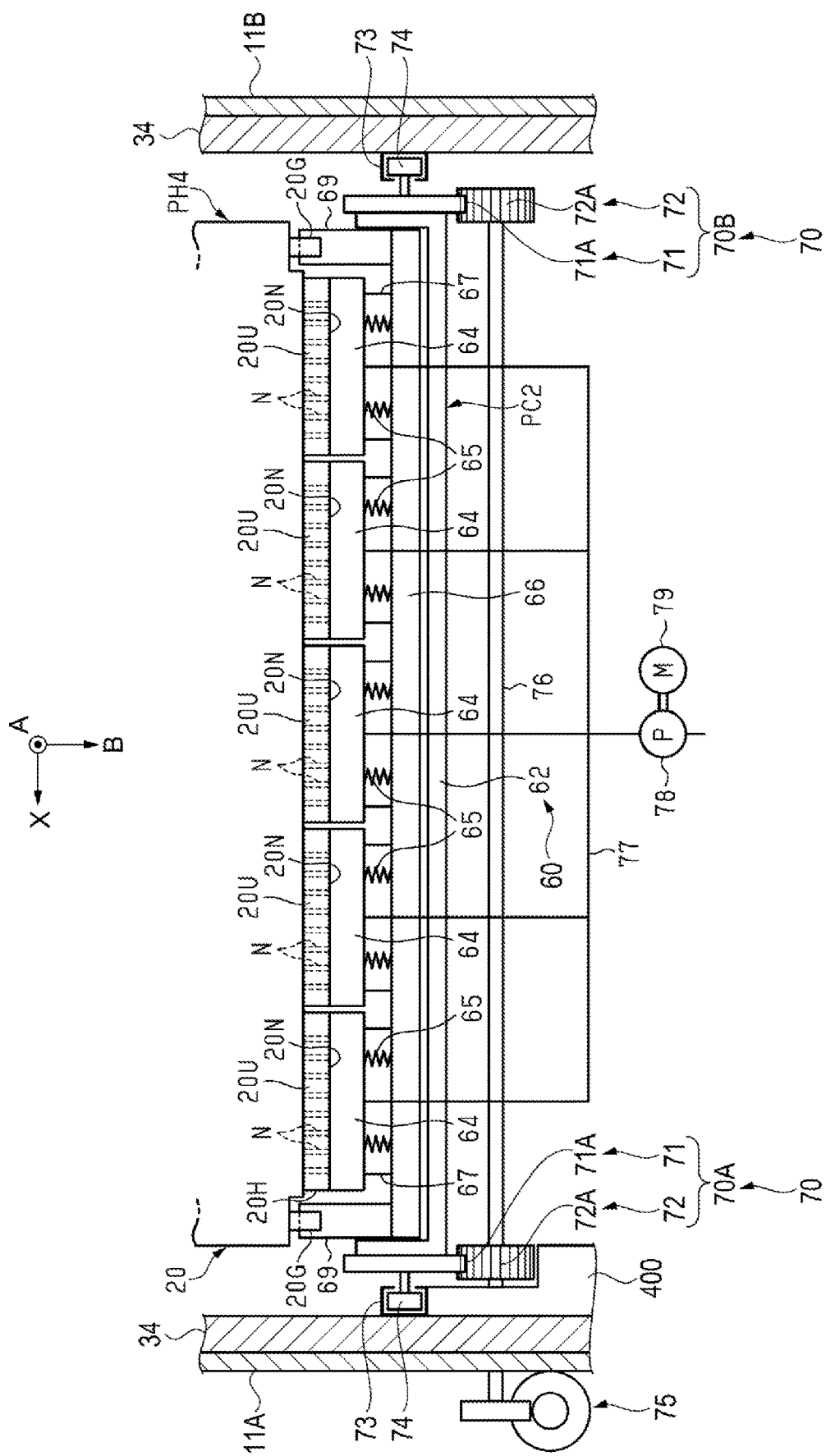
FIG. 9 is a schematic side view of the recording unit and the cap portion in a capping state when viewed from a +A direction.

The first maintenance unit 60 performs cleaning of the head 20H as the first maintenance. As illustrated in FIGS. 4, 8, and 9, the first maintenance unit 60 of the present embodiment includes a cap portion 62 that cleans the head 20H. The cap portion 62 includes a plurality of caps 64 on a cap base 62A, the caps 64 capable of covering the nozzles N of the head 20H. As illustrated in FIGS. 8 and 9, in a capping state where the caps 64 contact the head 20H and cover the nozzles N, the cap portion 62 forcibly discharges waste liquid such as thickened ink in the nozzles N or ink containing bubbles. Thereby, the nozzles N are cleaned by the cap portion 62. Clogging of the nozzles N is prevented or eliminated by this cleaning.

Figure 10:
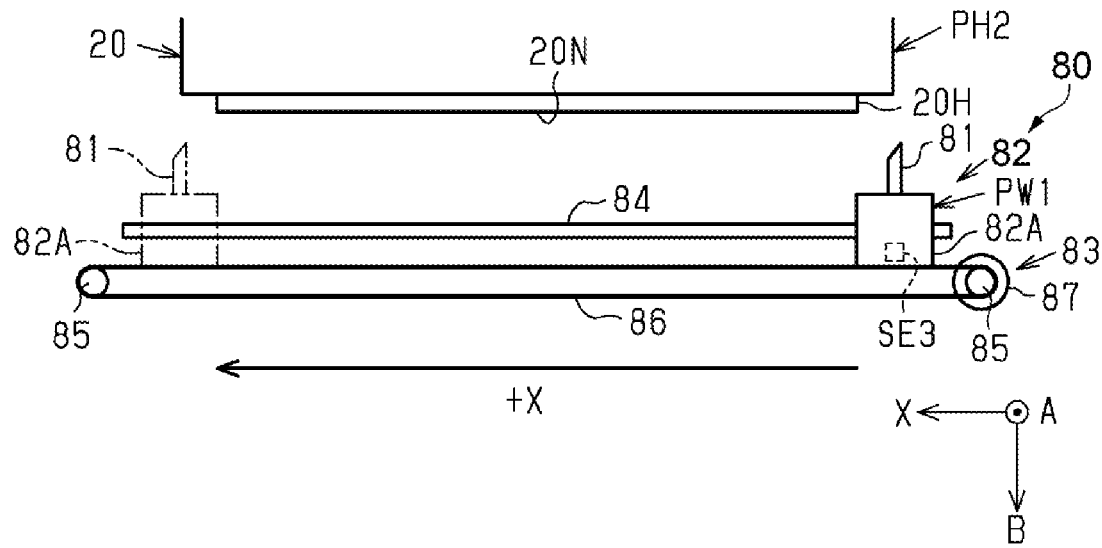
FIG. 10 is a schematic side view illustrating a configuration of a wiper portion and a wiping operation.
Figure 11:
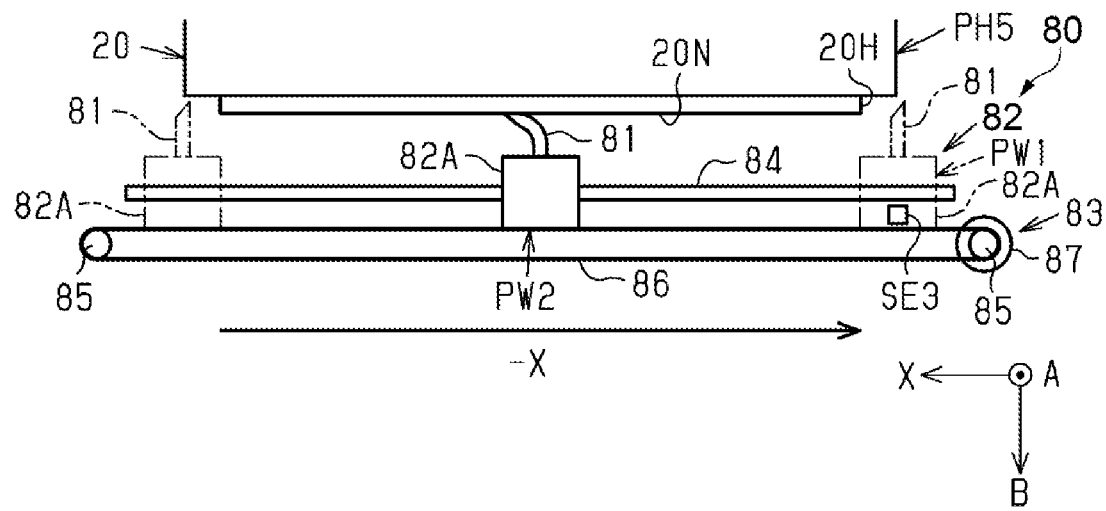
FIG. 11 is a schematic side view illustrating a wiping operation of the wiper portion.

The second maintenance unit 80 performs maintenance of the head 20H. As illustrated in FIGS. 10 and 11, the second maintenance unit 80 of the present embodiment is a wiper portion 82 that performs wiping the nozzle surface 20N of the head 20H as the second maintenance. The wiper portion 82 includes a wiper member 81, and wipes the nozzle surface 20N of the head 20H with the wiper member 81.

As illustrated in FIG. 4, the head 20H is configured by arranging a plurality of unit heads 20U in the X-axis direction. The cap portion 62 includes a plurality of caps 64 arranged side by side in the X-axis direction at positions facing the plurality of unit heads 20U, and a cap holder 66 holding the plurality of caps 64. The cap 64 is opened on the −B direction side facing the head 20H.

In the cap portion 62, a pair of racks 71 fixed to both sides in the longitudinal direction of the cap holder 66 engage with a pinion 72. In other words, the cap portion 62 includes the pair of racks 71. A plurality of guide rollers 74 are attached to both side portions of the cap holder 66 in the longitudinal direction. The guide rollers 74 on both sides engage with guide rails 73 on both sides. When the guide roller 74 rotates and is guided to the guide rail 73, the cap portion 62 is movable in the A direction. The cap portion 62 at the non-capping position PC1 illustrated in FIG. 4 is detected by the sensor SE2.

In the cap holder 66 of the cap portion 62, a pair of engaged portions 69 for positioning protrude at positions on both sides sandwiching the plurality of caps 64 in the X-axis direction. The pair of engaged portions 69 protrude to a position higher than the upper surface of the cap 64 in the −B direction. In a process in which the cap portion 62 moves from the non-capping position PC1 illustrated in FIG. 4 to the capping position PC2 in the +A direction indicated by an arrow in the drawing, the pair of engaged portions 69 engage with a pair of pin portions 20G on the recording unit 20 side. Thereby, the cap portion 62 is positioned at the capping position PC2 (see FIG. 8) in the A direction.

Next, movement paths and movement operations of the recording unit 20 and the cap portion 62 will be described with reference to FIGS. 5 to 8. Note that the second maintenance unit 80 is omitted in FIGS. 5 to 8.

The recording unit 20 moves in the B direction to be disposed at the recording position PH4 (see FIG. 5), the standby position PH2 (see FIG. 6), the maintenance position PH3 (see FIG. 8), and the retraction position PH1 (see FIG. 2).

The recording position PH4 is the position of the recording unit 20 when recording is performed on the medium M. The maintenance position PH3 is the position of the recording unit 20 when the nozzle surface 20N is covered with the cap 64. That is, the maintenance position PH3 is the position of the recording unit 20 when capping with the cap 64 is performed. When recording is not performed, the recording unit 20 stands by in a state where capping with the cap 64 is performed.

The standby position PH2 is located in the −B direction with respect to the maintenance position PH3, and the standby position PH2 is a position retracted from the movement path of the cap portion 62. The standby position PH2 is also a reference position when the position of the recording unit 20 on the movement path is measured. A distance between the standby position PH2 and the maintenance position PH3 is short. For this reason, the recording unit 20 when the regulating member 500 to be described below is in a first locked state is detected by the sensor SE1 as the recording unit 20 located at the standby position PH2. On the other hand, the recording unit 20 when the regulating member 500 to be described below is in a second locked state is not detected by the sensor SE1. Note that, in FIGS. 6 and 7, the recording unit 20 located on the −B direction side with respect to the actual standby position PH2 is illustrated for the sake of description.

The retraction position PH1 is located on the −B direction side in which the recording unit 20 ascends with respect to the standby position PH2. In the present embodiment, the retraction position PH1 is also a replacement position when the recording unit 20 is replaced.

As illustrated in FIG. 5, the recording device 10 includes a first movement mechanism 31 that moves the recording unit 20 in the B direction intersecting the nozzle surface 20N. The first movement mechanism 31 is, for example, a rack and pinion system. In this example, the first movement mechanism 31 is configured to include, for example, a pinion 43 which is a driving gear, a rack 28 which is disposed in the recording unit 20, and an elevation driving unit 41 which is a driving source that rotates a rotation shaft (not illustrated) to which the pinion 43 is attached.

The length of the rack 28 is set to be longer than the length of one turn of the pinion 43. When the elevation driving unit 41 is driven, the recording unit 20 moves in the B direction via the first movement mechanism 31. The recording unit 20 moves in the B direction while being guided to the guide rail 37 extending in the B direction. The first movement mechanism 31 raises and lowers the recording unit 20 in the B direction.

The elevation driving unit 41 includes, for example, a worm gear mechanism including a worm wheel attached to the rotation shaft to which the pinion 43 is attached and a worm gear that rotates the worm wheel, and a driving motor in which the worm gear is attached to an output shaft. In addition, an operation portion 41H is provided at an end of the output shaft of the driving motor on the −A direction side. By rotating the operation portion 41H, the driving motor of the elevation driving unit 41 can be manually driven. The elevation driving unit 41 of the present embodiment is disposed at a position on the −X direction side of the rear frame 11B and on the +X direction side of an exterior member (not illustrated) disposed on the −X direction side of the rear frame 11B. For this reason, by removing the exterior member from the rear frame 11B, a service man can access the elevation driving unit 41.

A plurality of guide rollers 29 constituted by rollers are rotatably disposed on a side surface of the recording unit 20. The guide roller 29 is formed of, for example, a metal. Since the plurality of guide rollers 29 are guided to the guide rail 37, the recording unit 20 moves in the B direction along the guide rail 37. The guide roller 29 is an example of a guided portion that is guided to the guide rail 37.

The cap portion 62 is provided to be movable in the A direction which is the moving direction MD of the cap portion 62. The cap portion 62 is guided to the guide rail 73 extending in the A direction to reciprocate in the A direction.

The recording device 10 includes the second movement mechanism 70 that moves the cap portion 62 in the A direction along the nozzle surface 20N. The second movement mechanism 70 is a rack and pinion system. As illustrated in FIGS. 4 to 9 and FIG. 19, the second movement mechanism 70 is configured to include the racks 71 included in the cap portion 62, rack and pinion mechanisms 70A and 70B (see FIGS. 4 and 9) of the pinion 72 which is a driving wheel, and a first slide driving unit 75 which is a driving source of the pinion 72.

The first slide driving unit 75 of the present embodiment is disposed at a position on the +X direction side of the front frame 11A and on the −X direction side of an exterior member (not illustrated) disposed on the +X direction side of the front frame 11A. For this reason, the service man can access the first slide driving unit 75 by removing the exterior member from the front frame 11A. Note that, in FIGS. 5 to 8, the first slide driving unit 75 is indicated by an alternating two dots-dashed line for the sake of description.

The rack 71 may be formed of a metal or a resin material. As the resin material forming the rack 71, polyoxymethylene (POM), poly butylene terephthalate (PBT), or the like can be adopted. The length of the rack 71 is set to be longer than the length of one turn of the pinion 72. The second movement mechanism 70 moves the cap portion 62 in the A direction in which the rack 71 extends.

The first slide driving unit 75 includes, for example, a worm gear mechanism including a worm wheel attached to a rotation shaft 76 (see FIG. 4) to which the pinion 72 is attached and a worm gear that rotates the worm wheel, and a driving motor having an output shaft to which the worm gear is attached. In addition, an operation portion 75H is provided at an end of the output shaft of the driving motor on the −A direction side. By rotating the operation portion 75H, the driving motor of the first slide driving unit 75 can be manually driven.

The cap portion 62 can reciprocate in the A direction by the second movement mechanism 70. The cap portion 62 moves to a non-capping position PC1 (see FIGS. 5 and 6) and a capping position PC2 (see FIGS. 8 and 9) where the cap portion 62 faces the head 20H. The non-capping position PC1 is a position where the cap portion 62 stands by when the recording unit 20 is performing recording. The capping position PC2 is the position of the cap portion 62 when capping is performed to cover the nozzles N opened in the nozzle surface 20N of the head 20H.

Figure 7:
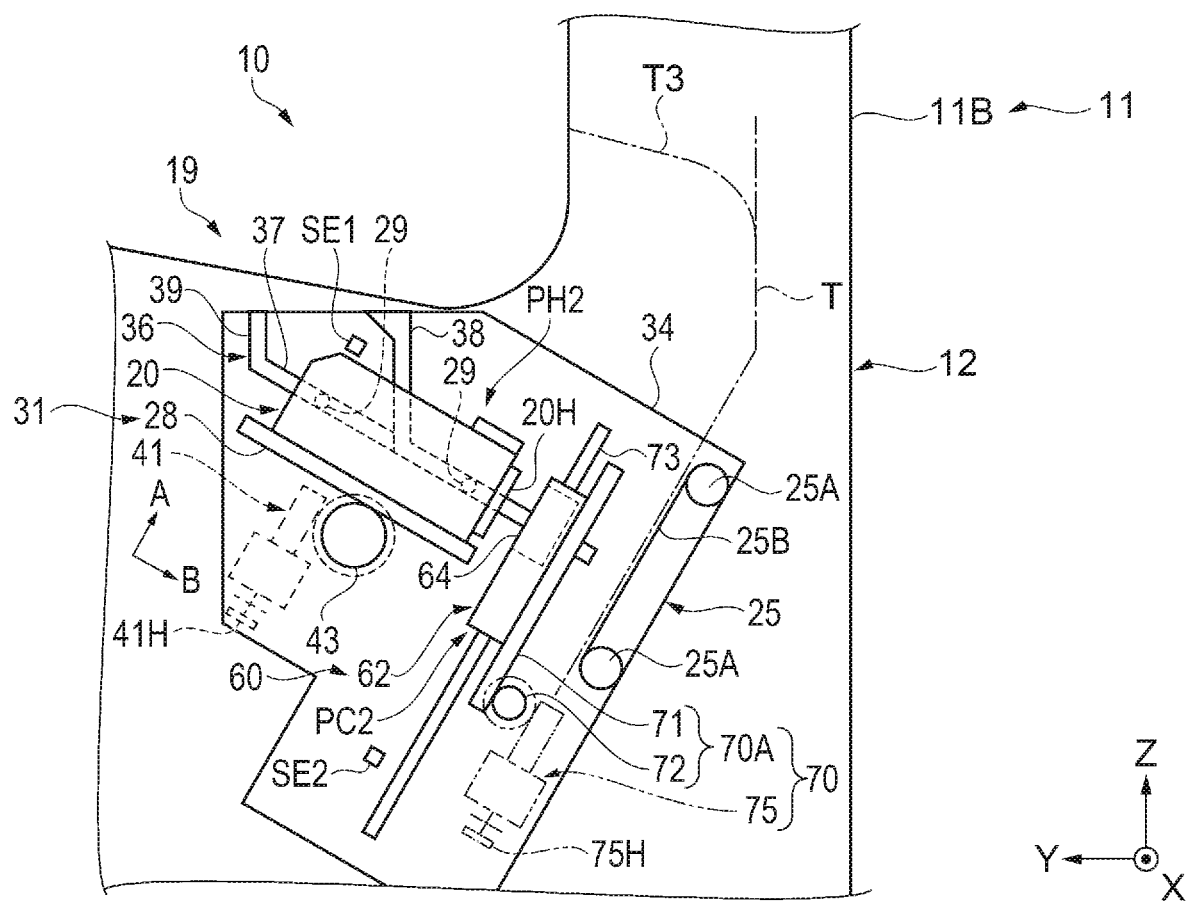
FIG. 7 is a schematic front view illustrating the recording unit located at a standby position and the cap portion located at a capping position.

When capping is performed, as illustrated in FIG. 7, in order to secure a movement path of the cap portion 62 when the cap portion 62 moves from the non-capping position PC1 to the capping position PC2, the recording unit 20 moves to the standby position PH2 which is retracted by a predetermined distance in the −B direction from the recording position PH4.

Figure 6:
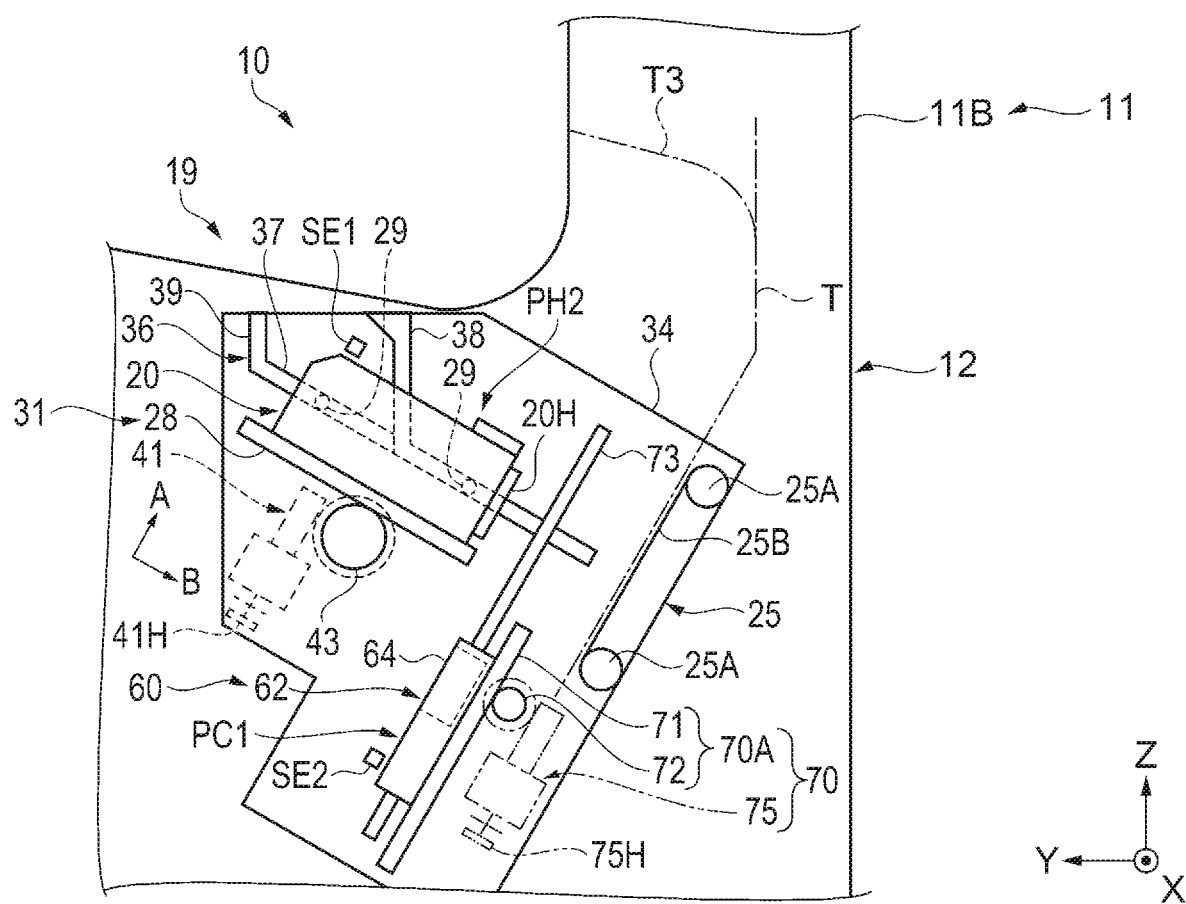
FIG. 6 is a schematic front view illustrating the recording unit located at a standby position and the cap portion located at a non-capping position.

As illustrated in FIG. 6, when the recording unit 20 is at the standby position PH2, the cap portion 62 moves in the +A direction from the non-capping position PC1 illustrated in FIGS. 5 and 6 to the capping position PC2 illustrated in FIG. 7. The cap 64 located at the capping position PC2 faces the head 20H located at the standby position PH2 in the +B direction. When the recording unit 20 moves from the standby position PH2 in the +B direction, the head 20H and the cap 64 located at the capping position PC2 come into contact with each other under a predetermined pressure. The position where the head 20H comes into contact with the cap 64 is the maintenance position PH3 illustrated in FIG. 8. The cap 64 located at the capping position PC2 covers the nozzle N (see FIG. 9) of the head 20H located at the maintenance position PH3.

As illustrated in FIGS. 8 and 9, when the cap portion 62 is located at the capping position PC2, the cap portion 62 is separated from the transport path T on which the medium M on which recording is performed by the recording unit 20 is transported.

As illustrated in FIG. 9, the cap portion 62 performs maintenance of the head 20H in a capping state where the cap 64 covers the nozzles N of the head 20H. When a pump motor 79, which is a driving source of a pump 78 coupled to the cap 64 through a pipe 77, is driven, the cap portion 62 sets the inside of the cap 64 to a negative pressure in a capping state. In addition, the cap portion 62 forcibly discharges a liquid such as ink from the nozzles N of the head 20H into the caps 64.

The liquid forcibly discharged from the head 20H by the cap portion 62 is stored in the waste liquid accommodation portion 99 illustrated in FIG. 2 as waste liquid from the caps 64. In addition, a liquid such as ink idly ejected for maintenance from the head 20H located at the standby position PH2 toward the cap 64 located at the capping position PC2 is also stored in the waste liquid accommodation portion 99 as waste liquid from the caps 64.

Next, a detailed configuration of the cap portion 62 will be described. FIG. 9 illustrates the recording unit 20 and the cap portion 62 in a capping state. The cap portion 62 includes the caps 64 capable of coming into contact with the nozzle surfaces 20N and a cap holder 66 for holding the caps 64. In addition, the cap portion 62 includes a spring 65 as an example of a biasing portion provided between the cap 64 and the cap holder 66. The spring 65 biases the cap 64 toward the nozzle surface 20N. The spring 65 biases the cap 64 in the −B direction. The cap 64 is supported by the spring 65.

In the present embodiment, the head 20H is configured by arranging the plurality of unit heads 20U illustrated in FIG. 9 in the X-axis direction. The cap portion 62 includes the plurality of caps 64 arranged side by side in the X-axis direction which is the width direction of the medium M at positions facing the plurality of unit heads 20U. The cap 64 has an opening on the −B direction side facing the head 20H, and includes a seal portion (not illustrated) formed of a rubber elastic material around the opening. When the cap 64 is pressed against the nozzle surface 20N of the unit head 20U by a biasing force of the spring 65, at least a part of the seal portion is elastically compressed. The cap portion 62 presses the cap 64 against the nozzle surface 20N under a predetermined force by a biasing force of the spring 65 in the −B direction, a restoring force of the elastically compressed seal portion, and the like.

The cap 64 has a shape and a size capable of covering all of the nozzles N among the nozzle surfaces 20N of the unit heads 20U. Further, when the cap portion 62 is located at the capping position PC2, the cap 64 is disposed at a position facing the nozzle surface 20N of each unit head 20U in the B direction. The cap 64 comes into contact with the nozzle surface 20N of the head 20H under a predetermined pressure to cover the plurality of nozzles N opened in the nozzle surface 20N.

Since the cap 64 covers the nozzle surface 20N, an increase in viscosity due to drying of a liquid such as ink in the nozzles N of the head 20H is suppressed. Note that, when the recording unit 20 moves from the retraction position PH1 (see FIG. 2) to a predetermined maintenance position PH3 in the B direction, which is a descending direction, the head 20H and the cap 64 come into contact with each other under a predetermined pressure, and a capping state is set.

The cap 64 is attached to the cap holder 66 via a slide portion 67 so as to be relatively movable in the B direction. Due to an elastic force of the spring 65 interposed between the bottom surface of the cap 64 and the upper surface of the cap holder 66, the cap 64 is biased in the −B direction, which is an ascending direction, with respect to the cap holder 66. Note that the spring 65 may be an elastic member such as a tension spring or a torsion coil spring as long as the spring 65 can bias the cap 64 in the −B direction.

The second movement mechanism 70 includes the pair of rack and pinion mechanisms 70A and 70B. The pair of racks 71 constituting the rack and pinion mechanisms 70A and 70B are fixed to side surfaces on both sides of the cap holder 66 in the X-axis direction. On the +B direction side facing teeth portions 71A of the pair of racks 71, pinions 72 which are a pair of driving gears constituting the rack and pinion mechanisms 70A and 70B are disposed in a rotatable state. The teeth portion 71A of the rack 71 and the teeth portion 72A of the pinion 72 engage with each other. The pair of pinions 72 are attached to both end sides from the center of the rotation shaft 76. In addition, the guide rollers 74 constituted by a plurality of rollers that are rotatable with the X-axis direction as an axial direction are provided on side walls on both sides of the cap portion 62 in the X-axis direction. The guide roller 74 is formed of, for example, a metal. The guide roller 74 is guided in the direction A (see FIGS. 8 and 19 and the like) in which the guide rail 73 having a C-shaped cross-section extends.

When the rotation shaft 76 is rotated with power of the first slide driving unit 75 (see FIGS. 4, 9, and 19 and the like) which is a driving source of the cap portion 62, the pair of pinions 72 are rotated. When the first slide driving unit 75 is driven to rotate in a forward direction, the cap portion 62 moves in the +A direction through engagement between the pinion 72 and the rack 71. On the other hand, when the first slide driving unit 75 is driven to rotate in a reverse direction, the cap portion 62 moves in the −A direction through engagement between the pinion 72 and the rack 71.

Next, a configuration of a wiper portion 82 will be described. As illustrated in FIG. 10, the wiper portion 82 is movable in the X-axis direction orthogonal to the B direction and the A direction, and performs maintenance of the head 20H of the recording unit 20. The wiper portion 82 includes a wiper member 81 and a slider 82A supporting the wiper member 81.

The recording device 10 includes a sensor SE3 capable of detecting the wiper portion 82 at the retraction position PW1, and a third movement mechanism 83 that causes the wiper portion 82 to reciprocate in the X-axis direction. The sensor SE3 is configured to be able to detect the wiper portion 82 when the wiper portion 82 is located at the retraction position PW1. The third movement mechanism 83 includes a guide rail 84 that guides the slider 82A, an endless belt 86 that is wound around a pair of pulleys 85, and a second slide motor 87 that is a driving source that rotates one of the pulleys 85.

The guide rail 84 guides the slider 82A to be movable in the X-axis direction. The pair of pulleys 85 are disposed at positions separated from each other by a predetermined distance in the X-axis direction. The belt 86 is wound around the pair of pulleys 85, and thus the belt 86 is disposed in a state where the belt 86 is parallel to the nozzle surface 20N over a range wider than the movement region of the wiper member 81. The control unit 95 can also control the third movement mechanism 83. Specifically, the control unit 95 drives the second slide motor 87 in forward and reverse directions to reciprocate the wiper member 81 along a path from the retraction position PW1 to a wiping start position.

The slider 82A is fixed to a part of the belt 86. The position of the wiper portion 82 indicated by a solid line in FIG. 10 is the retraction position PW1. The retraction position PW1 detected by the sensor SE3 is also a reference position when the position of the wiper portion 82 on a movement path is measured. When the wiping of the nozzle surface 20N is performed, the head 20H is disposed at the standby position PH2. The standby position PH2 is a position separated from the movement path of the wiper member 81, and is a position where the wiper portion 82 and the nozzle surface 20N cannot come into contact with each other. When the second slide motor 87 is driven to rotate in a forward direction in a state where the wiper portion 82 is located at the retraction position PW1, the wiper portion 82 moves from the retraction position PW1 in the +X direction and reaches a wiping start position indicated by an alternating two dots-dashed line in FIG. 10.

After the wiper portion 82 reaches the wiping start position, the recording unit 20 descends in the +B direction by a predetermined amount and is thereby disposed at a wiping position PH5 illustrated in FIG. 11. The wiping position PH5 is located closer to the retraction position PH1 than the recording position PH4 and the maintenance position PH3.

The wiper portion 82 at the wiping start position located at a left end in FIG. 11 moves in the −X direction when the second slide motor 87 is driven to rotate in a reverse direction. In the process in which the wiper portion 82 moves in the −X direction, the wiper member 81 wipes the nozzle surface 20N. Note that the wiper portion 82 can be positioned at the wiping position PW2, and wipes the nozzle surface 20N at the wiping position PW2.

A liquid such as ink adhering to the nozzle surface 20N causes a flying direction of the liquid such as ink ejected from the nozzle N to be bent. Although a meniscus of the liquid such as ink is formed in the nozzle N, an unstable shape of the meniscus results in a variation in the amount of liquid droplets ejected from the nozzle N. The wiper portion 82 wipes the nozzle surface 20N with the wiper member 81, and thus the liquid adhering to the nozzle surface 20N is removed, or the shape of the meniscus formed by the liquid in the nozzles N is adjusted. The wiper portion 82 performs an operation of wiping the nozzle surface 20N by the wiper member 81, and thus the bending of the flying direction of the liquid droplets ejected from the nozzles N and variations in an ejection amount are suppressed.

As illustrated in FIG. 2, the control unit 95 is provided in the device main body 11. The control unit 95 includes a central processing unit 96 (CPU 96) and a memory 97. The CPU 96 can execute various programs stored in the memory 97, and can perform, for example, various determinations, various commands, and the like. The memory 97 stores, for example, a program for transporting the medium M and a program for recording information on the medium M by the recording unit 20. In addition, various programs such as a program related to a display method for displaying the state of the recording device 10 on the display unit 14A of the operation unit 14 are stored in the memory 97. Further, the memory 97 stores various counter values such as the number of times the medium M is transported to the transport path T.

The control unit 95 controls the entire recording device 10. For example, the control unit 95 performs ejection control of ejecting a liquid such as ink from the nozzles N of the head 20H by controlling the head 20H. In addition, for example, the control unit 95 performs movement control of moving the recording unit 20 in the B direction via the first movement mechanism 31 by controlling the elevation driving unit 41. In addition, for example, the control unit 95 controls the first slide driving unit 75 to perform movement control of moving the cap portion 62 in the A direction via the second movement mechanism 70.

In addition, for example, the control unit 95 controls the second slide motor 87 to perform movement control of moving the wiper portion 82 in the X-axis direction via the third movement mechanism 83. In addition, for example, the control unit 95 controls the pump motor 79 which is a driving source of the pump 78 to control cleaning which is performed by setting the inside of the cap 64 in a capping state to a negative pressure. In addition, for example, the control unit 95 rotates the pickup rollers 21 by controlling a feeding motor to feed the media M accommodated in the cassettes 15 one by one.

In addition, for example, the control unit 95 drives the transport roller pairs 22, 23, and 26 and the transport unit by controlling the transport motor to perform transport control of transporting the media M fed from the cassettes 15 along the transport path T. In addition, for example, the control unit 95 controls the image reading unit 13 to read an image of a document D by the reading unit 13A. In addition, for example, the control unit 95 notifies the display unit 14A of the operation unit 14 to display information on the state of the recording device 10.

In addition, for example, the control unit 95 controls components of the printing unit 12 based on detection signals output from the sensors SE1, SE2, SE3, and SE4. When the recording unit 20 and the cap portion 62 cannot recognize their own positions, the control unit 95 performs movement control of retracting the recording unit 20 in the B direction so as to be separated from the first maintenance unit 60 side and then retracting the cap portion 62 in the A direction. In addition, for example, the control unit 95 detects that the recording unit 20 is located at the standby position PH2 and the cap portion 62 is located at the non-capping position PC1 based on the detection results of the sensors SE1 and SE2.

Next, the regulating member 200 will be described. The regulating member 200 is used to regulate the movement of the cap portion 62 at the time of transporting the recording device 10, or the like. The regulating member 200 can regulate the movement of the cap portion 62 in the A direction. The recording device 10 includes the accommodation portion 300 capable of accommodating the regulating member 200 when the regulating member 200 does not regulate the movement of the cap portion 62. In addition, the recording device 10 includes a fitting portion 400 into which the regulating member 200 is fitted when the regulating member 200 regulates the movement of the cap portion 62. The regulating member 200 is handled by a service man. The regulating member 200 is an example of a regulating member RM.

Figure 19:
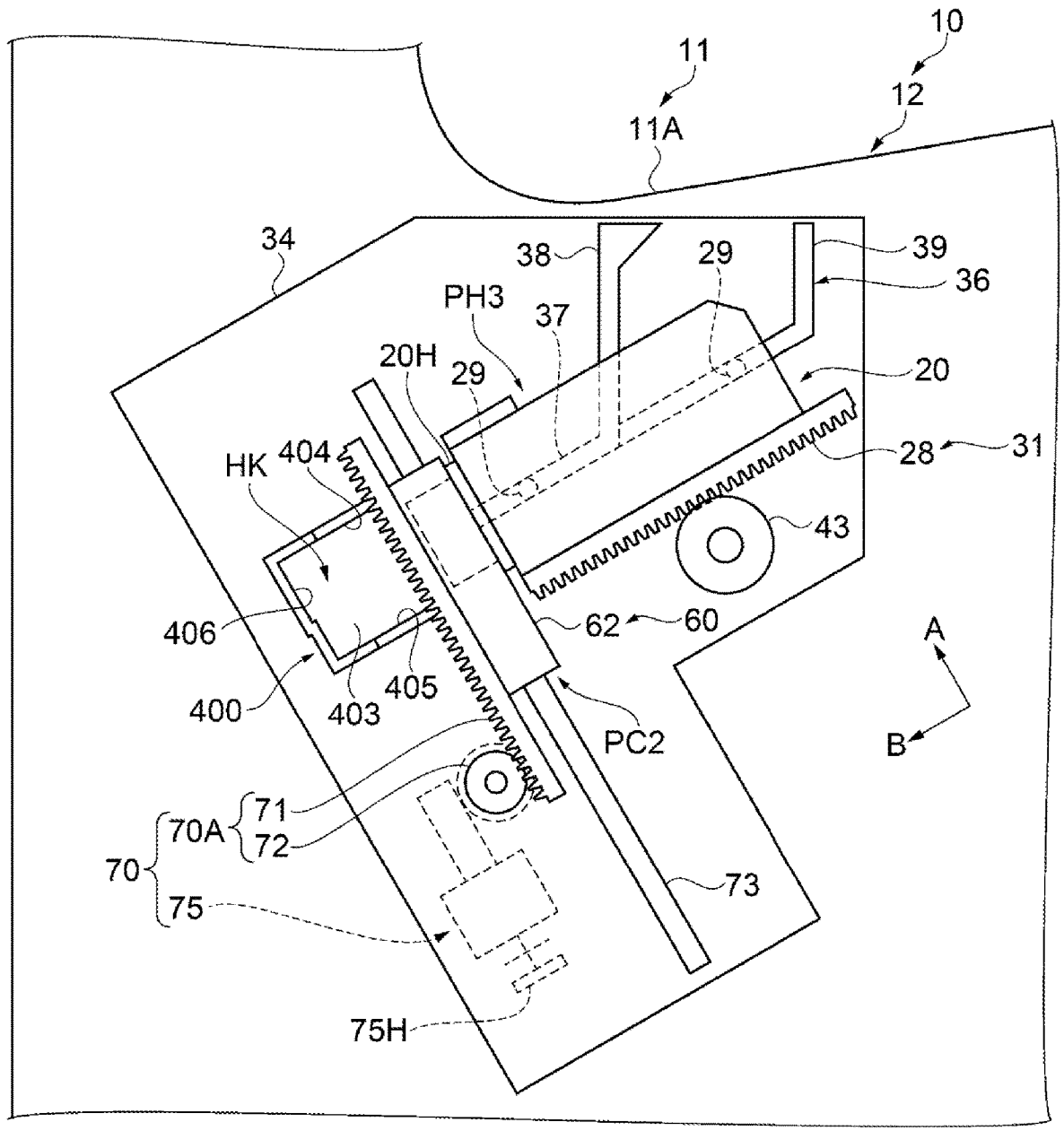
FIG. 19 is a schematic side view illustrating a fitting portion.

First, the fitting portion 400 will be described. As illustrated in FIGS. 4, 9, and 19, the fitting portion 400 is disposed on the −X direction side of the side frame 34 adjacent to the front frame 11A. Further, the fitting portion 400 is positioned on the +B direction side of the rack 71 of the cap portion 62. As illustrated in FIG. 19, the fitting portion 400 has a space HK into which the regulating member 200 is fitted. When a direction in which the regulating member 200 is fitted into the space HK is set as a fitting direction, the space HK of the regulating member 200 is opened toward the −X direction side which is the front side in the fitting direction of the space HK. In the present embodiment, the fitting direction is the +X direction and is along the X-axis direction.

The fitting portion 400 has inner surfaces 403, 404, 405, and 406 that define the contour of the space HK. The inner surfaces 404, 405, and 406 are provided along the X-axis. The inner surface 403 defines the contour of the space HK on the +X direction side which is the back side in the fitting direction. The inner surface 404 defines the contour of the space HK on the +A direction side in the B direction. The inner surface 405 defines the contour of the space HK on the −A direction side in the B direction. The inner surface 406 defines the contour of the space HK on the +B direction side in the A direction. Further, the inner surface 406 faces the teeth portion 71A (see FIG. 9) of the rack 71. The inner surface 406 is an example of a facing surface of the cap portion 62 facing the rack 71. Note that the position of the contour of the space HK on the −B direction side is defined by the rack 71 of the cap portion 62.

The regulating member 200 is fitted into the fitting portion 400 to regulate the movement of the cap portion 62 located at the capping position PC2 in the A direction. The regulating member 200 is fitted into the fitting portion 400 when the cap portion 62 is located at the capping position PC2. As illustrated in FIGS. 15 to 17 and FIGS. 20 and 21, the regulating member 200 has a box shape and has outer surfaces 202, 203, 204, 205, 206, and 208.

Further, the regulating member 200 includes a regulating portion 201 on the outer surface 202. The regulating portion 201 has a sawtooth shape in which a plurality of protrusions are arranged at equal intervals in one direction. The regulating member 200 regulates the movement of the cap portion 62 in the A direction by the regulating portion 201 engaging with the rack 71 of the cap portion 62. The rack 71 is an example of a part of the cap portion 62. In the protrusion constituting the regulating portion 201, when the regulating member 200 is located in the fitting portion 400, a side close to the +X direction than a position where the regulating portion 201 engages with the rack 71 is inclined in a direction away from the rack 71 in the +B direction as the regulating portion 201 becomes closer to the +X direction.

The regulating member 200 may be formed of a material having rigidity lower than that of the material forming the rack 71 with which the regulating portion 201 engages. Thereby, for example, when the regulating portion 201 of the regulating member 200 and the rack 71 of the cap portion 62 engage with each other, it is assumed that vibration or impact more than expected is received. In this case, the regulating portion 201 or the regulating member 200 is deformed to alleviate vibration or impact, and it is possible to suppress deterioration in the performance of the rack 71 or the cap portion 62. Note that the regulating member 200 of the present embodiment is formed of polypropylene (PP).

Figure 20:
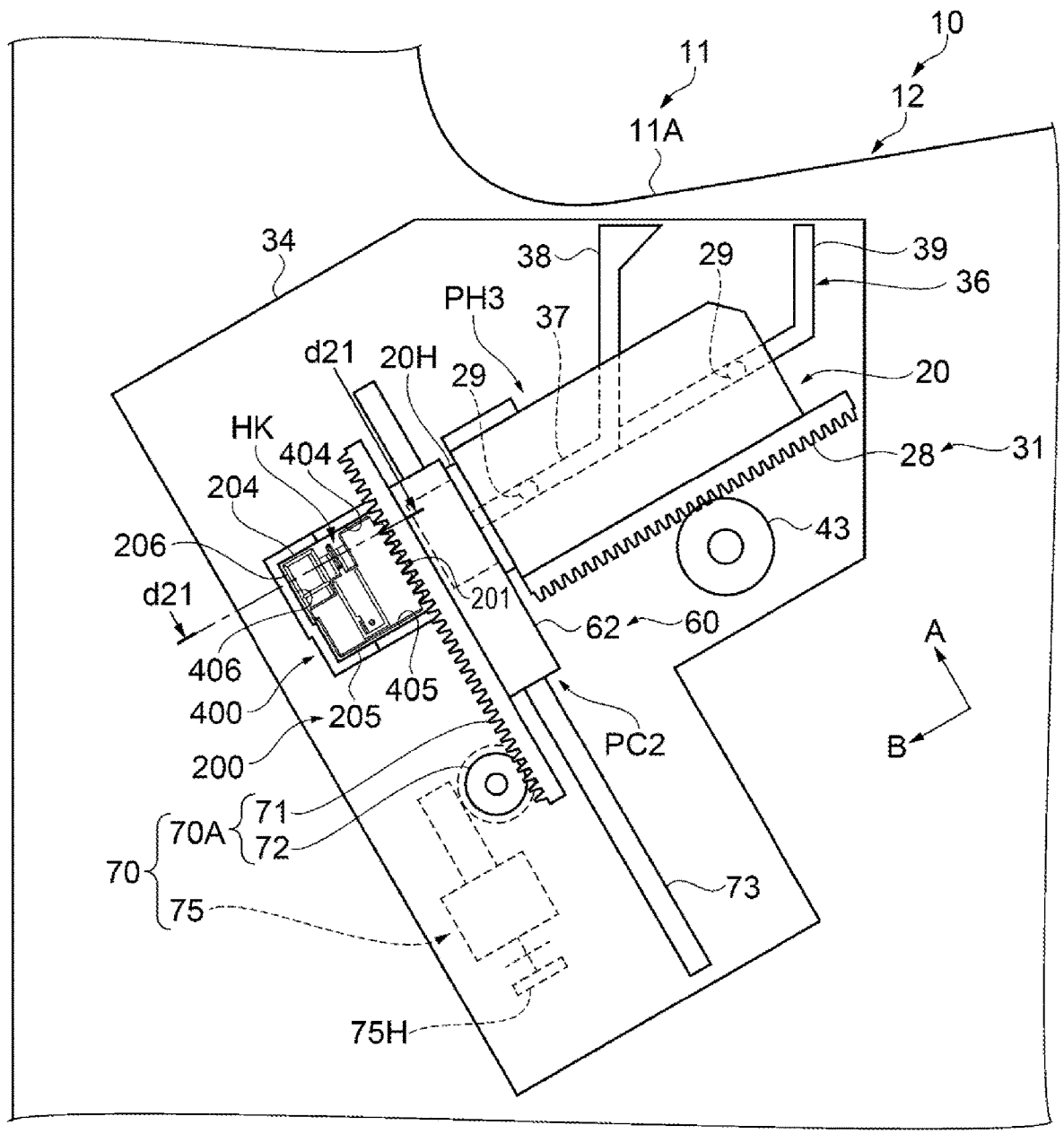
FIG. 20 is a schematic side view illustrating the regulating member located in the fitting portion.
Figure 21:
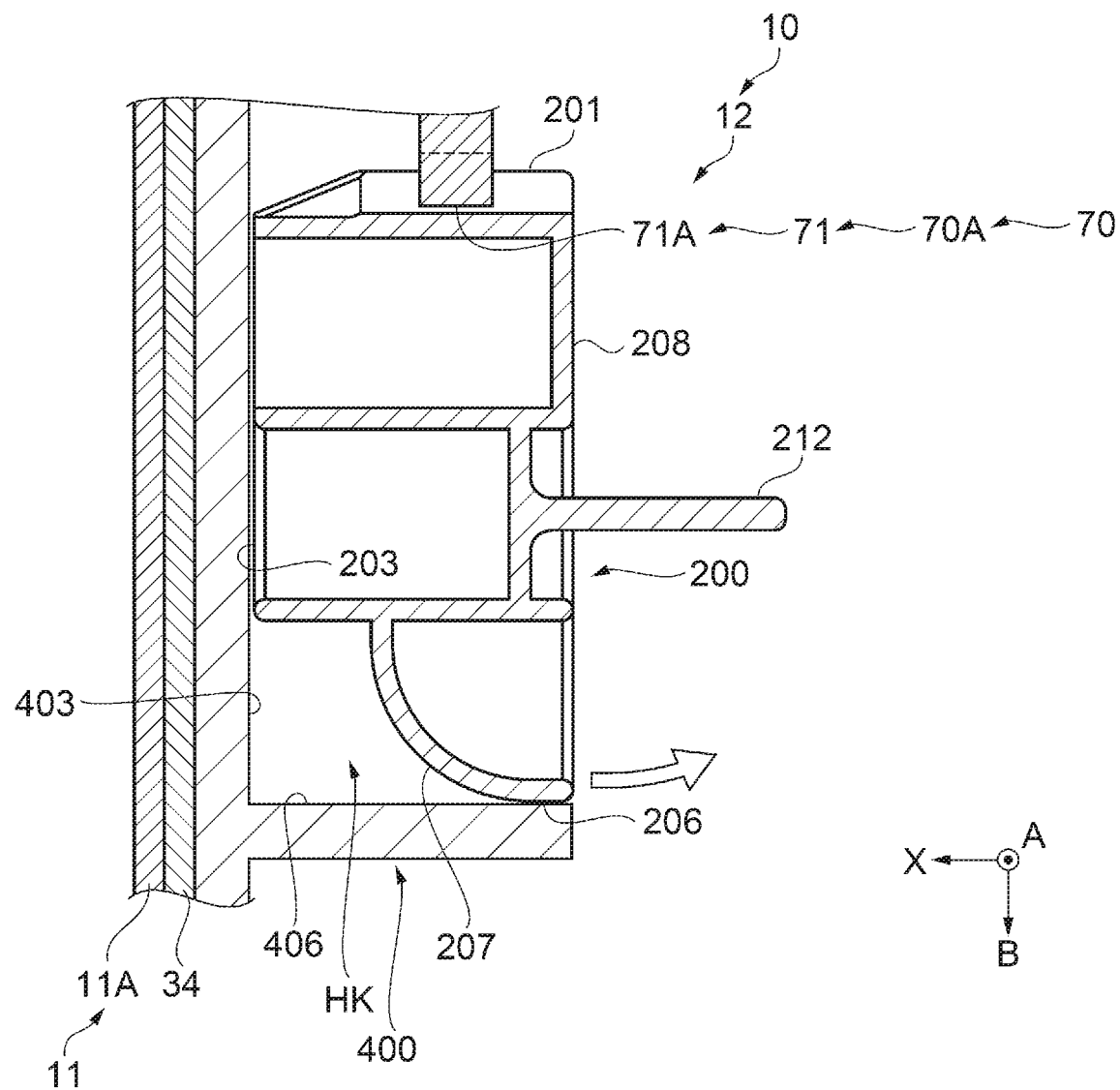
FIG. 21 is a schematic cross-sectional view illustrating the regulating member located when it is in the fitting portion.
Figure 22:
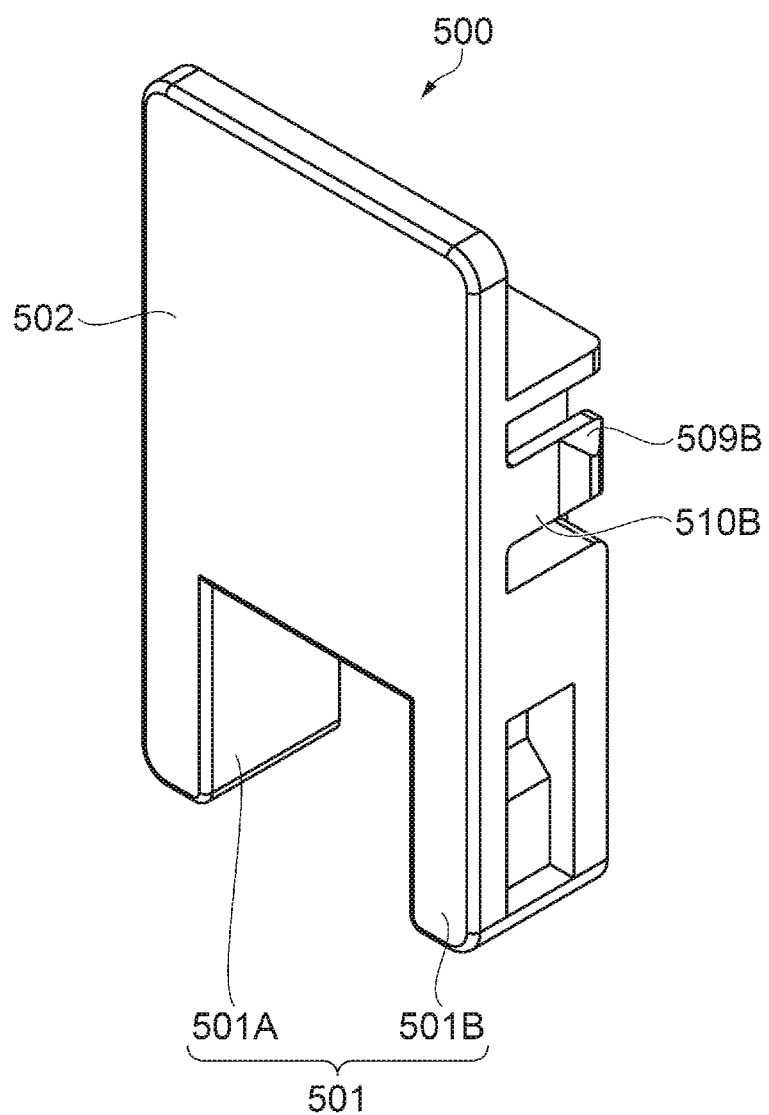
FIG. 22 is a perspective view illustrating the regulating member for regulating movement of the recording unit.

As illustrated in FIGS. 20 and 21, when the regulating member 200 is fitted into the fitting portion 400, the outer surface 203 comes into contact with the inner surface 403 of the fitting portion 400, whereby the position of the regulating member 200 in the X-axis direction is defined. In addition, the movement of the regulating member 200 in the +A direction is regulated by the outer surface 204 coming into contact with the inner surface 404 of the fitting portion 400. In addition, the movement of the regulating member 200 in the −A direction is regulated by the outer surface 205 coming into contact with the inner surface 405 of the fitting portion 400. In addition, the movement of the regulating member 200 in the +B direction is regulated by the outer surface 206 coming into contact with the inner surface 406 of the fitting portion 400. The outer surface 206 is an example of a contact surface that faces the inner surface 406 of the fitting portion 400 when the regulating member 200 is fitted into the fitting portion 400 and is located in the space HK.

When the regulating member 200 is fitted into the fitting portion 400 and is located in the space HK, the protrusions of the regulating portion 201 come into contact with the plurality of teeth portions 71A of the rack 71, thereby regulating the movement of the cap portion 62 in the A direction. The shapes of the protrusions forming the regulating portion 201 of the present embodiment and intervals between the protrusions are set to be the same as the shapes of teeth forming the teeth portion 71A of the rack 71 and intervals between the teeth. Thereby, when the regulating member 200 is fitted into the fitting portion 400, the plurality of protrusions of the regulating portion 201 engage with the rack 71 of the cap portion 62.

When the regulating member 200 is fitted into the fitting portion 400 and is located in the space HK, the center of the head 20H in the A direction is located between both ends in the A direction of the regulating portion 201 in the A direction. In addition, when the regulating member 200 is fitted into the fitting portion 400 and is located in the space HK, the center of the head 20H in the A direction is positioned between both ends in the A direction of the inner surface 406 in the A direction.

Figure 16:
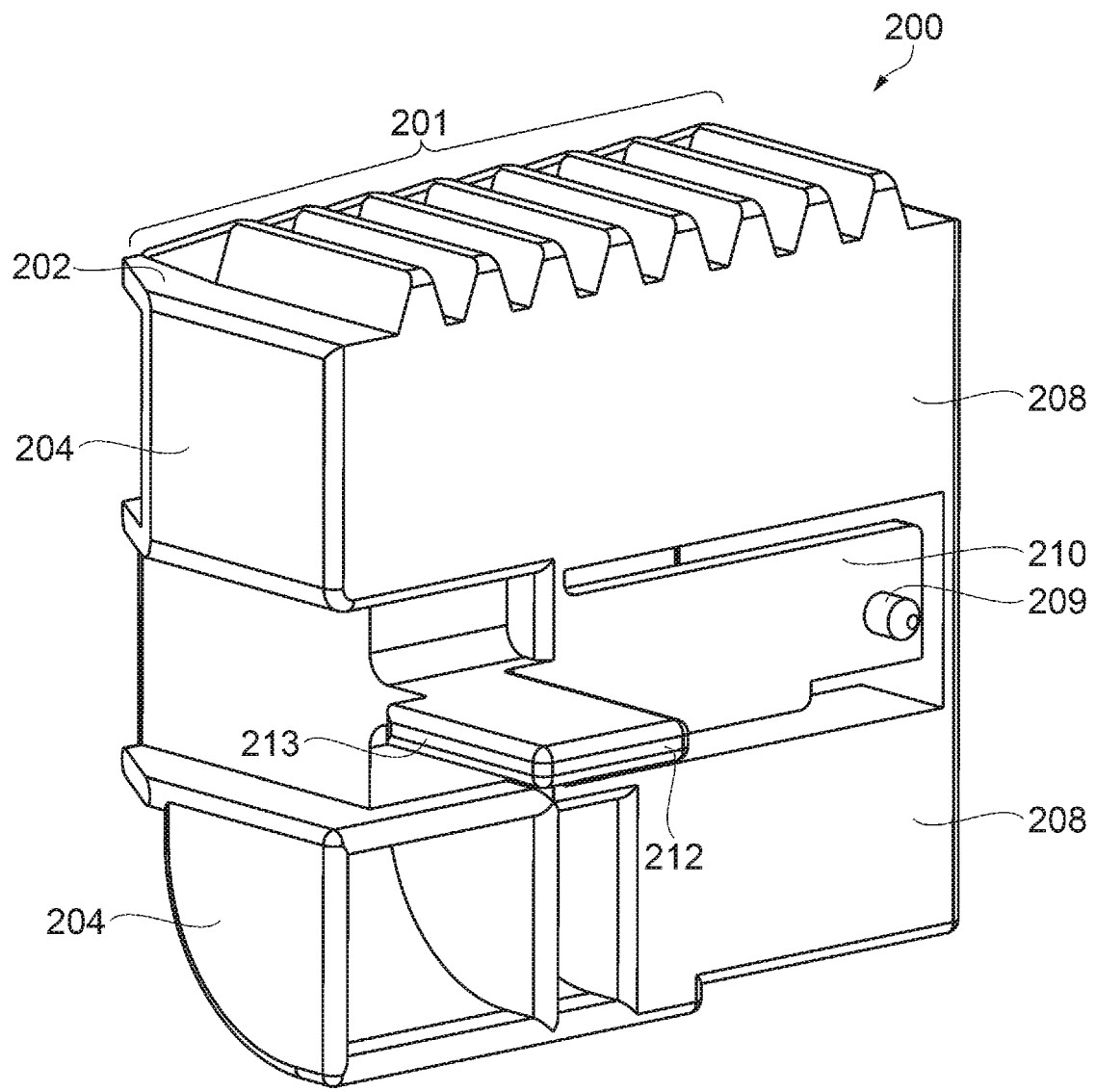
FIG. 16 is a perspective view illustrating the regulating member for regulating movement of the cap portion.
Figure 17:
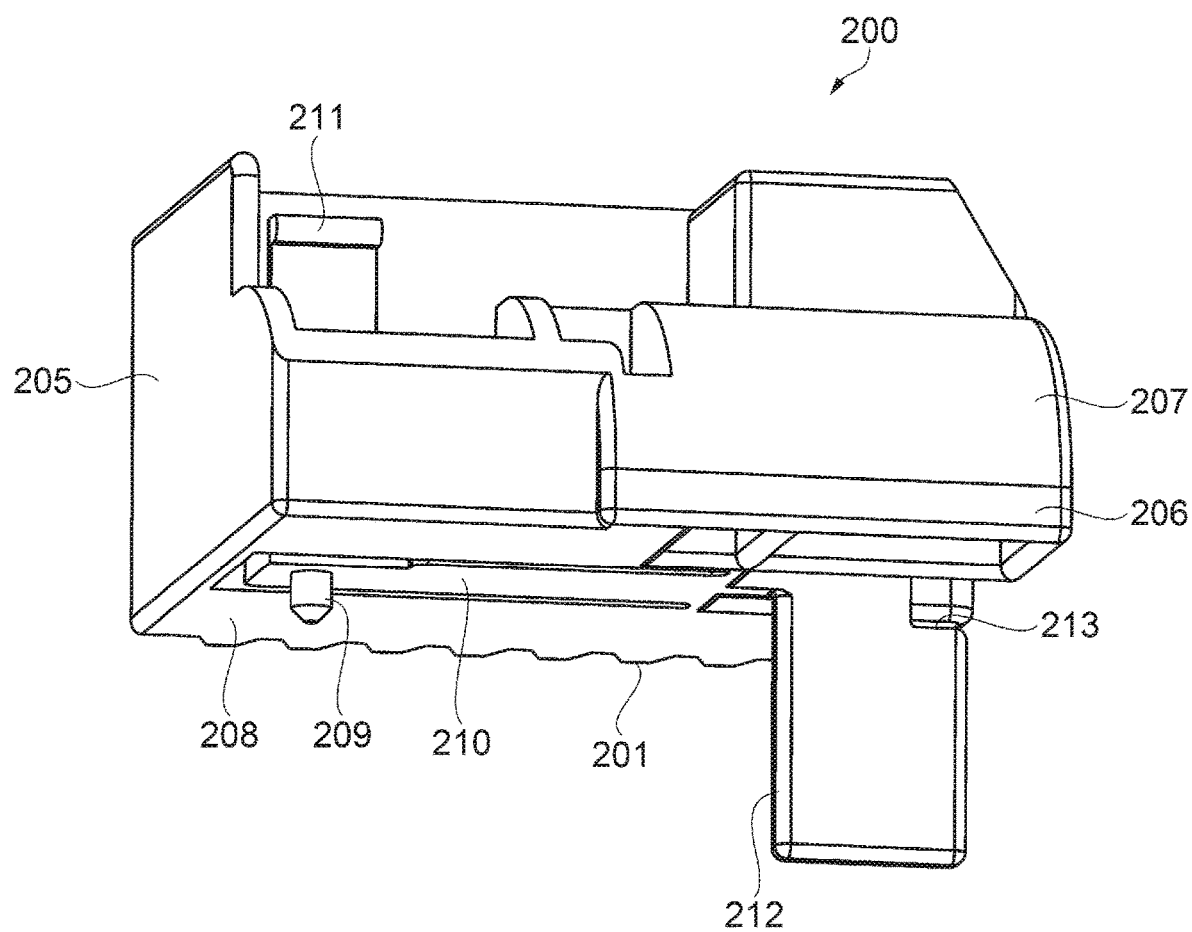
FIG. 17 is a perspective view illustrating the regulating member for regulating movement of the cap portion.

As illustrated in FIGS. 16 and 17, the regulating member 200 has a protruding portion 212. The protruding portion 212 is disposed closer to the outer surface 204 than the center of the regulating member 200. The protruding portion 212 is a plate-like protrusion extending along the outer surfaces 202 and 206. As illustrated in FIG. 21, when the regulating member 200 is fitted into the fitting portion 400, and the regulating portion 201 engages with the rack 71, the protruding portion 212 protrudes from the fitting portion 400 in the −X direction. Thereby, for example, a service man can remove the regulating member 200 from the fitting portion 400 by pinching the protruding portion 212 and pulling it in the −X direction.

In addition, the regulating member 200 has an outer surface 207 on a side facing the inner surface 406 of the fitting portion 400 when the regulating member 200 is fitted into the fitting portion 400 and is located in the space HK. The outer surface 207 is a rounded surface that continues from the outer surface 206 in the +X direction, which is the back side in the space HK in the fitting direction, and becomes more distant from the inner surface 406 toward the +X direction. By providing the outer surface 207, the back side of the regulating member 200 in the fitting direction is less likely to be caught by the fitting portion 400, and thus the regulating member 200 is easily fitted into the fitting portion 400. The outer surface 207 is an example of a non-contact surface.

In addition, as indicated by an outline arrow in FIG. 21, by providing the outer surface 207, the regulating member 200 can be removed from the fitting portion 400 while rotating the regulating member 200 with the regulating portion 201 side of the regulating member 200 as a rotation center. Note that it is assumed that the regulating member 200 is fitted into the fitting portion 400 and is located in the space HK. At this time, a range in which the outer surface 206 of the regulating member 200 of the present embodiment is in contact with the inner surface 406 of the fitting portion 400 is set to be on the −X direction side with respect to a range in which the regulating portion 201 of the regulating member 200 engages with the rack 71 of the cap portion 62 in the X-axis direction. For this reason, for example, it is assumed that a service man pushes or pulls the protruding portion 212 of the regulating member 200 in the −B direction. Thereby, it is possible to generate a moment by which the regulating member 200 rotates as indicated by the outline arrow in FIG. 21.

Figure 18:
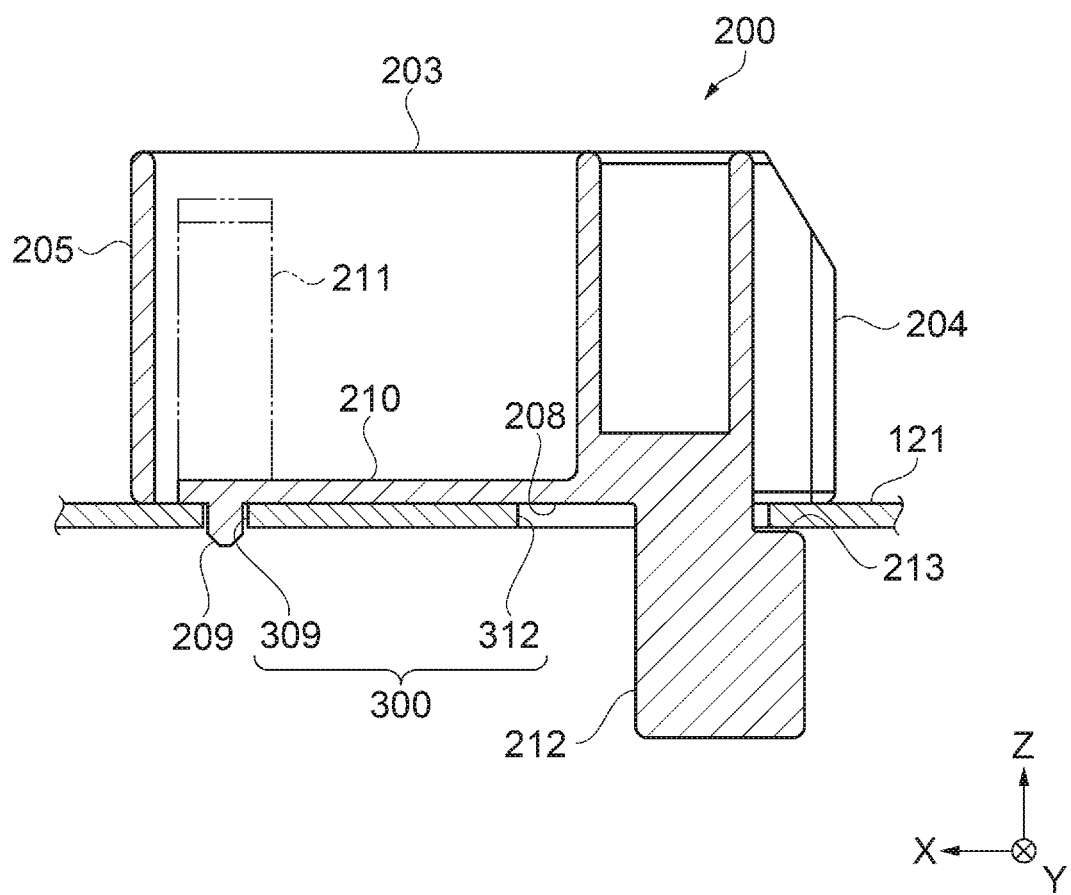
FIG. 18 is a schematic cross-sectional view illustrating the regulating member located in an accommodation portion.

As illustrated in FIGS. 16 to 18, the regulating member 200 includes a deformable portion 210, engaged portions 209 and 213, and a knob portion 211. Note that, for the sake of description, the knob portion 211 is also indicated by an alternating two dots-dashed line also in FIG. 18. The deformable portion 210 is integrally formed with the regulating member 200. The deformable portion 210 has a thin plate shape extending toward the outer surface 205 with the outer surface 204 side as a fixed end from the center of the regulating member 200. For this reason, the deformable portion 210 is elastically deformable. The engaged portion 209 is provided on a distal end side of the deformable portion 210 which is closer to the outer surface 205 than the center of the regulating member 200. The engaged portion 209 is a cylindrical protrusion that protrudes from the deformable portion 210 on a side where the protruding portion 212 protrudes from the outer surface 208. When the deformable portion 210 is elastically deformed, the engaged portion 209 is displaced.

The knob portion 211 is a plate-shaped protrusion extending from the deformable portion 210 toward the outer surface 203 on the distal end side of the deformable portion 210. For example, when the knob portion 211 is pinched and pulled toward the outer surface 203, the deformable portion 210 is elastically deformed, and the engaged portion 209 is displaced in a direction in which the amount of protrusion of the engaged portion 209 from the outer surface 208 decreases. The engaged portion 213 is a plate-shaped protrusion extending from the protruding portion 212 toward the outer surface 204. A gap is provided between the engaged portion 213 and the outer surface 208.

Next, the accommodation portion 300 will be described. As illustrated in FIGS. 12, 13, and 18, the accommodation portion 300 is provided in the frame 121 so as to be able to accommodate the regulating member 200 when the regulating member 200 does not regulate the movement of the cap portion 62. The accommodation portion 300 is disposed at a position of the frame 121 which is covered with the transport path forming member 105 located at the separation position SP. In addition, the accommodation portion 300 is disposed at a position closer to the +X direction side than the center of the frame 121 in the X-axis direction. Thereby, the accommodation portion 300 is close to the fitting portion 400, and the accommodation portion 300 and the fitting portion 400 are located at positions accessible from the −Y direction side in the open state of the first door 16. For this reason, it is easy to attach and detach the regulating member 200 to and from the accommodation portion 300 and the fitting portion 400.

As illustrated in FIG. 18, the accommodation portion 300 includes engaging portions 309 and 312. The engaging portion 309 engages with the engaged portion 209 of the regulating member 200. The engaging portion 312 engages with the engaged portion 213 of the regulating member 200. The engaging portion 309 is a circular through-hole disposed in the frame 121. The diameter of the engaging portion 309 is set to have such a size that the engaged portion 209 of the regulating member 200 can be inserted into the engaging portion 309. The engaging portion 312 is a through-hole disposed at a position away from the engaging portion 309 in the −X direction in the frame 121. The engaging portion 312 is an elongate hole which is long in the X-axis direction and into which the protruding portion 212 and the engaged portion 213 of the regulating member 200 can be inserted.

As illustrated in FIG. 18, when the regulating member 200 is located in the accommodation portion 300, the engaged portions 209 and 213 engage with the engaging portions 309 and 312 of the accommodation portion 300, so that the regulating member 200 is fixed to the accommodation portion 300. For example, when the regulating member 200 is accommodated in the accommodation portion 300, a service man opens the first door 16 and displaces the transport path forming member 105 from the separation position SP to the transport position TP. Then, the service man moves the regulating member 200 toward the frame 121 from a position on the +Z direction side and the +X direction side with respect to the position of the regulating member 200 in FIG. 18. Then, the service man inserts the protruding portion 212 and the engaged portion 213 into the engaging portion 312.

Then, the service man slides the regulating member 200 in the −X direction in a state where the outer surface 208 of the regulating member 200 is in contact with the frame 121. Thereby, the engaged portion 209 of the regulating member 200 is fitted into and engages with the engaging portion 309 of the accommodation portion 300. Thereby, the frame 121 is fitted into the gap between the engaged portion 213 and the outer surface 208 of the regulating member 200, and the engaged portion 213 and the engaging portion 312 engage with each other.

When the regulating member 200 fixed to the accommodation portion 300 is removed from the accommodation portion 300, the service man opens the first door 16 and displaces the transport path forming member 105 from the separation position SP to the transport position TP. Then, from the state illustrated in FIG. 18, the service man pinches the knob portion 211 of the regulating member 200 and pulls it in the +Z direction, thereby displacing the engaged portion 209 in the +Z direction and releasing the engagement with the engaging portion 309. Then, the service man slides the regulating member 200 in the +X direction to release the engagement between the engaged portion 213 and the engaging portion 312. Then, by moving the regulating member 200 in the +Z direction, the regulating member 200 is removed from the accommodation portion 300.

When the regulating member 200 is fitted into the fitting portion 400, the service man moves the transport unit 25 and the like constituting the transport path T located on the −Y direction side of the fitting portion 400 to the retraction position. Then, it is confirmed that the cap portion 62 is located at the capping position PC2, and when the cap portion 62 is not located at the capping position PC2, the cap portion 62 is moved to the capping position PC2. Then, the service man fits the regulating member 200 into the fitting portion 400. Thereby, the regulating portion 201 of the regulating member 200 engages with the rack 71 of the cap portion 62, and the regulating member 200 regulates the movement of the cap portion 62 located at the capping position PC2 in the A direction. In this case, the position where the regulating member 200 is fitted into the fitting portion 400 is a position where the regulating portion 201 comes into contact with the rack 71 of the cap portion 62. That is, the regulating member 200 is attachable to and detachable from the position where the regulating portion 201 comes into contact with the rack 71 of the cap portion 62. The position where the regulating portion 201 comes into contact with the rack 71 of the cap portion 62 is an example of a contact position.

Next, the regulating member 500 will be described. The regulating member 500 is used to regulate the movement of the recording unit 20 at the time of transporting the recording device 10, or the like. The regulating member 500 can regulate the movement of the recording unit 20 in the B direction. The recording device 10 includes an accommodation portion 600 that can accommodate the regulating member 500 when the regulating member 500 does not regulate the movement of the recording unit 20. The regulating member 500 is handled by a service man. The regulating member 500 is an example of a regulating member RM.

Figure 14:
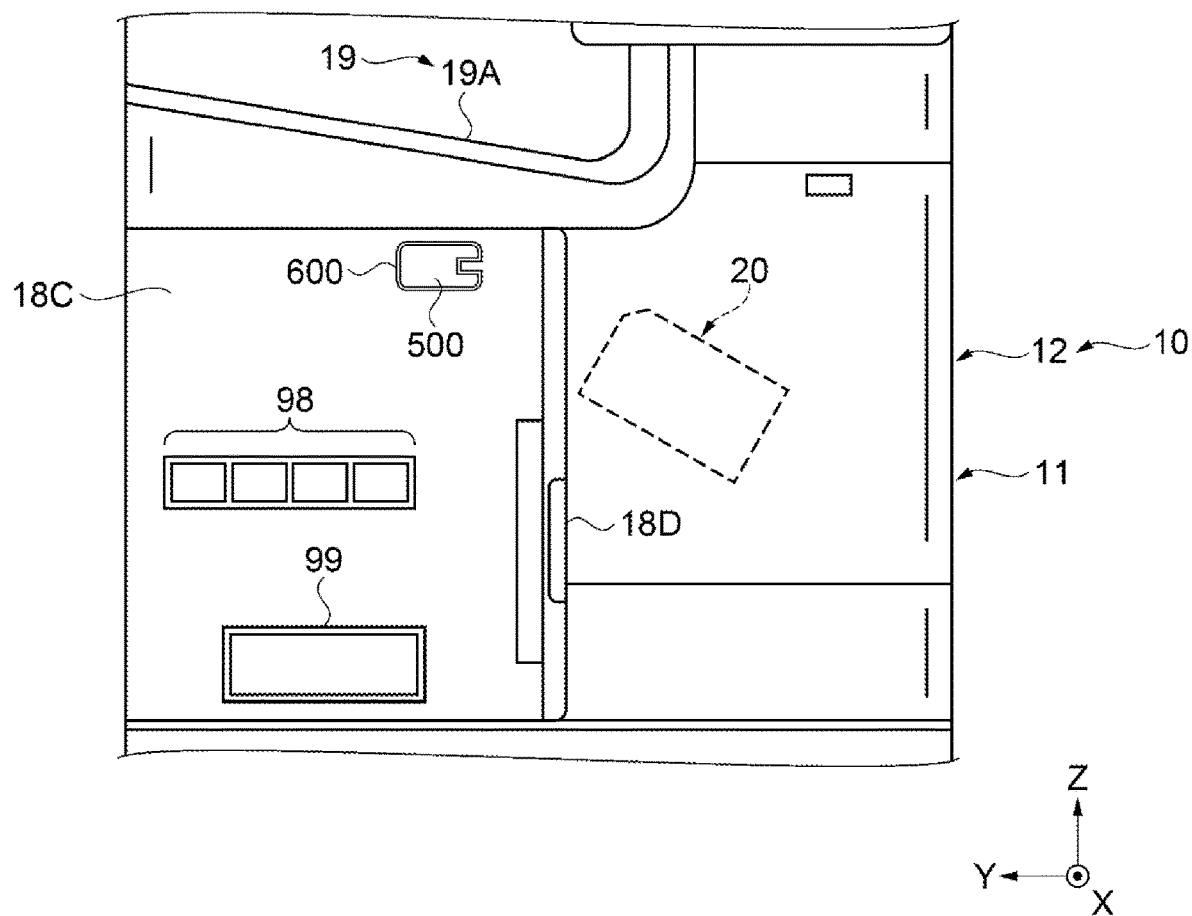
FIG. 14 is a partial front view of the recording device when a second door is in an open state.
Figure 15:
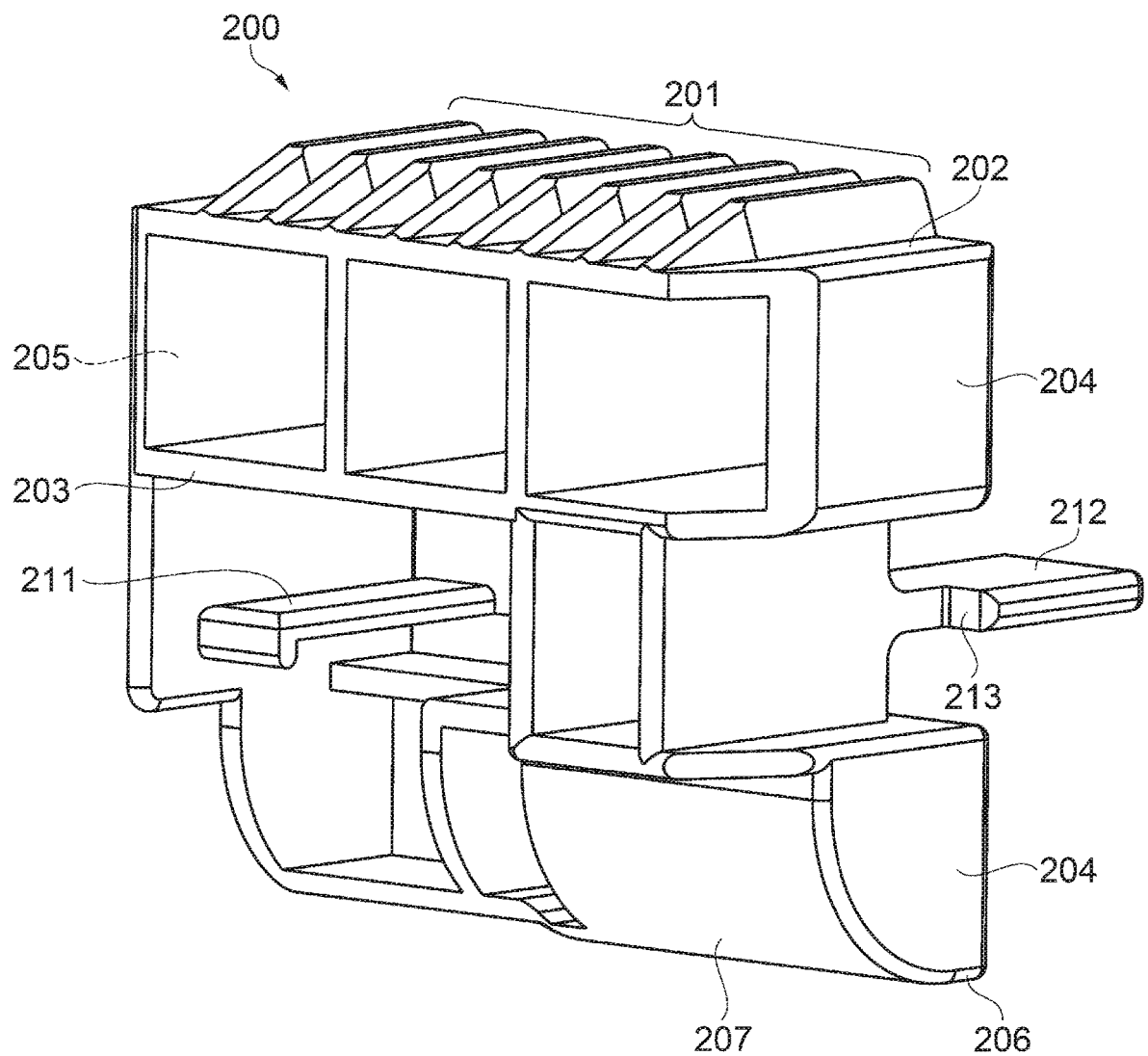
FIG. 15 is a perspective view illustrating a regulating member for regulating movement of the cap portion.
Figure 26:
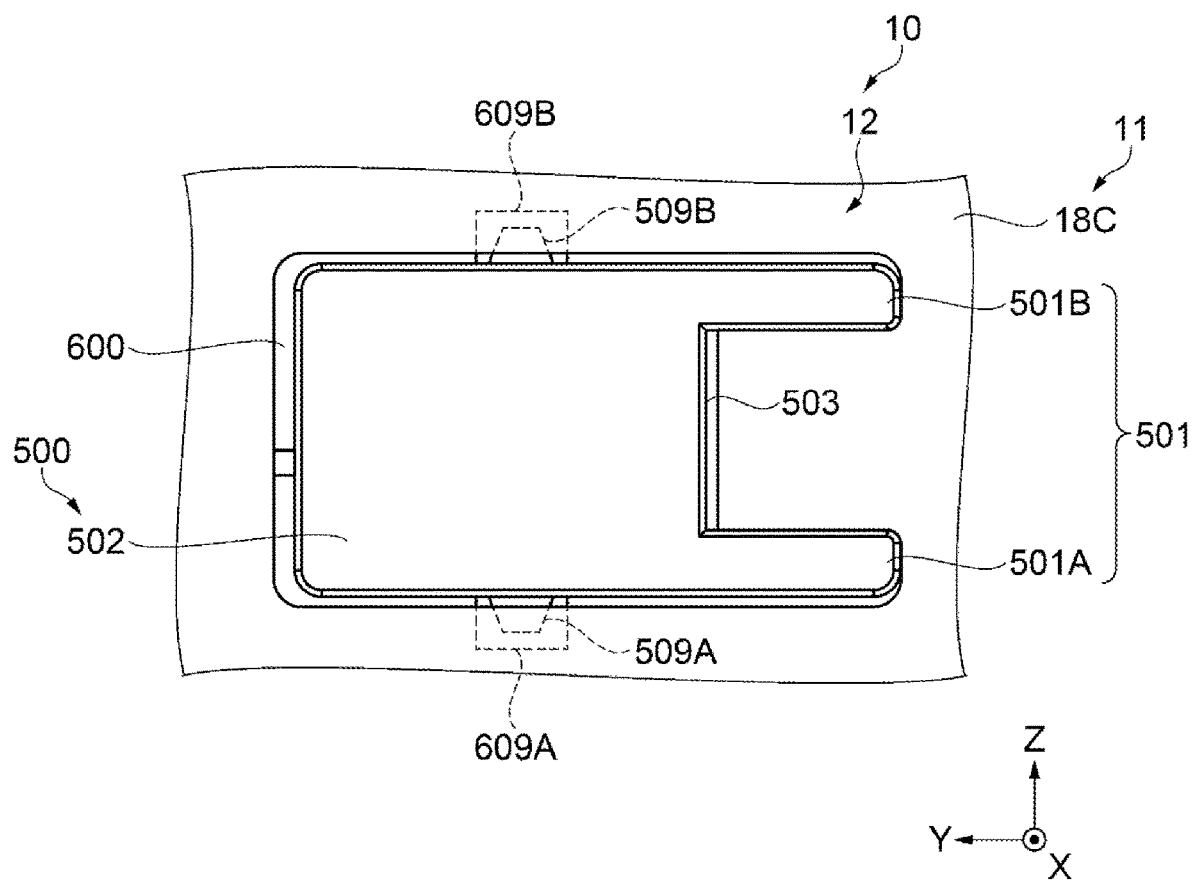
FIG. 26 is a partial front view illustrating the regulating member located in the accommodation portion.
Figure 27:
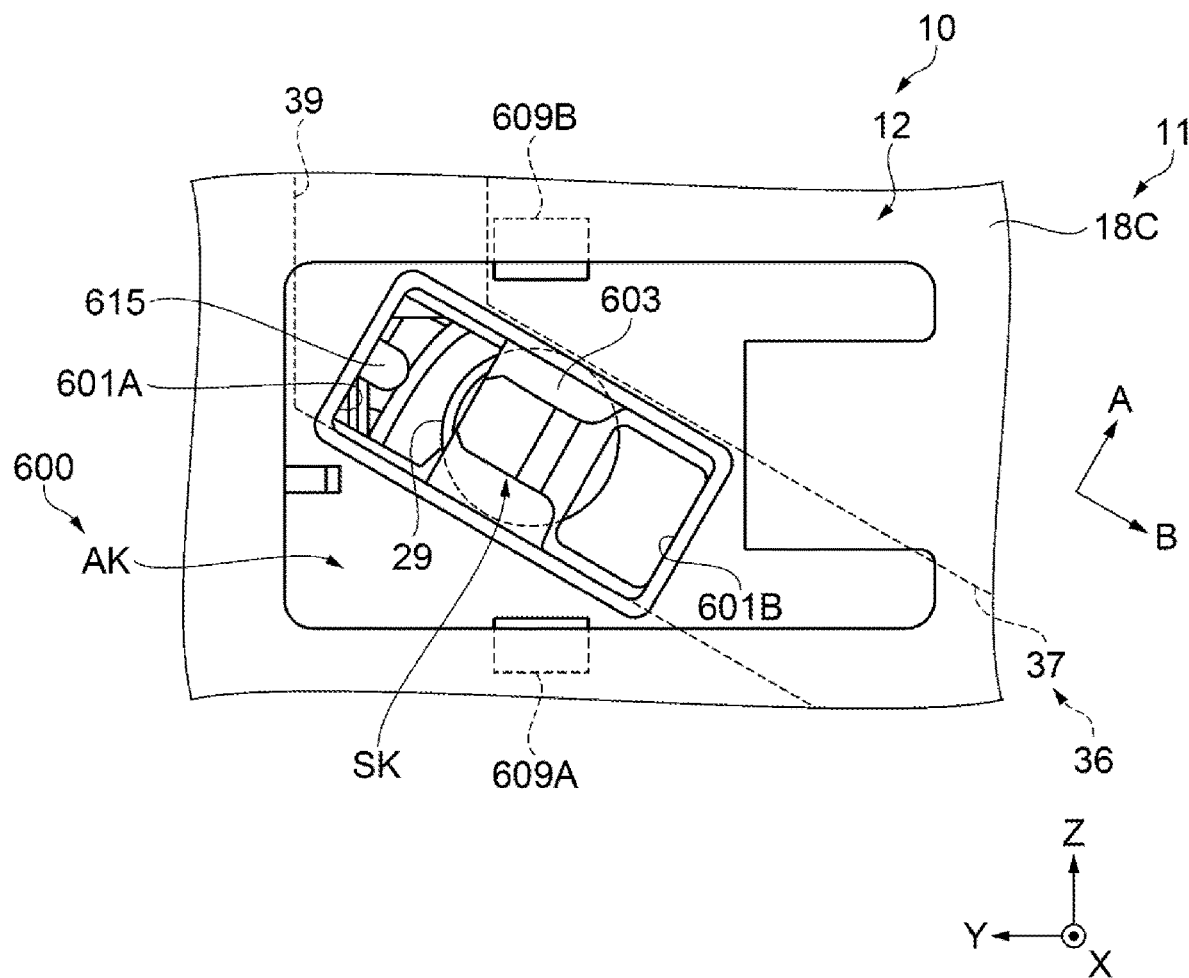
FIG. 27 is a partial front view illustrating the accommodation portion.

First, an accommodation portion 600 will be described. As illustrated in FIGS. 14 and 26, the accommodation portion 600 is provided at a position of an accommodation exterior 18C which is covered with a second door 18D in a closed state so as to be able to accommodate the regulating member 500 when the regulating member 500 does not regulate the movement of the recording unit 20. As illustrated in FIG. 27, the accommodation portion 600 includes an accommodation space AK, engaging portions 609A and 609B, an insertion space SK, and a bottom surface 603.

The accommodation space AK is a space for accommodating the regulating member 500, and is opened toward the +X direction. The engaging portions 609A and 609B engage with engaged portions 509A and 509B of the regulating member 500 to be described later. The engaging portion 609A is a recess that is opened on a side surface that defines the contour of the accommodation space AK on the +Z direction side among the inner surfaces of the accommodation portion 600. The engaging portion 609B is a recess that is opened on a side surface that defines the contour of the accommodation space AK on the −Z direction side among the inner surfaces of the accommodation portion 600.

The insertion space SK is a space into which a regulating portion 501 side of the regulating member 500 to be described later is inserted, when the movement of the recording unit 20 is regulated by the regulating member 500. The insertion space SK is provided on the −X direction side of the accommodation space AK and is opened toward the +X direction which is the accommodation space AK side. The bottom surface 603 is a surface that defines the contour of the insertion space SK on the −X direction side, and is a surface that is located at the backmost position of the accommodation portion 600.

Figure 28:
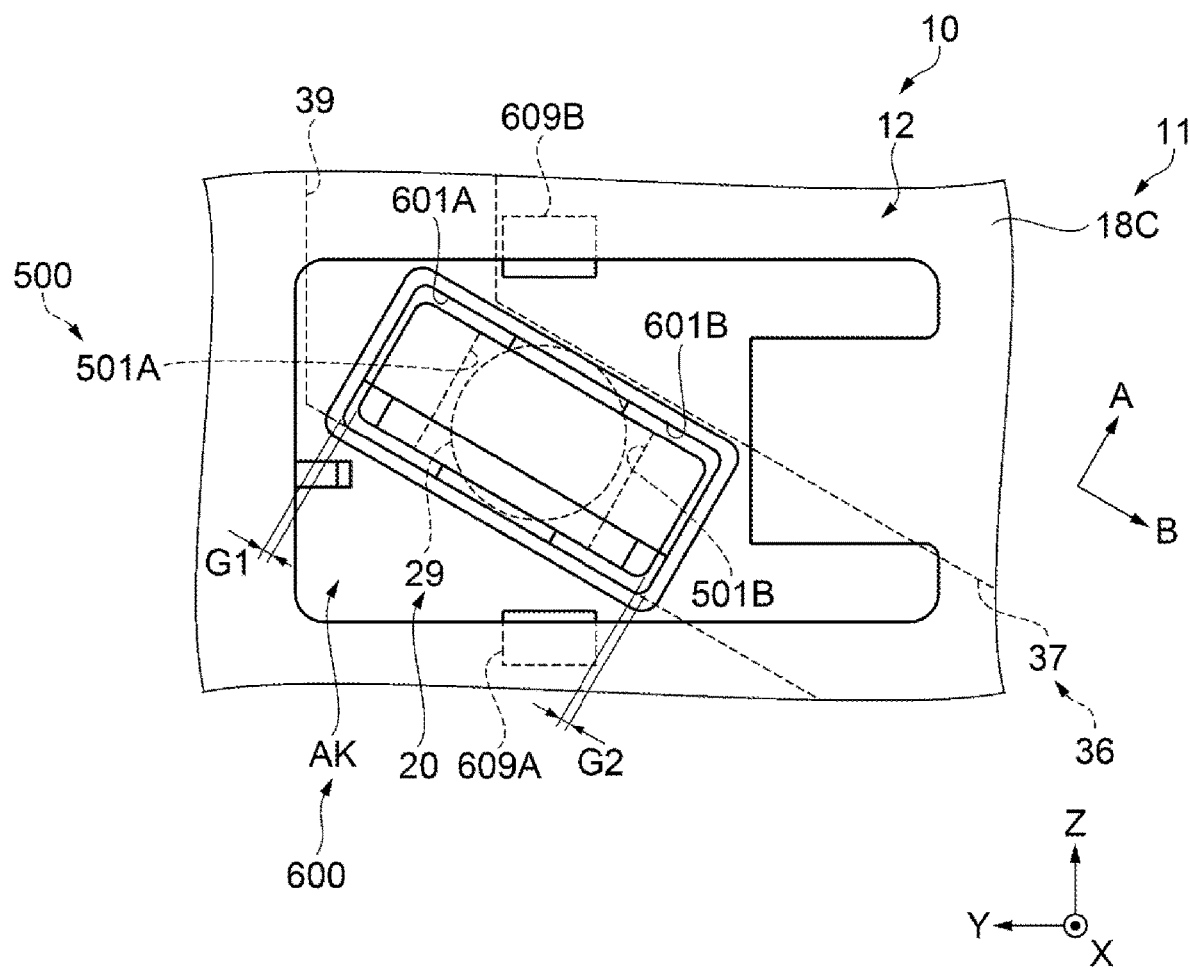
FIG. 28 is a partial front view illustrating the regulating member located in an insertion space.
Figure 29:
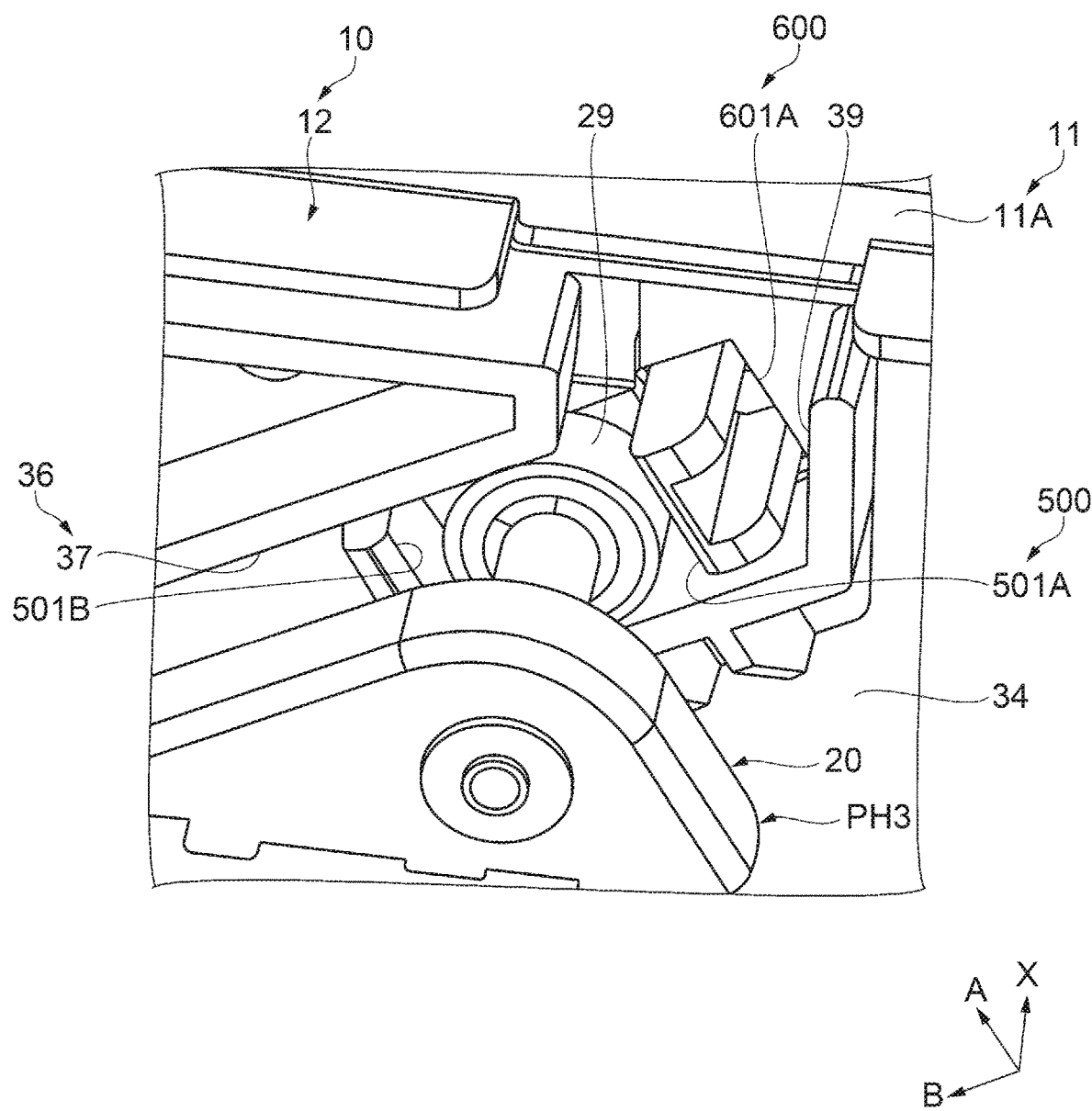
FIG. 29 is a partial perspective view illustrating the recording unit regulated by the regulating member.

Holes 601A and 601B are provided in the bottom surface 603. As illustrated in FIG. 28, the holes 601A and 601B are through-holes disposed at an interval in the B direction. The holes 601A and 601B are through-holes through which regulating portions 501A and 501B of the regulating member 500 to be described later can pass when the regulating member 500 is inserted into the insertion space SK. Then, as illustrated in FIG. 29, the regulating portions 501A and 501B that have passed through the holes 601A and 601B protrude to the guide rail 37 side that is the −X direction side of the accommodation portion 600. When the regulating portions 501A and 501B protruding to the guide rail 37 side come into contact with the guide roller 29 of the recording unit 20 located at the maintenance position PH3, the regulating member 500 regulates the movement of the recording unit 20 in the B direction.

For this reason, as illustrated in FIG. 27, the holes 601A and 601B are provided at positions overlapping the guide rail 37 when viewed from a direction along the X-axis direction. In addition, the hole 601A and the hole 601B are disposed at an interval in the B direction so that the guide roller 29 of the recording unit 20 located at the maintenance position PH3 is positioned between the hole 601A and the hole 601B in the B direction. Thus, the insertion space SK and the accommodation portion 600 including the insertion space SK are provided at positions overlapping the guide rail 37 when viewed from a direction along the X-axis direction.

Note that, as illustrated in FIG. 28, a gap G1 is provided on the −B direction side of the regulating member 500 between the regulating member 500 inserted into the insertion space SK and the hole 601A. In addition, a gap G2 is provided on the +B direction side of the regulating member 500 between the regulating member 500 inserted into the insertion space SK and the hole 601B. For this reason, when the recording unit 20 moves in the −B direction in a state where the regulating member 500 regulates the movement of the recording unit 20 in the B direction, the regulating member 500 is inclined, and thus the gap G1 becomes larger than the gap G2. In addition, when the recording unit 20 moves in the +B direction in a state where the regulating member 500 regulates the movement of the recording unit 20 in the B direction, the regulating member 500 is inclined, and thus the gap G2 becomes larger than the gap G1.

The regulating member 500 regulates the movement of the recording unit 20 located at the maintenance position PH3 in the B direction by being inserted into the insertion space SK of the accommodation portion 600. The regulating member 500 is inserted into the insertion space SK when the recording unit 20 is located at the maintenance position PH3. As illustrated in FIGS. 22 to 25, the regulating member 500 includes the regulating portion 501, an extension portion 502, a base portion 503, and deformable portions 510A and 510B.

The regulating portion 501 includes the pair of regulating portions 501A and 501B. The regulating portions 501A and 501B are columnar protrusions that protrude from the base portion 503. The regulating portion 501A and the regulating portion 501B are disposed at an interval therebetween, and the base portion 503 is positioned between the regulating portion 501A and the regulating portion 501B. The extension portion 502 is a plate-shaped protrusion extending from the base portion 503 in a direction opposite to a direction in which the regulating portions 501A and 501B protrude from the base portion 503. When the regulating member 500 is accommodated in the accommodation portion 600, the outer surface of the regulating member 500 viewed from the +X direction side of the accommodation portion 600 is formed by the extension portion 502, the base portion 503, and the regulating portion 501.

As illustrated in FIGS. 14 and 26, when the regulating member 500 is accommodated in the accommodation portion 600, the outer surface of the regulating member 500 covers the opening of the accommodation space AK of the accommodation portion 600 on the +X direction side. When the regulating member 500 is accommodated in the accommodation portion 600, the outer surface of the regulating member 500 is flush with the outer surface of the accommodation exterior 18C on the +X direction side. Thereby, it is difficult for the user to remove the regulating member 500 from the accommodation portion 600. In addition, the regulating member 500 is configured such that the outer surface of the regulating member 500 has the same color as the outer surface of the accommodation exterior 18C on the +X direction side. Thereby, when the regulating member 500 is accommodated in the accommodation portion 600, the regulating member 500 fits into the accommodation exterior 18C, and when the regulating member 500 is a member separate from the accommodation exterior 18C, the regulating member 500 is unlikely to be recognized by the user.

As illustrated in FIGS. 22 to 25, the engaged portion 509 includes the pair of engaged portions 509A and 509B. The engaged portion 509A is a protrusion disposed on the distal end side of the deformable portion 510A. The engaged portion 509B is a protrusion disposed on the distal end side of the deformable portion 510B. The deformable portions 510A and 510B are thin plate-shaped protrusions that protrude from a surface of the regulating member 500 which is opposite to the outer surface of the regulating member 500 formed by the extension portion 502. For this reason, the deformable portions 510A and 510B are elastically deformable. When the deformable portions 510A and 510B are elastically deformed, the engaged portions 509A and 509B are displaced. The engaged portion 509A and the engaged portion 509B are disposed at an interval so that the engaged portion 509A engages with the engaging portion 609A and the engaged portion 509B engages with the engaging portion 609B when the regulating member 500 is accommodated in the accommodation portion 600.

As illustrated in FIG. 26, when the regulating member 500 is located in the accommodation space AK of the accommodation portion 600, the engaged portions 509A and 509B engage with the engaging portions 609A and 609B of the accommodation portion 600 to thereby be fixed to the accommodation portion 600. For example, when the regulating member 500 is accommodated in the accommodation portion 600, the service man sets the second door 18D to be in an open state and aligns the engaged portions 509A and 509B of the regulating member 500 with the positions of the engaging portions 609A and 609B of the accommodation portion 600. Then, the service man inserts the engaged portions 509A and 509B into the accommodation space AK of the accommodation portion 600. Thereby, the engaged portions 509A and 509B engage with the engaging portions 609A and 609B of the accommodation portion 600, and the regulating member 500 is fixed to the accommodation portion 600.

In addition when the regulating member 500 fixed to the accommodation portion 600 is removed from the accommodation portion 600, the service man sets the second door 18D to be in an open state and inserts a pair of tweezers or the like into a gap between the regulating member 500 and the accommodation portion 600 from the +X direction side. Then, the service man deforms the deformable portion 510A of the regulating member 500 in the +Z direction and deforms the deformable portion 510B in the −Z direction. Thereby, the engagement between the engaged portions 509A and 509B of the regulating member 500 and the engaging portions 609A and 609B of the accommodation portion 600 is released. Then, the regulating member 500 is moved in the +X direction to be removed from the accommodation portion 600.

When the regulating member 500 is inserted into the insertion space SK, the service man sets the second door 18D to be in an open state. Then, as illustrated in FIG. 27, it is confirmed that the guide roller 29 is positioned between the hole 601A and the hole 601B in the B direction. When the guide roller 29 is not positioned between the hole 601A and the hole 601B, the service man moves the recording unit 20 to the maintenance position PH3. Then, the service man inserts the regulating member 500 into the insertion space SK in a state where the regulating portion 501A faces the hole 601A and the regulating portion 501B faces the hole 601B. When the regulating member 500 is inserted into the accommodation portion 600 to a position where the base portion 503 of the regulating member 500 comes into contact with the bottom surface 603 of the accommodation portion 600, the regulating portions 501A and 501B protrude to the guide rail 37 side.

Thereby, the regulating portions 501A and 501B can come into contact with the guide roller 29 of the recording unit 20 located at the maintenance position PH3. Then, the regulating member 500 can regulate the movement of the recording unit 20 in the B direction. Specifically, the +B direction side of the regulating portion 501A comes into contact with the guide roller 29, and thus the regulating member 500 regulates the movement of the recording unit 20 in the −B direction. In addition, when the −B direction side of the regulating portion 501B comes into contact with the guide roller 29, the regulating member 500 regulates the movement of the recording unit 20 in the +B direction. In this case, the position where the base portion 503 of the regulating member 500 comes into contact with the bottom surface 603 of the accommodation portion 600 is a position where the regulating portion 501 comes into contact with the guide roller 29 of the recording unit 20. That is, the regulating member 500 is attachable to and detachable from a position where the regulating portion 501 comes into contact with the guide roller 29 of the recording unit 20. The position where the regulating portion 501 comes into contact with the guide roller 29 of the recording unit 20 is an example of a contact position. Note that, when the second door 18D is in an open state and the regulating member 500 is located at a contact position, the recording unit 20 is not visible from the outside.

The regulating member 500 may be formed of a material having rigidity lower than that of the material constituting the guide roller 29 with which the regulating portion 501 comes into contact. Thereby, for example, when the regulating portion 501 of the regulating member 500 and the guide roller 29 of the recording unit 20 are in contact with each other, it is assumed that vibration or impact more than expected is received. In this case, since the regulating portion 501 or the regulating member 500 is deformed to alleviate vibration or impact, and it is possible to suppress deterioration in the performance of the guide roller 29 or the recording unit 20. Note that the regulating member 500 of the present embodiment is formed of polypropylene (PP).

Figure 23:
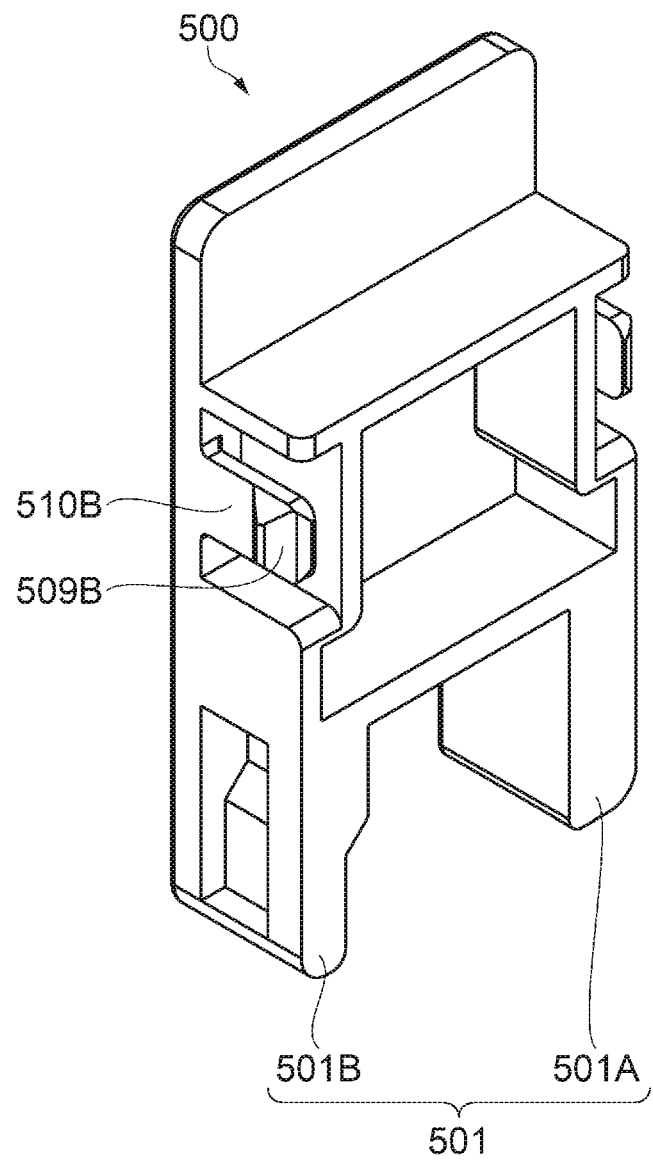
FIG. 23 is a perspective view illustrating the regulating member for regulating movement of the recording unit.
Figure 24:
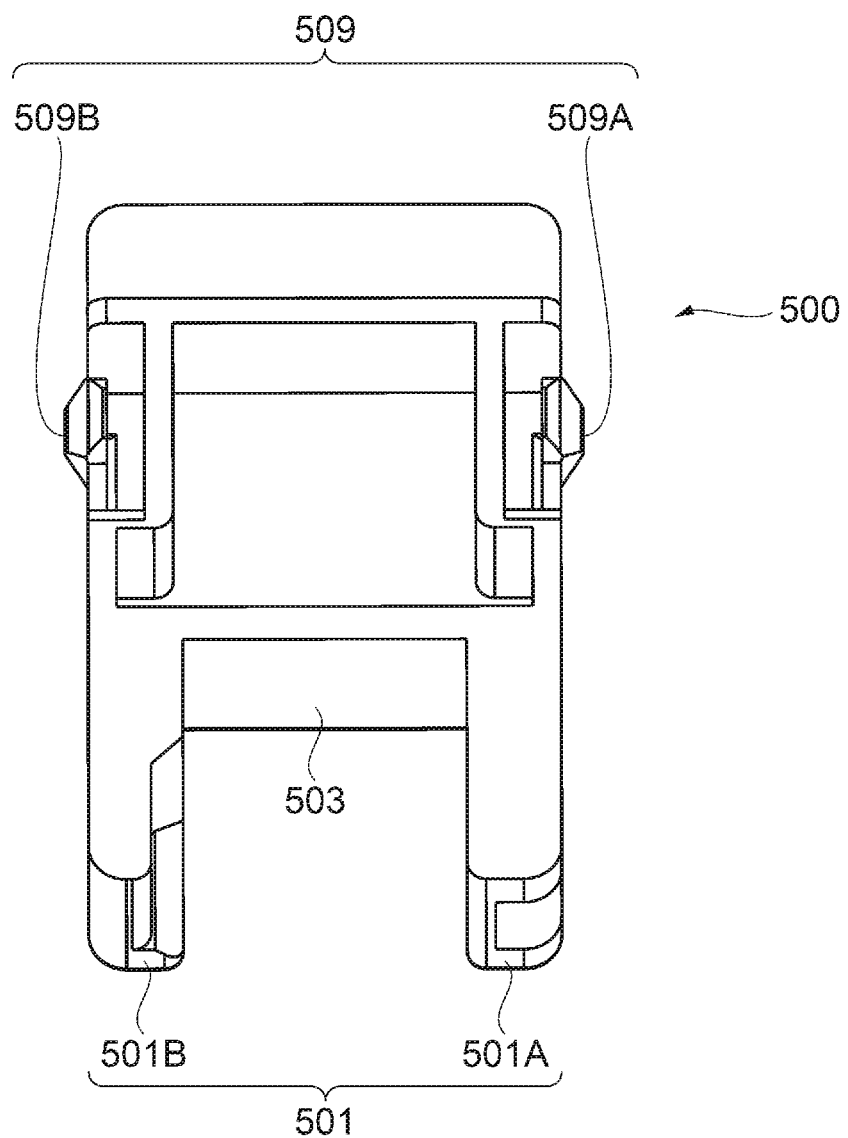
FIG. 24 is a perspective view illustrating the regulating member for regulating movement of the recording unit.
Figure 25:
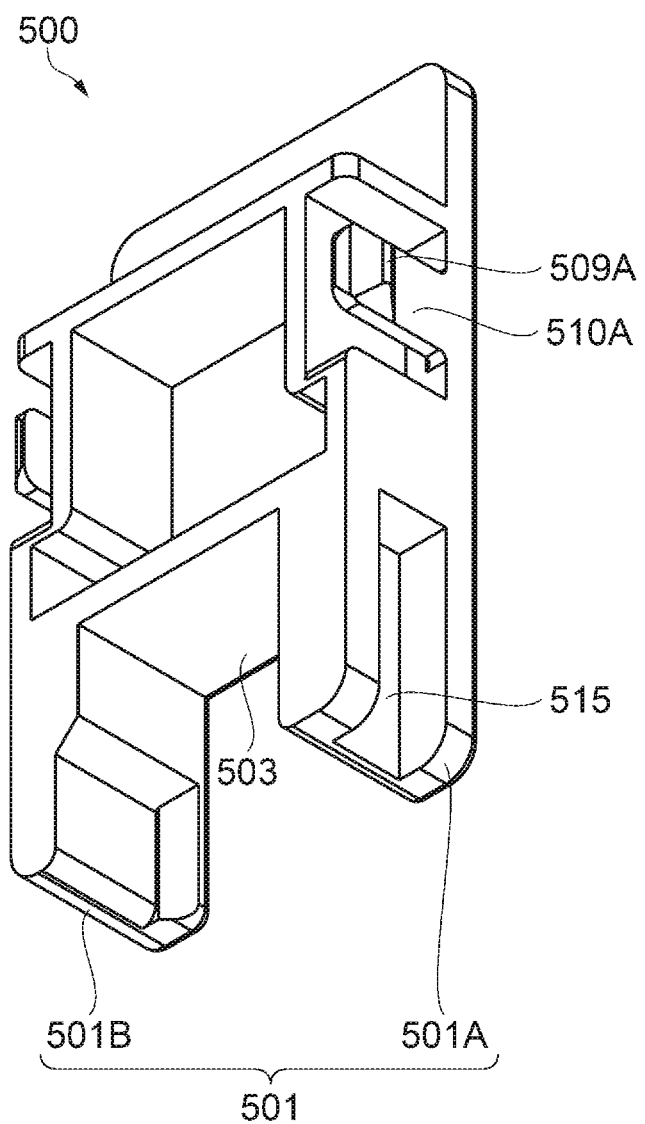
FIG. 25 is a perspective view illustrating the regulating member for regulating movement of the recording unit.

Note that, as illustrated in FIG. 27, a rib 615 protruding in the +B direction is disposed on the inner surface of the accommodation portion 600 that defines the contour of the insertion space SK on the −B direction side. In addition, as illustrated in FIGS. 23 to 25, a groove 515 through which the rib 615 can pass when the regulating member 500 is inserted into the insertion space SK is disposed in the regulating portion 501A of the regulating portion 501 of the regulating member 500. Thereby, in the present embodiment, the regulating member 500 is prevented from being inserted into the insertion space SK in a state where the regulating portion 501B faces the hole 601A and the regulating portion 501A faces the hole 601B.

As described above, according to the recording device 10 of the first embodiment, the following effects can be obtained.

The recording device 10 includes the moving portion MP that is movable in the moving direction MD intersecting a horizontal direction, and the regulating members 200 and 500 that respectively include the regulating portions 201 and 501 and can be attached to or detached from positions where the regulating portions 201 and 501 come into contact with a part of the moving portion MP, and the regulating members 200 and 500 regulate the movement of the moving portion MP in the moving direction MD by the regulating portions 201 and 501 coming into contact with a part of the moving portion MP. Thereby, the recording device 10 includes the regulating members 200 and 500 that regulate the movement of the moving portion MP, and thus it is possible to suppress a positional deviation of the moving portion MP due to vibration, impact, or the like. In addition, since the regulating portions 201 and 501 of the regulating members 200 and 500 are not fixed to the moving portion MP by means of a screw or the like, it is possible to regulate the movement of the moving portion MP with a simple configuration, and it is easy to miniaturize the recording device 10.

The recording device 10 includes the accommodation portions 300 and 600 that can accommodate the regulating members 200 and 500. Thereby, the regulating members 200 and 500 can be accommodated in the accommodation portions 300 and 600 when the regulating members 200 and 500 do not regulate the movement of the moving portion MP. In other words, since the regulating members 200 and 500 can be accommodated in the accommodation portions 300 and 600 when the regulating members 200 and 500 are not used, the regulating members 200 and 500 are unlikely to be lost.

When the regulating members 200 and 500 are located in the accommodation portions 300 and 600, the regulating members are fixed to the accommodation portions 300 and 600. Thereby, when the regulating members 200 and 500 are not used, the regulating members 200 and 500 are accommodated in and fixed to the accommodation portions 300 and 600, and thus the regulating members 200 and 500 are unlikely to be lost.

The accommodation portions 300 and 600 include the engaging portions 309, 312, 609A, and 609B, and the regulating members 200 and 500 include the engaged portions 209, 213, 509A, and 509B that engage with the engaging portions 309, 312, 609A, and 609B. Thereby, when the regulating members 200 and 500 are not used, the regulating members 200 and 500 are accommodated in the accommodation portions 300 and 600 and fixed by engagement, and thus the regulating members 200 and 500 are unlikely to be lost.

The regulating members 200 and 500 include the engaged portions 209, 509A, and 509B in the elastically deformable portions 210, 510A, and 510B. Thereby, it is possible to displace the engaged portions 209, 509A, and 509B by deforming the deformable portions 210, 510A, and 510B and perform engagement and disengagement between the engaged portions 209, 213, 509A, and 509B and the engaging portions 309, 312, 609A, and 609B.

The cap portion 62 includes the rack 71, and the regulating portion 201 of the regulating member 200 engages with the rack 71, thereby regulating the movement of the cap portion 62 in the A direction. Thereby, it is possible to realize a preferable configuration in which the movement of the cap portion 62 is regulated at the time of transporting the recording device 10, or the like.

The recording device 10 includes the fitting portion 400 into which the regulating member 200 is fitted, the regulating member 200 is fitted into the fitting portion 400 so that the regulating portion 201 engages with the rack 71, and the regulating member 200 includes the protruding portion 212 that protrudes from the fitting portion 400 when the regulating portion 201 engages with the rack 71. Thereby, since the protruding portion 212 can be pinched, the regulating member 200 can be easily removed from the fitting portion 400.

The fitting portion 400 has the inner surface 406 that defines the space HK into which the regulating member 200 is fitted, and the inner surface 406 faces the rack 71 in the direction in which the regulating member 200 is fitted into the fitting portion 400. The regulating member 200 has the outer surface 206 that comes into contact with the inner surface 406, and the outer surface 207 that does not come into contact with the inner surface 406 on a side facing the inner surface 406 when the regulating member 200 is located in the space HK, and the outer surface 207 is a rounded surface that continues from the outer surface 206 on the back side in the space HK and becomes more distant from the inner surface 406 toward the back side. Thereby, the regulating member 200 is easily fitted into the fitting portion 400. In addition, the regulating member 200 is easily removed from the fitting portion 400.

The recording device 10 includes the recording unit 20 capable of ejecting ink from the nozzles N, and the cap portion 62 including the cap 64 covering the nozzles N and movable to the capping position PC2 where the cap 64 covers the nozzles N and the non-capping position PC1 where the cap 64 is separated from the capping position PC2, and the moving portion MP is the cap portion 62. Thereby, it is possible to realize a preferable configuration for restricting the movement of the cap portion 62.

The recording device 10 includes the accommodation portion 300 capable of accommodating the regulating member 200 when the regulating member 200 does not regulate the movement of the cap portion 62, and the first door 16 capable of taking an open state in which the accommodation portion 300 can be accessed and a closed state in which the accommodation portion 300 cannot be accessed, and the regulating member 200 is accommodated in the accommodation portion 300 so as not to be visually recognized when the first door 16 is in an open state. Thereby, since the regulating member 200 is accommodated at a position where it cannot be visually recognized when the first door 16 is in an open state, it is possible to prevent the user from handling the regulating member 200.

The recording device 10 includes the transport path forming member 105 that forms the transport path T1 through which the medium M on which recording is performed by ejection of ink from the recording unit 20 is transported, the transport path forming member 105 is displaced to the separation position SP when the first door 16 is in an open state and the transport position TP when the first door 16 is in a closed state, the separation position SP is a position where the transport path forming member 105 covers the accommodation portion 300, and the transport position TP is a position where the transport path forming member 105 can transport the medium M and the transport path forming member 105 does not cover the accommodation portion 300. Thereby, the regulating member 200 can be accommodated at a position that cannot be visually recognized when the first door 16 is in an open state, without separately providing a cover member that covers the accommodation portion 300.

The recording device 10 includes the guide rail 37 extending in the B direction, the moving portion MP includes the guide roller 29 guided to the guide rail 37, and the regulating member 500 regulates the movement of the moving portion MP in the B direction by the regulating portion 501 coming into contact with the guide roller 29. Thereby, it is possible to realize a preferable configuration for regulating the movement of the moving portion MP at the time of transporting the recording device 10, or the like.

The recording device 10 includes the recording unit 20 that can eject ink from the nozzles N, and the moving portion MP is the recording unit 20.

Thereby, it is possible to realize a preferable configuration for regulating the movement of the recording unit 20.

The recording device 10 includes the accommodation portion 600 capable of accommodating the regulating member 500 when the regulating member 500 does not regulate the movement of the recording unit 20, the accommodation portion 600 has the holes 601A and 601B in its bottom surface 603 and is provided at a position that overlaps the guide rail 37 when viewed from the direction along the X-axis direction, and the regulating member 500 regulates the movement of the recording unit 20 by the regulating portion 501 coming into contact with the guide roller 29 via the holes 601A and 601B.

Thereby, the regulating member 500 can be changed from a state where it is accommodated in the accommodation portion 600 to a state where the movement of the recording unit 20 is regulated without taking time and effort.

Further, the holes 601A and 601B of the accommodation portion 600 can be hidden by the regulating member 500 accommodated in the accommodation portion 600.

The recording device 10 includes the second door 18D capable of taking an open state where the accommodation portion 600 can be accessed and a closed state where the accommodation portion 600 cannot be accessed, and the regulating member 500 located in the accommodation portion 600 can be visually recognized by setting the second door 18D to be in an open state and cannot be visually recognized by setting the second door 18D to be in a closed state. Thereby, since the regulating member 500 is accommodated at a position where the regulating member 500 cannot be visually recognized when the second door 18D is in a closed state, it is possible to prevent the user from handling the regulating member 200.

Next, a flow of processing when the control unit 95 confirms whether there is the regulating member RM will be described with reference to a flowchart illustrated in FIG. 30. In the present embodiment, the flow of processing when the control unit 95 confirms whether there is the regulating member RM corresponds to a method of controlling the recording device 10. The confirmation regarding whether there is the regulating member RM is executed at the time of initial start-up of the recording device 10 and at the time of start-up of the recording device 10 in which a transport mode is set. At this time, the confirmation regarding whether there is the regulating member RM is executed before a normal initialization operation of the recording device 10 which is performed when the recording device 10 is started up.

In the present embodiment, installation of the recording device 10 and re-transportation after the installation are performed by a service man. When the re-transportation is performed after the installation of the recording device 10, the service man sets a transportation mode before the re-transportation and mounts the regulating member RM. Thereby, it is confirmed whether there is the regulating member RM when the recording device 10 is started up after being transported again.

Figure 30:
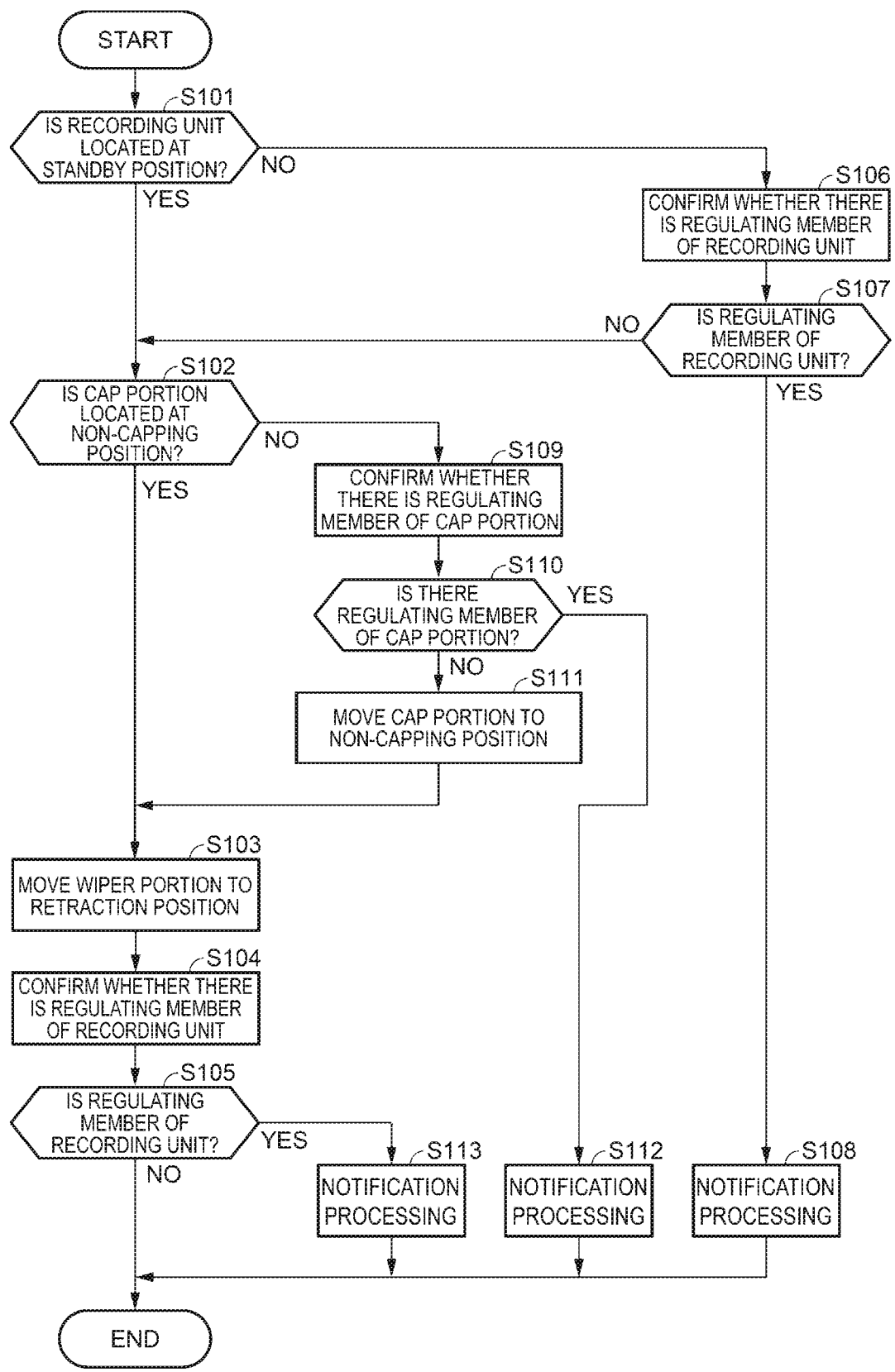
FIG. 30 is a flowchart illustrating processing for confirming the presence or absence of the regulating member.

In step S101 of FIG. 30, the control unit 95 confirms whether the recording unit 20 is located at the standby position PH2. When the sensor SE1 detects the recording unit 20, the control unit 95 determines that the recording unit 20 is located at the standby position PH2. When the sensor SE1 does not detect the recording unit 20, the control unit 95 determines that the recording unit 20 is not located at the standby position PH2. When the recording unit 20 is located at the standby position PH2, a result in step S101 is YES, and the control unit 95 causes the processing to proceed to step S102. When the recording unit 20 is not located at the standby position PH2, a result in step S101 is NO, and the control unit 95 causes the processing to proceed to step S106.

In step S106, the control unit 95 performs an operation of confirming whether there is the regulating member 500 that regulates the movement of the recording unit 20. As the operation of confirming whether there is the regulating member 500 of the recording unit 20, the control unit 95 drives the driving motor of the elevation driving unit 41 by a predetermined amount. In this case, in consideration of the fact that the cap portion 62 is located at the capping position PC2, the control unit 95 drives the driving motor of the elevation driving unit 41 by a predetermined amount in a direction in which the recording unit 20 moves in the −B direction. When the regulating member 500 is located at a contact position, and the recording unit 20 is moved in the B direction, the movement of the recording unit 20 is regulated by the regulating member 500. Thereby, the control unit 95 confirms whether there is the regulating member 500 of the recording unit 20 by using the fact that a driving load of the driving motor increases.

The control unit 95 monitors a driving load of the driving motor by measuring a driving current value in driving the driving motor of the elevation driving unit 41. When the driving current value equal to or larger than a set value is detected, the control unit 95 determines that the regulating member 500 of the recording unit 20 is mounted at the contact position. When the driving current value equal to or greater than the set value is not detected, and the driving motor is driven by a predetermined amount, the control unit 95 determines that there is no regulating member 500 of the recording unit 20.

When the operation of confirming whether there is the regulating member 500 of the recording unit 20 is performed, the control unit 95 causes the processing to proceed to step S107. In step S107, the control unit 95 confirms whether there is the regulating member 500 of the recording unit 20. When there is the regulating member 500 of the recording unit 20, a result in step S107 is YES, and the control unit 95 causes the processing to proceed to step S108. When there is no regulating member 500 of the recording unit 20, a result in step S107 is NO, and the control unit 95 causes the processing to proceed to step S102.

In step S108, the control unit 95 performs notification processing. In the notification processing, the control unit 95 displays a message on the display unit 14A of the operation unit 14 to prompt removal of the regulating member 500 that has not been removed. After the notification processing is performed, the control unit 95 terminates the processing.

In step S102, the control unit 95 confirms whether the cap portion 62 is located at the non-capping position PC1. When the sensor SE2 detects the cap portion 62, the control unit 95 determines that the cap portion 62 is located at the non-capping position PC1. When the sensor SE2 does not detect the cap portion 62, the control unit 95 determines that the cap portion 62 is not located at the non-capping position PC1.

When the cap portion 62 is located at the non-capping position PC1, a result in step S102 is YES, and the control unit 95 causes the processing to proceed to step S103. When the cap portion 62 is not located at the non-capping position PC1, a result in step S102 is NO, and the control unit 95 causes the processing to proceed to step S109.

In step S109, the control unit 95 performs an operation of confirming whether there is the regulating member 200 that regulates the movement of the cap portion 62. As the operation of confirming whether there is the regulating member 200 of the cap portion 62, the control unit 95 drives the driving motor of the first slide driving unit 75 by a predetermined amount in a direction in which the cap portion 62 moves in the −A direction. When the regulating member 200 is located at the contact position, and the cap portion 62 is moved in the −A direction, the movement of the cap portion 62 is regulated by the regulating member 200. Thereby, the control unit 95 confirms whether there is the regulating member 200 of the cap portion 62 by using the fact that a driving load of the driving motor increases.

The control unit 95 monitors a driving load of the driving motor by measuring a driving current value in driving the driving motor of the first slide driving unit 75. When the driving current value equal to or larger than a set value is detected, the control unit 95 determines that the regulating member 200 of the cap portion 62 is mounted at a contact position. When the driving current value equal to or greater than the set value is not detected, and the driving motor is driven by a predetermined amount, the control unit 95 determines that there is no regulating member 200 of the cap portion 62.

When the operation of confirming whether there is the regulating member 200 of the cap portion 62 is performed, the control unit 95 causes the processing to proceed to step S110. In step S110, it is confirmed whether there is the regulating member 200 of the cap portion 62. When there is the regulating member 200 of the cap portion 62, a result in step S110 is YES, and the control unit 95 causes the processing to proceed to step S112. When there is no regulating member 200 of the cap portion 62, a result in step S110 is NO, and the control unit 95 causes the processing to proceed to step S111.

In step S112, the control unit 95 performs notification processing. In the notification processing, the control unit 95 displays a message on the display unit 14A of the operation unit 14 to prompt removal of the regulating member 200 that has not been removed. After the notification processing is performed, the control unit 95 terminates the processing.

In step S111, the control unit 95 moves the cap portion 62 to the non-capping position PC1. The control unit 95 drives the driving motor of the first slide driving unit 75 in a direction in which the cap portion 62 moves in the −A direction. In addition, when the sensor SE2 detects the cap portion 62, the control unit 95 stops the driving of the driving motor. When the cap portion 62 is moved to the non-capping position PC1, the control unit 95 causes the processing to proceed to step S103.

In step S103, the control unit 95 moves the wiper portion 82 to the retraction position PW1. When the sensor SE3 does not detect the wiper portion 82, the control unit 95 drives the second slide motor 87 in a direction in which the wiper portion 82 moves in the −X direction. In addition, when the sensor SE3 detects the wiper portion 82, the control unit 95 stops driving the second slide motor 87. When the wiper portion 82 is moved to the retraction position PW1, the control unit 95 causes the processing to proceed to step S104. When step S111 is executed, step S103 may be executed in parallel with step S111.

In step S104, the control unit 95 performs an operation of confirming whether there is the regulating member 500 that regulates the movement of the recording unit 20. As the operation of confirming whether there is the regulating member 500 of the recording unit 20, the control unit 95 drives the driving motor of the elevation driving unit 41 by a predetermined amount. In step S104, the cap portion 62 is located at the non-capping position PC1, and thus the control unit 95 drives the driving motor of the elevation driving unit 41 by a predetermined amount in a direction in which the recording unit 20 moves in the +B direction.

When the operation of confirming whether there is the regulating member 500 of the recording unit 20 is performed, the control unit 95 causes the processing to proceed to step S105. In step S105, the control unit 95 confirms whether there is the regulating member 500 of the recording unit 20. When there is the regulating member 500 of the recording unit 20, a result in step S105 is YES, and the control unit 95 causes the processing to proceed to step S113. When there is no regulating member 500 of the recording unit 20, a result in step S105 is NO, and the control unit 95 terminates the processing.

In step S113, the control unit 95 performs notification processing. In the notification processing, the control unit 95 displays a message on the display unit 14A of the operation unit 14 to prompt removal of the regulating member 500 that has not been removed. After the notification processing is performed, the control unit 95 terminates the processing. In the present embodiment, the removal of the regulating member RM is performed by a service man in a state where the power supply of the recording device 10 is cut off. Then, when there is the regulating member RM in the previous processing for confirming whether there is the regulating member RM, the control unit 95 performs the processing for confirming whether there is the regulating member RM again when the recording device 10 is started up.

Next, a flow of processing when the control unit 95 performs unlocking processing will be described with reference to flowcharts illustrated in FIGS. 31 to 34. In the present embodiment, the flow of processing when the control unit 95 performs the unlocking processing corresponds to a method of controlling the recording device 10. The unlocking processing is executed in a locked state where the regulating member RM cannot be removed from the contact position.

The unlocking processing includes a plurality of unlocking processes. When the regulating member RM cannot be removed from the contact position, the service man operates the operation unit 14 to select any one of the plurality of unlocking processes. In the present embodiment, the unlocking processing includes an automatic unlocking process HA, selective unlocking processes HM1 and HM2, and a selective unlocking process CM1. The control unit 95 executes the unlocking process selected by the service man. In other words, the control unit 95 executes the unlocking process based on the service man's instruction for the unlocking process.

First, the automatic unlocking process HA executed by the control unit 95 in a locked state where the regulating member 500 cannot be removed from the contact position will be described. In the automatic unlocking process HA, the control unit 95 moves the recording unit 20 in either the +B direction or the −B direction based on the locked state determined from the position of the recording unit 20 detected by the sensor SE1. When the service man gives an instruction for the automatic unlocking process HA of the regulating member 500, the control unit 95 executes the processing illustrated in FIG. 31.

Figure 31:
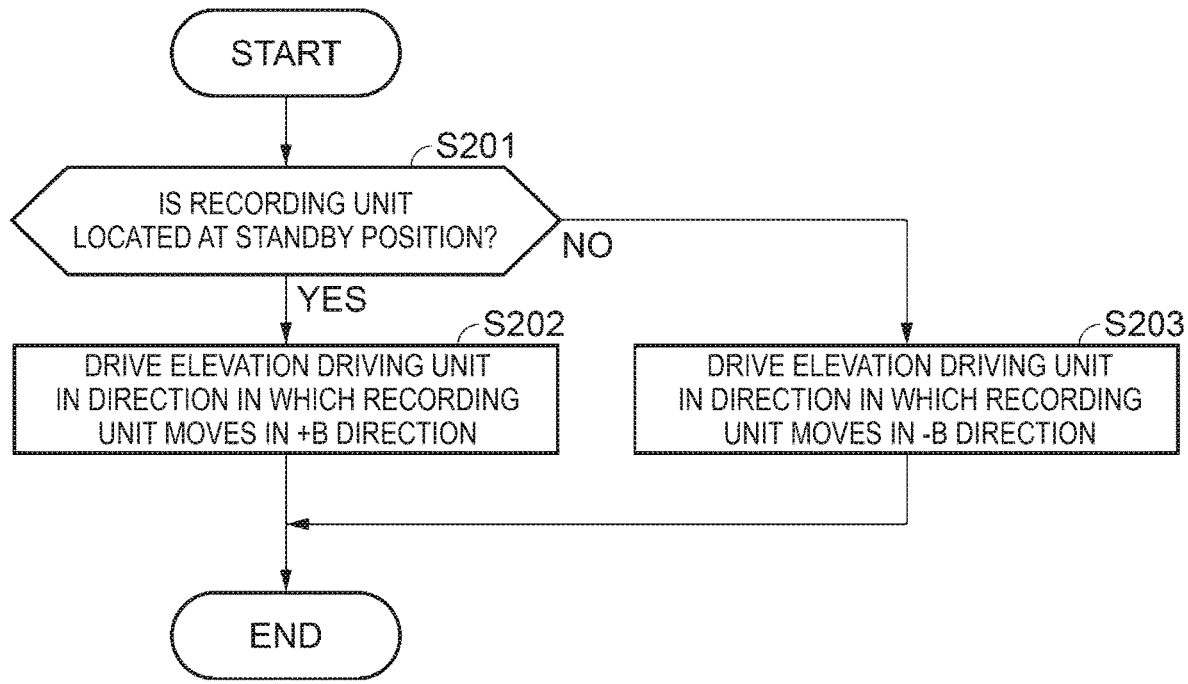
FIG. 31 is a flowchart illustrating an automatic unlocking process.
Figure 32:
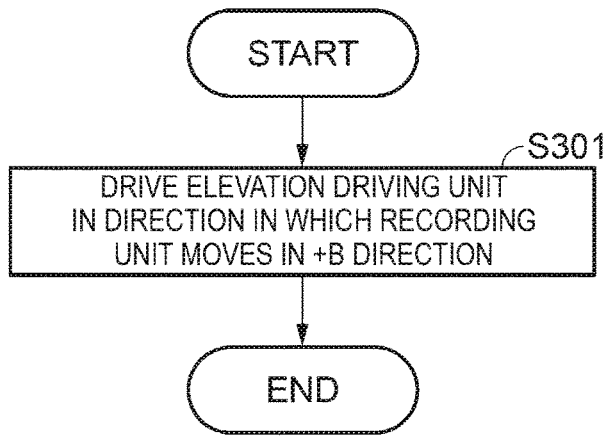
FIG. 32 is a flowchart illustrating a selective unlocking process.
Figure 33:
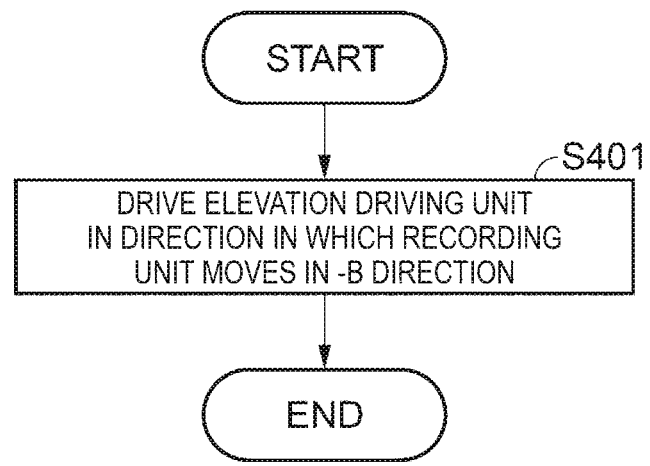
FIG. 33 is a flowchart illustrating a selective unlocking process.
Figure 34:
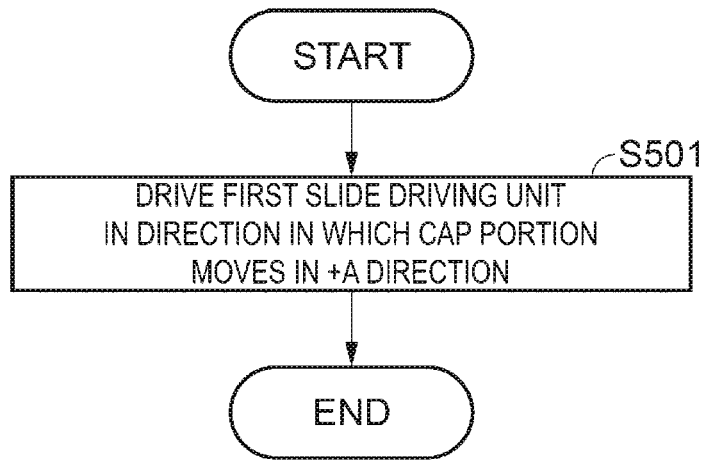
FIG. 34 is a flowchart illustrating a selective unlocking process.

In step S201 of FIG. 31, the control unit 95 confirms whether the recording unit 20 is located at the standby position PH2. When the sensor SE1 detects the recording unit 20, the control unit 95 determines that the recording unit 20 is located at the standby position PH2. When the sensor SE1 does not detect the recording unit 20, the control unit 95 determines that the recording unit 20 is not located at the standby position PH2.

When the recording unit 20 is located at the standby position PH2, a result in step S201 is YES, and the control unit 95 determines that the locked state is a first locked state due to the movement of the recording unit 20 in the −B direction, and causes the processing to proceed to step S202. When the recording unit 20 is not located at the standby position PH2, a result in step S201 is NO, and the control unit 95 determines that the locked state is a second locked state due to the movement of the recording unit 20 in the +B direction, and causes the processing to proceed to step S203.

In step S202, the control unit 95 drives the driving motor of the elevation driving unit 41 by a predetermined amount in a direction in which the recording unit 20 moves in the +B direction. That is, in the automatic unlocking process HA of the regulating member 500, when the regulating member 500 is in the first locked state, the control unit 95 moves the recording unit 20 in the +B direction. When the processing of step S202 is performed, the control unit 95 terminates the processing.

In step S203, the control unit 95 drives the driving motor of the elevation driving unit 41 by a predetermined amount in a direction in which the recording unit 20 moves in the −B direction. That is, in the automatic unlocking process HA of the regulating member 500, when the regulating member 500 is in the second locked state, the control unit 95 moves the recording unit 20 in the −B direction. When the processing of step S203 is performed, the control unit 95 terminates the processing.

Next, the selective unlocking processes HM1 and HM2 executed by the control unit 95 in the locked state where the regulating member 500 cannot be removed from the contact position will be described. The selective unlocking process HM1 is a process of moving the recording unit 20 in the +B direction. The selective unlocking process HM2 is a process of moving the recording unit 20 in the −B direction.

When it is desired to move the recording unit 20 in the +B direction in order to cancel the locked state of the regulating member 500, the service man selects the selective unlocking process HM1. When it is desired to move the recording unit 20 in the −B direction in order to cancel the locked state of the regulating member 500, the service man selects the selective unlocking process HM2. The selective unlocking processes HM1 and HM2 are processes in which the control unit 95 moves the recording unit 20 in either the +B direction or the −B direction based on the service man's instruction for canceling the locked state. When the regulating member 500 cannot be removed from the contact position after the automatic unlocking process HA is executed, the service man may select the selective unlocking processes HM1 and HM2.

For example, when the regulating member 500 cannot be removed from the contact position, the service man sets the second door 18D to be in an open state and confirms the state of the regulating member 500 inserted into the insertion space AK of the accommodation portion 600. At this time, for example, it is assumed that the gap G1 (see FIG. 28) on the −B direction side of the regulating member 500 inserted into the insertion space AK of the accommodation portion 600 is larger than the gap G2 (see FIG. 28) on the +B direction side of the regulating member 500.

In this case, the service man determines that the locked state of the regulating member 500 is the first locked state, and selects the selective unlocking process HM1 by operating the operation unit 14. When the service man gives an instruction for the selective unlocking process HM1 of the regulating member 500, the control unit 95 executes the processing illustrated in FIG. 32. In step S301 of FIG. 32, the control unit 95 drives the driving motor of the elevation driving unit 41 by a predetermined amount in a direction in which the recording unit 20 moves in the +B direction. When the processing of step S301 is performed, the control unit 95 terminates the processing.

In addition, for example, it is assumed that the gap G2 on the +B direction side of the regulating member 500 inserted into the insertion space AK of the accommodation portion 600 is larger than the gap G1 on the −B direction side of the regulating member 500. In this case, the service man determines that the locked state of the regulating member 500 is the second locked state, and selects the selective unlocking process HM2 by operating the operation unit 14. When the service man gives an instruction for the selective unlocking process HM2 of the regulating member 500, the control unit 95 executes the processing illustrated in FIG. 33. In step S401 of FIG. 33, the control unit 95 drives the driving motor of the elevation driving unit 41 by a predetermined amount in a direction in which the recording unit 20 moves in the −B direction. When the processing of step S401 is performed, the control unit 95 terminates the processing.

Next, the selective unlocking process CM1 executed by the control unit 95 in the locked state where the regulating member 200 cannot be removed from the contact position will be described. In the present embodiment, the cap portion 62 does not move in the +A direction from the capping position PC2. For this reason, in the locked state where the regulating member 200 cannot be removed from the contact position, the unlocking processing executed by the control unit 95 is only the selective unlocking process CM1. In the selective unlocking process CM1, the first locked state due to the movement of the cap portion 62 in the −A direction is canceled.

When it is desired to move the cap portion 62 in order to cancel the locked state of the regulating member 200, the service man selects the selective unlocking process CM1. The selective unlocking process CM1 is a process in which the control unit 95 moves the cap portion 62 in the +A direction based on the service man's instruction for canceling the locked state.

For example, it is assumed that the service man selects the selected unlocking process CM1 by operating the operation unit 14. When the service man gives an instruction for the selective unlocking process CM1 of the regulating member 200, the control unit 95 executes the processing illustrated in FIG. 34. In step S501 of FIG. 34, the control unit 95 drives the driving motor of the first slide driving unit 75 by a predetermined amount in a direction in which the cap portion 62 moves in the +A direction. When the processing of step S501 is performed, the control unit 95 terminates the processing.

When the regulating member RM cannot be removed even when the unlocking processing is executed, the service man cancels the locked state of the regulating member RM by manually driving any one of the elevation driving unit 41 and the first slide driving unit 75. For example, when the regulating member 500 cannot be removed, the service man removes the exterior member from the rear frame 11B. Then, the service man rotates the operation portion 41H of the elevation driving unit 41 to manually drive the driving motor of the elevation driving unit 41. Thereby, the service man cancels the locked state of the regulating member 500 and removes the regulating member 500 from the insertion space AK of the accommodation portion 600.

For example, when the regulating member 200 cannot be removed, the service man removes the exterior member including the accommodation exterior 18C from the front frame 11A. Then, the service man rotates the operation portion 75H of the first slide driving unit 75 to manually drive the driving motor of the elevation driving unit 41. Thereby, the service man cancels the locked state of the regulating member 200 and removes the regulating member 200 from the fitting portion 400 of the accommodation portion 300.

As described above, according to the recording device 10 and the method of controlling the recording device 10 according to the first embodiment, the following effects can be obtained.

The recording device 10 includes the moving portion MP that is movable in the moving direction MD including a first direction and a second direction opposite to the first direction, and the control unit 95. The movement of the moving portion MP in the moving direction MD is regulated by mounting the regulating member RM, which is attachable to and detachable from a contact position, at the contact position. In addition, in the locked state of the regulating member RM in which the regulating member RM cannot be removed from the contact position, the control unit 95 can execute unlocking processing for canceling the locked state. The locked state includes a first locked state achieved by moving the moving portion MP in the first direction. The locked state includes a second locked state achieved by moving the moving portion MP in the second direction. In the unlocking processing, when the regulating member RM is in the first locked state, the moving portion MP moves in the second direction. In the unlocking processing, when the regulating member RM is in the second locked state, the moving portion MP moves in the first direction. Thereby, the control unit 95 executes the unlocking processing, and thus it is possible to easily remove the regulating member RM without taking time and effort such as manually driving the driving unit of the moving portion MP by the service man.

The recording device 10 includes a detection portion DP that detects the position of the moving portion MP. The unlocking processing includes an automatic unlocking process in which control unit 95 moves moving portion MP based on the locked state determined from the detected position of the moving portion MP. Thereby, the detection portion DP detects the position of the moving portion MP, and thus it is possible to perform an appropriate unlocking operation in accordance with the locked state.

In the case of the first locked state, the moving portion MP is detected by the detection portion DP. Thereby, in the case of the first locked state, the moving portion MP is detected by the detection portion DP, and thus it is possible to easily detect which locked state is set.

The detection portion DP detects whether the moving portion MP is located at a reference position. Thereby, it is not necessary to separately provide a detection portion that detects a reference position and a detection portion that detects a locked state.

The unlocking processing includes the selective unlocking processes HM1 and HM2 in which the control unit 95 moves the moving portion MP based on an instruction for canceling a locked state. Thereby, the service man himself or herself can select a direction in which the moving portion MP is to be moved to perform unlocking processing.

The moving direction MD is a direction intersecting the horizontal direction. Thereby, in the moving portion MP configured to be movable in an oblique direction, the regulating member RM is particularly necessary because the moving portion MP easily receives vibration during transportation. However, since the control unit 95 performs the unlocking processing, the regulating member RM can be easily removed.

The recording device 10 includes the recording unit 20 capable of ejecting ink from the nozzles N, and the moving portion MP is the recording unit 20. Thereby, since the control unit 95 executes the unlocking processing, it is possible to easily remove the regulating member 500 without taking time and effort such as manually driving the driving unit of the recording unit 20 by the service man.

The recording device 10 includes the cap portion 62 including the cap 64 that covers the nozzles N. The recording unit 20 can move to the maintenance position PH3 where the nozzles N are covered with the cap 64, and the contact position of the regulating member 500 is a position where the movement of the recording unit 20 positioned at the maintenance position PH3 is regulated. Normally, when the recording unit 20 is positioned at the maintenance position PH3, the nozzles N are covered with the cap 64, and the recording unit 20 and the cap 64 are in contact with each other. For this reason, for example, it is assumed that the recording unit 20 is moved in the direction of the cap 64 while the position of the recording unit 20 is not ascertained. When the recording unit 20 is located at the maintenance position PH3, there is a concern that the cap 64 may be damaged by moving the recording unit 20 in the direction of the cap 64. In the unlocking processing of the present embodiment, the unlocking processing is performed in accordance with the position of the recording unit 20. Thereby, in a state where the recording unit 20 is not positioned at the maintenance position PH3, the recording unit 20 is moved in the direction of the cap 64. Thus, it is possible to prevent the recording unit 20 and the cap 64 from being damaged due to excessive contact thereof.

The recording device 10 includes the second door 18D that can be displaced between an open state where the regulating member 500 located at the contact position can be accessed and a closed state where the regulating member 500 cannot be accessed. The recording unit 20 cannot be visually recognized when the second door 18D is in an open state and the regulating member 500 is positioned at the contact position. Thereby, the control unit 95 performs the automatic unlocking process HA, and thus it is suitable for a case where the state of the recording unit 20 cannot be visually recognized from the outside. In addition, by setting the second door 18D to be in an open state, the selective unlocking process HM1 can be performed.

The recording device 10 includes the recording unit 20 capable of ejecting ink from the nozzles N. In addition, the recording device 10 includes the cap portion 62 including the cap 64 that covers the nozzles N. The cap portion 62 is movable to the capping position PC2 where the cap 64 covers the nozzles N and the non-capping position PC1 where the cap 64 is separated from the capping position PC2. In addition, the moving portion MP is the cap portion 62. Thereby, the control unit 95 executes the unlocking processing, and thus it is possible to easily remove the regulating member 200 without taking time and effort such as manually driving the driving unit of the cap portion 62 by a service man.

The recording device 10 includes the moving portion MP which is movable in the moving direction MD including a first direction and a second direction which is a direction opposite to the first direction. In addition, the recording device 10 includes the regulating member RM which is attachable to and detachable from a contact position which comes into contact with a part of the moving portion MP. The regulating member RM can regulate the movement of the moving portion MP in the moving direction MD at the contact position. In addition, the locked state of the regulating member RM in which the regulating member RM cannot be removed from the contact position includes a first locked state achieved by moving the moving portion MP in the first direction. In addition, the locked state of the regulating member RM includes a second locked state where the moving portion MP moves in the second direction. In addition, a method of controlling the recording device 10 includes executing the unlocking processing in a locked state. In addition, the method of controlling the recording device 10 includes moving the moving portion MP in the second direction when the regulating member RM is in the first locked state in the unlocking processing. In addition, the method of controlling the recording device 10 includes moving the moving portion MP in the first direction when the regulating member RM is in the second locked state in the unlocking processing. Thereby, the unlocking processing is executed, and thus it is possible to easily remove the regulating member RM without taking time and effort such as manually driving the driving unit of the moving portion MP by the service man.

In the method of controlling the recording device 10, the unlocking processing is executed based on a locked state determined from the position of the moving portion MP detected by the detection portion DP. Thereby, the detection portion DP detects the position of the moving portion MP, and thus it is possible to perform an appropriate unlocking operation in accordance with the locked state.

The method of controlling the recording device 10 includes receiving an instruction for canceling the locked state and executing the unlocking processing based on the instruction. Thereby, the service man himself or herself can select a direction in which the moving portion MP is to be moved to perform an unlocking operation.

The recording device 10 and the method of controlling the recording device 10 according to the above-described embodiment of the present disclosure are based on the configuration described above. On the other hand, with respect to the recording device 10 and the method of controlling the recording device 10 according to the above-described embodiment of the present disclosure, it is also possible to change or omit a partial configuration within a range that does not deviate from the gist of the present disclosure. Further, the above embodiment and other embodiments to be described below can be combined with each other within a technically consistent range. Other embodiments will be described below.

In the above-described embodiment, when the regulating members 200 and 500 are located in the accommodation portions 300 and 600, the regulating members 200 and 500 may be fixed to the accommodation portions 300 and 600 by means of a tape. In this case, the engaged portions 209 and 213 of the regulating member 200, the engaged portions 509A and 509B of the regulating member 500, the engaging portions 309 and 312 of the accommodation portion 300, and the engaging portions 609A and 609B of the accommodation portion 600 may be omitted.

In the above-described embodiment, when the regulating members 200 and 500 are located in the accommodation portions 300 and 600, the regulating members 200 and 500 may not be fixed to the accommodation portions 300 and 600. In this case, the engaged portions 209 and 213 of the regulating member 200, the engaged portions 509A and 509B of the regulating member 500, the engaging portions 309 and 312 of the accommodation portion 300, and the engaging portions 609A and 609B of the accommodation portion 600 may be omitted.

In the above-described embodiment, the accommodation portion 300 may not be disposed in the frame 121. For example, the accommodation portion 300 may be disposed at a position that can be accessed by setting the first door 16 to be in an open state and is hidden by a member constituting the transport path T when viewed from the −Y direction side. Further, for example, the accommodation portion 300 may be disposed in the first door 16. In addition, for example, similarly to the accommodation portion 600, the accommodation portion 300 may be disposed at a position of the accommodation exterior 18C which is covered with the second door 18D in a closed state.

In the above-described embodiment, as long as the insertion space SK is disposed at a position overlapping the guide rail 37 when viewed from a direction along the X-axis direction, the accommodation portion 600 may not be disposed at a position overlapping the insertion space SK when viewed from the direction along the X-axis direction. For example, the accommodation portion 600 may be disposed at a position of the accommodation exterior 18C which is covered with the second door 18D in a closed state and is on the −Z direction side of the insertion space SK.

In the above-described embodiment, the accommodation portions 300 and 600 may not be provided in the device main body 11. For example, the accommodation portions 300 and 600 may be provided in an accommodation box included in the recording device 10, and the regulating members 200 and 500 may be accommodated in the accommodation box when the movement of the moving portion MP is not regulated.

In the above-described embodiment, the regulating portion 201 of the regulating member 200 may not have a sawtooth shape in which a plurality of protrusions are arranged at equal intervals in one direction. For example, as long as the regulating portion 201 engages with the rack 71 of the cap portion 62, the intervals between the plurality of protrusions of the regulating portion 201 which are arranged in one direction may not be equal to each other. In addition, for example, the number of protrusions of the regulating portion 201 that engage with the rack 71 of the cap portion 62 may be one.

In the above-described embodiment, the outer surface 207 of the regulating member 200 may not be a rounded surface that continues from the outer surface 206 in the +X direction and becomes more distant from the inner surface 406 toward the +X direction, when the regulating member 200 is located in the fitting portion 400. For example, the outer surface 207 may be an inclined surface which continues from the outer surface 206 in the +X direction and becomes more distant from the inner surface 406 toward the +X direction when the regulating member 200 is located in the fitting portion 400.

In the above-described embodiment, the regulating member 200 may not regulate the movement of the cap portion 62 in the A direction by the regulating portion 201 engaging with the rack 71 of the cap portion 62. For example, the regulating portion 201 may have the same configuration as the regulating portion 501 of the regulating member 500, and the regulating member 200 may regulate the movement of the cap portion 62 in the A direction by the regulating portion 201 coming into contact with the guide roller 74 included in the cap portion 62. In this case, the guide roller 74 included in the cap portion 62 is an example of a part of the moving portion MP.

In the above-described embodiment, the regulating member 500 may not regulate the movement of the recording unit 20 in the B direction by the regulating portion 501 coming into contact with the guide roller 29 of the recording unit 20. For example, the regulating portion 501 may have the same configuration as that of the regulating portion 201 of the regulating member 200, and the regulating member 500 may regulate the movement of the recording unit 20 in the B direction by engagement between the rack 28 included in the recording unit 20 and the regulating portion 501.

In the above-described embodiment, the recording device 10 may include a regulating member that regulates the movement of the wiper portion 82 in the X-axis direction at the time of transporting the recording device 10, or the like, and an accommodation portion that can accommodate the regulating member when the regulating member does not regulate the movement of the wiper portion 82. For example, the regulating portion included in the regulating member may have the same configuration as that of the regulating portion 501 of the regulating member 500, and the regulating portion may regulate the movement of the wiper portion 82 in the X-axis direction by coming into contact with the slider 82A of the wiper portion 82 located at the retraction position PW1. In this case, the wiper portion 82 is an example of the moving portion MP, and the slider 82A included in the wiper portion 82 is an example of a part of the moving portion MP.

In the above-described embodiment, when the recording device 10 is started up for the first time, the control unit 95 may perform movement control of moving the recording unit 20 to the retraction position PH1 and moving the cap portion 62 to the non-capping position PC1 by controlling the first movement mechanism 31 and the second movement mechanism 70. When the sensor SE1 does not detect the recording unit 20, the control unit 95 may cause the display unit 14A of the operation unit 14 to display a message indicating that there is a possibility that the regulating member 500 is inserted into the insertion space SK. When the sensor SE2 does not detect the cap portion 62, the control unit 95 may cause the display unit 14A of the operation unit 14 to display a message indicating that there is a possibility that the regulating member 200 is fitted into the fitting portion 400.

In the above-described embodiment, the cap portion 62 may be configured to be movable in the +A direction from the capping position PC2. In this case, in a locked state where the regulating member 200 cannot be removed from the contact position, the unlocking processing executed by the control unit may include the automatic unlocking process CA and the selective unlocking process CM2. In the automatic unlocking process CA, the control unit 95 moves the cap portion 62 in either the +A direction or the −A direction based on a locked state determined from the position of the cap portion 62 detected by the sensor SE2.

Figure 35:
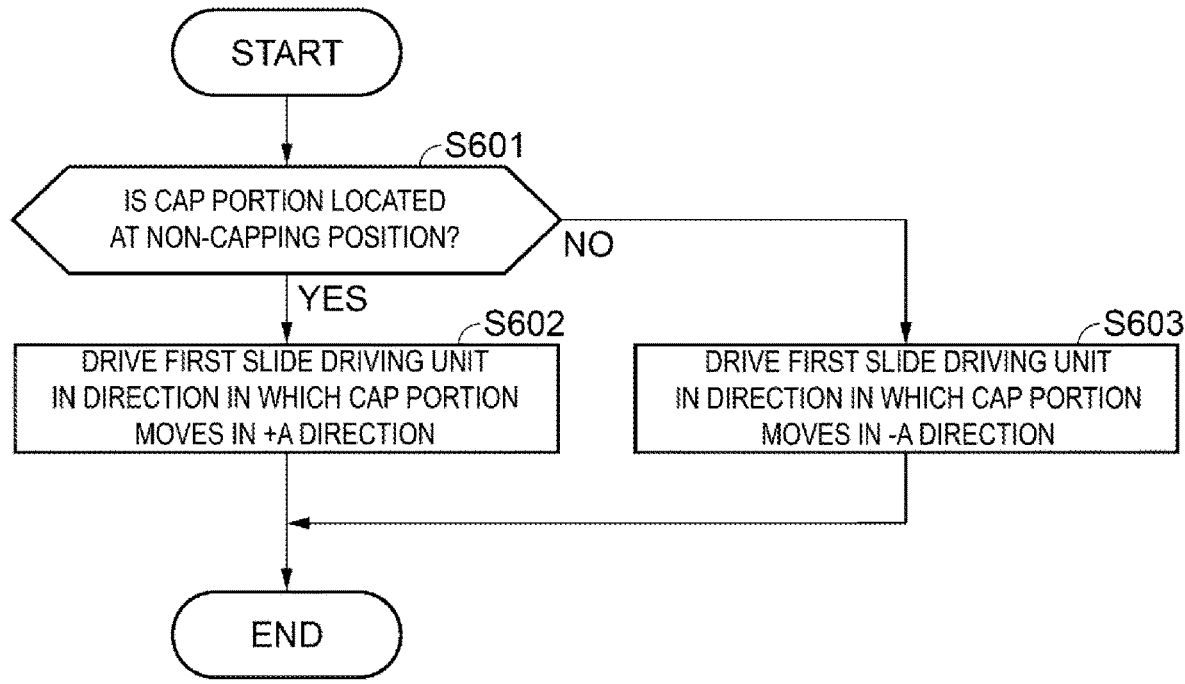
FIG. 35 is a flowchart illustrating an automatic unlocking process in another embodiment.

When a service man gives an instruction for the automatic unlocking process CA of the regulating member 200, the control unit 95 executes the processing illustrated in FIG. 35. In step S601 of FIG. 35, the control unit 95 confirms whether the cap portion 62 is located at the non-capping position PC1. When the sensor SE2 detects the cap portion 62, the control unit 95 determines that the cap portion 62 is located at the non-capping position PC1. When the sensor SE2 does not detect the cap portion 62, the control unit 95 determines that the cap portion 62 is not located at the non-capping position PC1.

When the cap portion 62 is located at the non-capping position PC1, a result in step S601 is YES, and the control unit 95 determines that the locked state is the first locked state caused by the movement of the cap portion 62 in the −A direction. Then, the control unit 95 causes the processing to proceed to step S602. When the cap portion 62 is not located at the non-capping position PC1, a result in step S601 is NO, and the control unit 95 determines that the locked state is the second locked state caused by the movement of the cap portion 62 in the +A direction. Then, the control unit 95 causes the processing to proceed to step S603.

In step S602, the control unit 95 drives the driving motor of the first slide driving unit 75 by a predetermined amount in a direction in which the cap portion 62 moves in the +A direction. That is, in the automatic unlocking process CA of the regulating member 200, when the regulating member 200 is in the first locked state, the control unit 95 moves the cap portion 62 in the +A direction. When the processing of step S602 is performed, the control unit 95 terminates the processing.

In step S603, the control unit 95 drives the driving motor of the first slide driving unit 75 by a predetermined amount in a direction in which the cap portion 62 moves in the −A direction. That is, in the automatic unlocking process CA of the regulating member 200, when the regulating member 200 is in the second locked state, the control unit 95 moves the cap portion 62 in the −A direction. When the processing of step S603 is performed, the control unit 95 terminates the processing.

The selective unlocking process CM2 is a process of moving the cap portion 62 in the −A direction. When it is desired to move the cap portion 62 in the −A direction in order to cancel the locked state of the regulating member 200, the service man selects the selective unlocking process CM2. The selective unlocking process CM2 is a process in which the control unit 95 moves the cap portion 62 in the −A direction, based on the service man's instruction for canceling the locked state.

Figure 36:
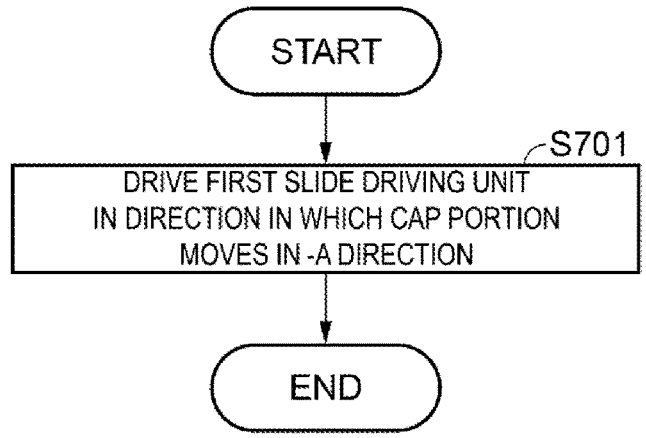
FIG. 36 is a flowchart illustrating a selective unlocking process in another embodiment.

For example, it is assumed that the service man determines that the locked state of the regulating member 200 is the second locked state and operates the operation unit 14 to select the selective unlocking process CM2. When the service man gives an instruction for the selective unlocking process CM2 of the regulating member 200, the control unit 95 executes the processing illustrated in FIG. 36. In step S701 of FIG. 36, the control unit 95 drives the driving motor of the first slide driving unit 75 by a predetermined amount in a direction in which the cap portion 62 moves in the −A direction. When the processing of step S701 is performed, the control unit 95 terminates the processing.

In the above-described embodiment, the accommodation portion 300 may not be disposed in the frame 121. For example, the accommodation portion 300 may be disposed at a position that can be accessed by setting the first door 16 to be in an open state and is hidden by a member constituting the transport path T when viewed from the −Y direction side. Further, for example, the accommodation portion 300 may be disposed in the first door 16. In addition, for example, similarly to the accommodation portion 600, the accommodation portion 300 may be disposed at a position of the accommodation exterior 18C which is covered with the second door 18D in a closed state.

In the above-described embodiment, the control unit 95 may confirm whether there is the regulating member RM every time the recording device 10 is started up. In addition, the control unit 95 may confirm whether there is the regulating member RM every time the second door 18D is opened or closed.

In the confirming of whether there is the regulating member RM in the above-described embodiment, when it is confirmed whether there is the regulating member 500, a driving load of the driving motor may not be monitored by measuring a driving current value of the driving motor of the elevation driving unit 41. For example, the recording device 10 is provided with a sensor that can detect the regulating member 500 located at a contact position. Then, when the sensor detects the regulating member 500, the control unit 95 may determine that the regulating member 500 of the recording unit 20 is mounted at the contact position. Then, when the sensor does not detect the regulating member 500, the control unit 95 may determine that the regulating member 500 of the recording unit 20 is not mounted at the contact position.

In the confirming of whether there is the regulating member RM in the above-described embodiment, when it is confirmed whether there is the regulating member 200, a driving load of the driving motor may not be monitored by measuring a driving current value of the driving motor of the first slide driving unit 75. For example, the recording device 10 is provided with a sensor that can detect the regulating member 200 located at the contact position. When the sensor detects the regulating member 200, the control unit 95 may determine that the regulating member 200 of the cap portion 62 is mounted at the contact position. When the sensor does not detect the regulating member 200, the control unit 95 may determine that the regulating member 200 of the cap portion 62 is not mounted at the contact position.

In the above-described embodiment, the recording device 10 may include a sensor SE5 (not illustrated) that can detect the recording unit 20 in the first locked state. In addition, the recording device 10 may include a sensor SE6 (not illustrated) that can detect the recording unit 20 in the second locked state. In this case, the control unit 95 may determine a locked state of the regulating member 500 based on a detection result of either the sensor SE5 or the sensor SE6.

In the above-described embodiment, the recording device 10 may include a sensor SE7 (not illustrated) that can detect the cap portion 62 when the cap portion 62 is in the first locked state. In addition, the recording device 10 may include a sensor SE8 (not illustrated) that can detect the cap portion 62 in the second locked state. In this case, the control unit 95 may determine a locked state of the regulating member 200 based on a detection result of either the sensor SE7 or the sensor SE8.

What is claimed is:
1. A recording device comprising:
   a moving portion that is movable in a moving direction intersecting a horizontal direction; and
   a regulating member that includes a regulating portion and is attachable to and detachable from a contact position where the regulating portion comes into contact with a part of the moving portion, wherein
   the regulating member regulates movement of the moving portion in the moving direction by the regulating portion coming into contact with a part of the moving portion,
   the moving portion includes a rack, and
   movement of the moving portion in the moving direction is regulated by engagement between the regulating portion of the regulating member and the rack.
2. The recording device according to claim 1, further comprising an accommodation portion configured to accommodate the regulating member.
3. The recording device according to claim 2, wherein the regulating member is fixed to the accommodation portion when the regulating member is located in the accommodation portion.
4. The recording device according to claim 3, wherein the accommodation portion includes an engaging portion, and
   the regulating member includes an engaged portion that engages with the engaging portion.
5. The recording device according to claim 4, wherein the regulating member includes the engaged portion in a deformable portion that is elastically deformable.
6. The recording device according to claim 1, further comprising a fitting portion into which the regulating member is fitted, wherein
   the regulating member is fitted into the fitting portion so that the regulating portion engages with the rack, and
   the regulating member includes a protruding portion that protrudes from the fitting portion when the regulating portion is engaged with the rack.
7. The recording device according to claim 6, wherein the fitting portion has a facing surface that defines a space into which the regulating member is fitted,
   the facing surface faces the rack along a direction in which the regulating member is fitted into the fitting portion,
   the regulating member includes a contact surface that comes into contact with the facing surface and a non-contact surface that does not come into contact with the facing surface on a side facing the facing surface when the regulating member is in the space, and
   the non-contact surface is a rounded surface that continues from the contact surface toward a back side in the space in the fitting direction and becomes more distant from the facing surface toward the back side.

8. The recording device according to claim 1, further comprising:
a recording unit configured to eject a liquid from nozzles; and
a cap portion that includes a cap covering the nozzles, the cap portion being movable to a capping position where the cap covers the nozzles and a non-capping position where the cap is separated from the capping position, wherein
the moving portion is the cap portion.

9. The recording device according to claim 8, further comprising:
an accommodation portion that is configured to accommodate the regulating member when the regulating member does not regulate movement of the cap portion; and
a first door that is configured to take an open state where the accommodation portion is accessible and a closed state where the accommodation portion is not accessible, wherein
the regulating member is accommodated in the accommodation portion to be visually unrecognizable when the first door is in the open state.

10. The recording device according to claim 9, further comprising a transport path forming member that forms a transport path along which a medium on which recording is performed by ejecting the liquid from the recording unit is transported, wherein
the transport path forming member is displaced to a separation position when the first door is in the open state and a transport position when the first door is in the closed state,
the separation position is a position where the transport path forming member covers the accommodation portion, and
the transport position is a position where the medium is transportable by the transport path forming member, and where the transport path forming member does not cover the accommodation portion.

11. A recording device comprising:
a moving portion that is movable in a moving direction intersecting a horizontal direction;
a regulating member that includes a regulating portion and is attachable to and detachable from a contact position where the regulating portion comes into contact with a part of the moving portion; and
further comprising a guide portion that extends in the moving direction, wherein
the moving portion includes a guided portion guided by the guide portion, and
the regulating member regulates movement of the moving portion in the moving direction when the regulating portion comes into contact with the guided portion; and
further comprising a recording unit configured to eject a liquid from nozzles, wherein an accommodation portion configured to accommodate the regulating member when the regulating member does not regulate movement of the recording unit, wherein the moving portion is the recording unit; and
the regulating member regulates movement of the moving portion in the moving direction by the regulating portion coming into contact with a part of the moving portion,
the accommodation portion includes a hole in a bottom surface thereof and is provided at a position overlapping the guide portion when viewed from a direction along a width direction of the recording unit that intersects the moving direction, and
the regulating member regulates movement of the recording unit by the regulating portion coming into contact with the guided portion through the hole.

12. The recording device according to claim 11, further comprising a second door configured to take an open state where the accommodation portion is accessible and a closed state where the accommodation portion is not accessible, wherein
the regulating member located in the accommodation portion becomes visually recognizable when the second door is in the open state and becomes visually unrecognizable when the second door is in the closed state.

13. A recording device comprising:
a moving portion that is movable in a moving direction intersecting a horizontal direction;
a regulating member that includes a regulating portion and is attachable to and detachable from a contact position where the regulating portion comes into contact with a part of the moving portion; and
a control unit, wherein
the regulating member regulates movement of the moving portion in the moving direction by the regulating portion coming into contact with a part of the moving portion,
the moving direction of the moving portion includes a first direction and a second direction opposite to the first direction,
the control unit is configured to execute unlocking processing for canceling a locked state of the regulating member in the locked state where the regulating member is not removable from the contact position,
the locked state includes a first locked state achieved by moving the moving portion in the first direction and a second locked state achieved by moving the moving portion in the second direction, and
in the unlocking processing, the moving portion moves in the second direction when the regulating member is in the first locked state, and the moving portion moves in the first direction when the regulating member is in the second locked state.

* * * * *